US010296641B2

(12) United States Patent
Sogani et al.

(10) Patent No.: US 10,296,641 B2
(45) Date of Patent: May 21, 2019

(54) TECHNIQUES FOR EFFICIENT ACCESS OF SOFTWARE APPLICATION FUNCTIONALITY IN SEARCH

(71) Applicant: Samsung Electronics Co., Ltd., Suwon-si, Gyeonggi-do (KR)

(72) Inventors: Shravan Sogani, San Ramon, CA (US); Liron Shapira, Mounain View, CA (US); Eric J. Glover, Palo Alto, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 636 days.

(21) Appl. No.: 14/685,739

(22) Filed: Apr. 14, 2015

(65) Prior Publication Data
US 2016/0179956 A1 Jun. 23, 2016

Related U.S. Application Data

(60) Provisional application No. 62/095,980, filed on Dec. 23, 2014.

(51) Int. Cl.
*G06F 17/30* (2006.01)
*H04L 29/08* (2006.01)
(Continued)

(52) U.S. Cl.
CPC ...... *G06F 17/30864* (2013.01); *G06F 3/0482* (2013.01); *G06F 3/04842* (2013.01);
(Continued)

(58) Field of Classification Search
CPC ........... G06F 17/30864; G06F 3/04842; G06F 3/0482; H04L 67/06; H04L 67/02; G06Q 10/02; G06Q 30/0251
See application file for complete search history.

(56) References Cited

U.S. PATENT DOCUMENTS 9,600,259 B2 * 3/2017 Shapira ............. G06F 17/30392
9,621,650 B2 * 4/2017 Raman ................ H04L 67/1095
(Continued)

OTHER PUBLICATIONS

App. Indexing: <https://web.archive.org/web/20140225132807/https://developers.google.com/app- . indexing/webmasters/>, Dec. 4, 2013.
(Continued)

*Primary Examiner* — Leslie Wong
(74) *Attorney, Agent, or Firm* — Jefferson IP Law, LLP

(57) ABSTRACT

Techniques include transmitting a search query to a search system and receiving search results from the search system. The search results include an application access mechanism (AAM) that specifies a native application state and an application download address (ADA) that indicates a location for downloading the application. The search results also include preview data associated with the state and/or a web access mechanism (WAM) that specifies a web-based application state. The techniques further include generating a selectable link including the AAM, ADA, and one or both of the preview data and WAM, displaying the link, and receiving a user selection of the link. The techniques also include, in response to receiving the user selection, performing one or more of downloading, installing, and launching the native application, and setting the application into the state, displaying the preview data, and launching the web-based application, and setting the application into the web state.

27 Claims, 19 Drawing Sheets

(51) Int. Cl.
*G06F 3/0482* (2013.01)
*G06F 3/0484* (2013.01)
*G06Q 10/02* (2012.01)
*G06Q 30/02* (2012.01)

(52) U.S. Cl.
CPC ......... *G06Q 10/02* (2013.01); *G06Q 30/0251* (2013.01); *H04L 67/02* (2013.01); *H04L 67/06* (2013.01)

(56) References Cited

U.S. PATENT DOCUMENTS

| | | | | |
|---|---|---|---|---|
| 9,659,100 | B2* | 5/2017 | Shapira | G06F 17/3087 |
| 9,720,672 | B2* | 8/2017 | Lipton | G06F 8/61 |
| 2012/0089678 | A1* | 4/2012 | Cort | G06Q 50/01 |
| | | | | 709/204 |
| 2013/0290322 | A1* | 10/2013 | Prosnitz | G06F 17/30554 |
| | | | | 707/723 |
| 2014/0040226 | A1* | 2/2014 | Sadhukha | G06F 8/61 |
| | | | | 707/706 |
| 2014/0052683 | A1* | 2/2014 | Kirkham | G06Q 30/0631 |
| | | | | 706/46 |
| 2014/0172911 | A1* | 6/2014 | Cohen | H04L 67/42 |
| | | | | 707/770 |
| 2014/0195921 | A1* | 7/2014 | Grosz | G06F 3/1242 |
| | | | | 715/738 |
| 2014/0337414 | A1* | 11/2014 | Sojoodi | H04L 67/02 |
| | | | | 709/203 |
| 2015/0156061 | A1* | 6/2015 | Saxena | G06F 17/30864 |
| | | | | 715/733 |
| 2015/0234645 | A1* | 8/2015 | Ramachandran | G06F 9/445 |
| | | | | 717/178 |
| 2015/0286737 | A1* | 10/2015 | Cattone | G06F 3/04842 |
| | | | | 715/234 |
| 2015/0347585 | A1* | 12/2015 | Klotz | G06F 17/30867 |
| | | | | 707/706 |
| 2015/0370812 | A1* | 12/2015 | Lee | G06F 17/3087 |
| | | | | 707/711 |
| 2016/0132596 | A1* | 5/2016 | Harris | G06F 21/6227 |
| | | | | 707/722 |
| 2016/0162275 | A1* | 6/2016 | Morley | G06F 8/65 |
| | | | | 717/170 |
| 2016/0179475 | A1* | 6/2016 | Velummylum | G06F 8/65 |
| | | | | 717/106 |
| 2016/0239284 | A1* | 8/2016 | Boudville | G06F 8/61 |
| 2016/0286544 | A1* | 9/2016 | Ikeda | H04W 72/048 |
| 2017/0215025 | A1* | 7/2017 | Raman | H04W 4/003 |

OTHER PUBLICATIONS

App Indexing Technical Details: <https://web.archive.org/web/20140210182226/https://developers.google.com/app-indexing/webmasters/details>, Feb. 1, 2014.
Indexing Apps Just Like Websites: <http://googlewebmastercentral.blogspot.com/2013/10/indexing-apps-just-like-websites.html>, Oct. 31, 2013.
Google Search Now Discovers Content Within Android Apps: http://searchengineland.com/google-search-now-discovers-content-within-android-apps-178960, Dec. 4, 2013.
Google's Search Results Can Deep-Link to Your Android Apps: <http://techcrunch.com/2013/10/31/android-4-4-kitkat-app-indexing/>, Oct. 31, 2013.

* cited by examiner

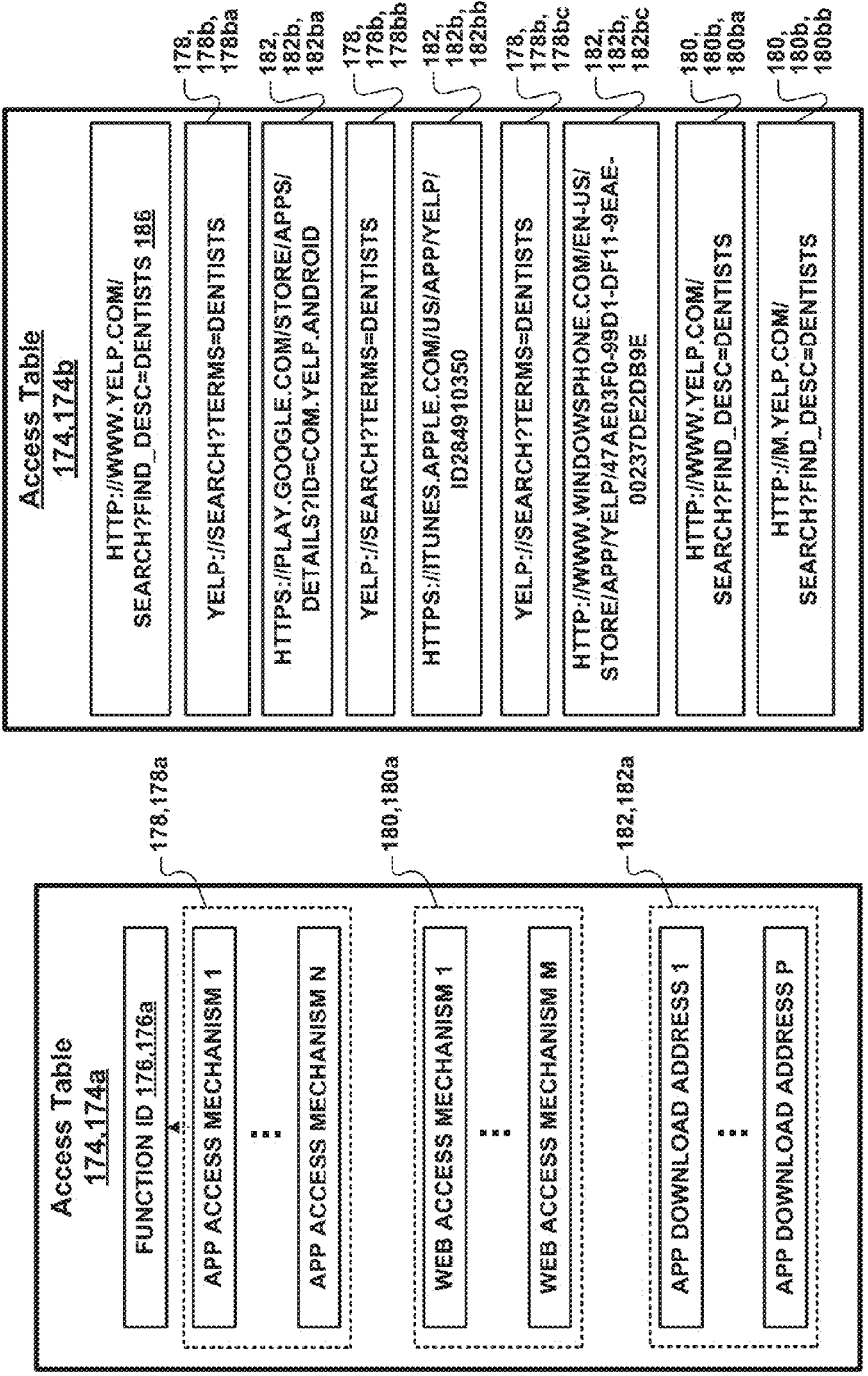

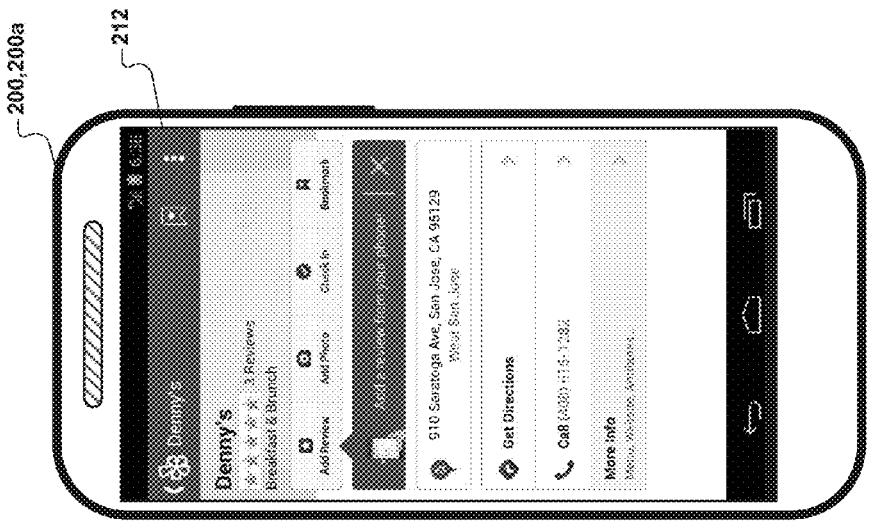
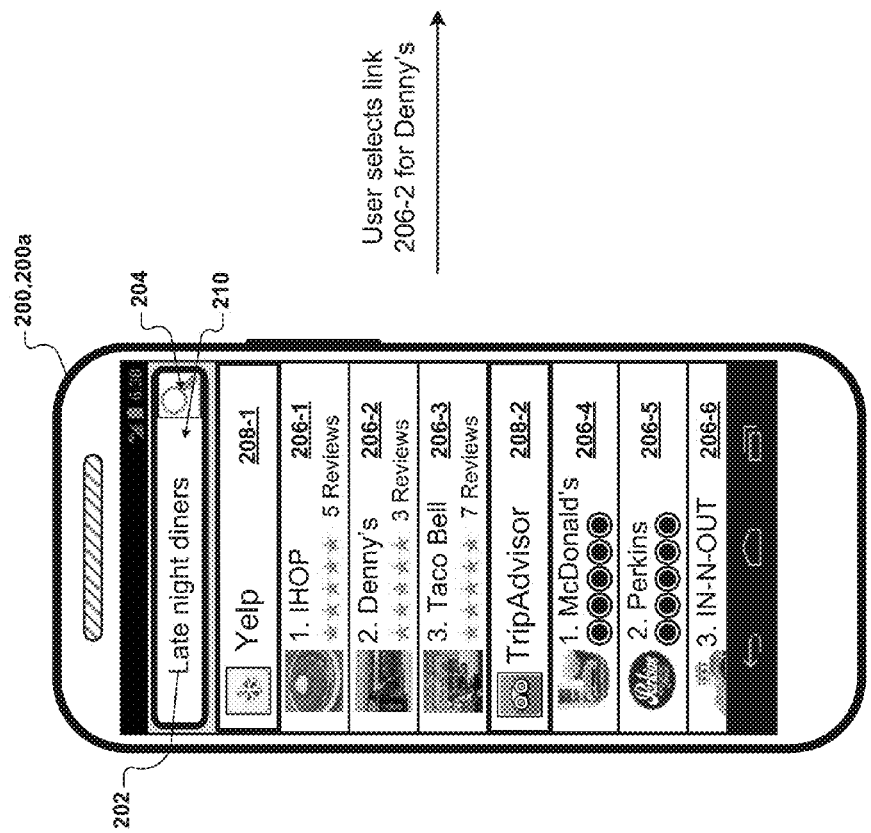
FIG. 7B
FIG. 7A

TECHNIQUES FOR EFFICIENT ACCESS OF SOFTWARE APPLICATION FUNCTIONALITY IN SEARCH

CROSS-REFERENCE TO RELATED APPLICATION

This U.S. patent application claims priority under 35 U.S.C. § 119(e) to U.S. Provisional Application 62/095,980, filed Dec. 23, 2014, which is hereby incorporated by reference in its entirety.

TECHNICAL FIELD

This disclosure generally relates to the field of search, and more particularly to techniques for generating search results that correspond to states within software applications.

BACKGROUND

In recent years, the use of computers, smartphones, and other Internet-connected computing devices has grown significantly. Correspondingly, the number of software applications available for such computing devices has also grown. Today, many diverse software applications can be accessed on a number of different computing devices, including, but not limited to, smartphones, personal computers, automobiles, and televisions. These software applications can include business driven applications, games, educational applications, news applications, shopping applications, messaging applications, media streaming applications, and social networking applications, as some examples. Because of the large number of software applications available today and the wide range of functionality they provide, computing device users often require the ability to search for and access specific software application functionality.

SUMMARY

One aspect of the disclosure provides a method that includes transmitting a search query to a search system configured to generate search results in response to a received search query, and receiving search results from the search system in response to transmitting the search query. The search results include an application access mechanism (AAM) that specifies an application state of a native application, an application download address (ADA) that indicates a location at which the native application may be downloaded, and a web access mechanism (WAM) that specifies a web application state of a web-based application. The method further includes generating a user selectable link that includes the AAM, the ADA, and the WAM, displaying the user selectable link, and receiving a user selection of the user selectable link. The method also includes, in response to receiving the user selection, performing one of downloading the native application using the ADA, installing the native application, launching the native application, and setting the native application into the application state using the AAM, and launching the web-based application, and setting the web-based application into the web application state using the WAM.

Implementations of the disclosure may include one or more of the following optional features. In some implementations, the AAM references the native application and indicates one or more operations for the native application to perform. The native application performs the one or more operations and sets the native application into the application state. In addition, the WAM references the web-based application and indicates one or more operations for the web-based application to perform. The web-based application performs the one or more operations and sets the web-based application into the web application state.

In some examples, the web-based application includes a web version of the native application. The web application state of the web-based application corresponds to the application state of the native application. Additionally or alternatively, the method may include, in response to receiving the user selection, determining whether to download, install, and launch the native application, and set the native application into the application state, or launch the web-based application, and set the web-based application into the web application state. The method may further include downloading, installing, and launching the native application, and setting the native application into the application state, or launching the web-based application, and setting the web-based application into the web application state includes downloading, installing, and launching the native application, and setting the native application into the application state, or launching the web-based application, and setting the web-based application into the web application state based on the determination. The method may further include receiving a user input, where determining whether to download, install, and launch the native application, and set the native application into the application state, or launch the web-based application, and set the web-based application into the web application state includes determining based on the user input. In some examples, determining whether to download, install, and launch the native application, and set the native application into the application state, or launch the web-based application, and set the web-based application into the web application state includes determining based on one or more of the following: (1) a size of the native application; (2) one or more of bandwidth and quality of a data connection used to download the native application; (3) one or more of an amount of memory resources and an amount of processing resources available for one or more downloading, installing, and launching the native application, and setting the native application into the application state; and (4) a number of native applications referenced by AAMs included in the search results that are not installed.

The method may also include receiving a user input, where downloading, installing, and launching the native application, and setting the native application into the application state includes downloading, installing, and launching the native application, and setting the native application into the application state is in response to receiving the user input. The user selectable link includes a first user selectable link, where the user selection includes a first user selection. Downloading, installing, and launching the native application, and setting the native application into the application state in response to receiving the user input includes, in response to receiving the first user selection, accessing the location indicated by the ADA, and displaying a graphical user interface (GUI) associated with the location. The GUI includes a second user selectable link that is different than the first user selectable link, where the user input includes a second user selection of the second user selectable link that is different than the first user selection. Downloading, installing, and launching the native application, and setting the native application into the application state in response to receiving the user input also includes, in response to receiving the second user selection, downloading the native application from the location, installing the native application, launching the native application, and setting the native application into the application state.

In some examples, downloading, installing, and launching the native application, and setting the native application into the application state in response to receiving the user input includes, in response to receiving the user selection, downloading the native application from the location, and installing the native application, and in response to receiving the user input, launching the native application and setting the native application into the application state. The user selectable link may include a first user selectable link, where the user selection includes a first user selection. Launching the native application and setting the native application into the application state in response to receiving the user input may include generating a second user selectable link that is different than the first user selectable link. The second user selectable link includes the AAM. Launching the native application and setting the native application into the application state in response to receiving the user input also includes displaying the second user selectable link, where the user input includes a second user selection of the second user selectable link that is different than the first user selection, and in response to receiving the second user selection, launching the native application, and setting the native application into the application state. In some examples, the AAM includes a first AAM, where the search results further include a second AAM that is different than the first AAM, and the first and second AAMs reference different editions of the native application. The method further includes determining that the first AAM references the edition of the native application downloaded from the location indicated by the ADA, where generating the second user selectable link includes generating the link such that the link includes the first AAM and excludes the second AAM based on the determination. Alternatively, the AAM may include a first AAM, where the search results further include a second AAM that is different than the first AAM, and the first and second AAMs reference different editions of the native application. Generating the second user selectable link includes generating the link such that the link further includes the second AAM. The method may further include determining that the first AAM references the edition of the native application downloaded from the location indicated by the ADA, where launching the native application and setting the native application into the application state in response to receiving the second user selection includes launching the native application and setting the native application into the application state based on the determination. In some implementations, the method further includes transmitting an indication that the native application is not installed to the search system, where receiving the search results from the search system includes receiving the search results such that the search results include the ADA in response to transmitting the indication.

In some examples, the method further includes receiving a user input, where launching the web-based application and setting the web-based application into the web application state includes launching the web-based application and setting the web-based application into the web application state in response to receiving the user input. The method may further include transmitting an indication that the native application is not installed to the search system, where receiving the search results from the search system includes receiving the search results such that the search results include the WAM in response to transmitting the indication. In some examples, upon launching the web-based application and setting the web-based application into the web application state, the method includes downloading the native application using the ADA and installing the native application. The search results may further include link data associated with the AAM. The link data includes one or more of text and image data that describe the application state specified by the AAM. Generating the user selectable link may include generating the user selectable link using the link data.

Another aspect of the disclosure provides a method that includes transmitting a search query to a search system configured to generate search results in response to a received search query, and receiving search results from the search system in response to transmitting the search query. The search results include an AAM that specifies an application state of a native application, an ADA that indicates a location at which the native application may be downloaded, and preview data that includes at least a portion of data associated with the application state. The method further includes generating a user selectable link that includes the AAM, the ADA, and the preview data, displaying the user selectable link, and receiving a user selection of the user selectable link. The method also includes, in response to receiving the user selection, performing one or more of downloading the native application using the ADA, installing the native application, launching the native application, and setting the native application into the application state using the AAM, and displaying the preview data.

In some examples, the method further includes, in response to receiving the user selection, determining whether to perform one or more of downloading, installing, and launching the native application, and setting the native application into the application state. The method also includes displaying the preview data, where performing the one or more of downloading, installing, and launching the native application, and setting the native application into the application state, and displaying the preview data includes downloading, installing, and launching the native application, and setting the native application into the application state, and displaying the preview data based on the determination. Additionally, the method may also include receiving a user input, and determining whether to perform the one or more of downloading, installing, and launching the native application, and setting the native application into the application state, and displaying the preview data, includes determining based on the user input. In some examples, determining whether to perform the one or more of downloading, installing, and launching the native application, and setting the native application into the application state, and displaying the preview data includes determining based on one or more of the following: (1) a size of the native application; (2) one or more of bandwidth and quality of a data connection used to download the native application; (3) one or more of an amount of memory resources and an amount of processing resources available for one or more downloading, installing, and launching the native application, and setting the native application into the application state; and (4) a number of native applications referenced by AAMs included in the search results that are not installed.

In some implementations, the method further includes receiving a user input, where displaying the preview data includes displaying the preview data in response to receiving the user input. The method may further comprise transmitting an indication that the native application is not installed to the search system, where receiving the search results from the search system includes receiving the search results such that the search results include the preview data in response to transmitting the indication.

The method may further include removing the displayed preview data from being displayed upon completing one or more of downloading, installing, and launching the native application, and setting the native application into the application state. In some examples, the method further includes receiving a user input, where removing the displayed preview data from being displayed includes removing the displayed preview data from being displayed in response to receiving the user input.

In yet another aspect of the disclosure, a system includes one or more computing devices configured to transmit a search query to a search system configured to generate search results in response to a received search query, and receive search results from the search system in response to transmitting the search query. The search results include an AAM that specifies an application state of a native application, an ADA that indicates a location at which the native application may be downloaded, and a WAM that specifies a web application state of a web-based application. The one or more computing devices are further configured to generate a user selectable link that includes the AAM, the ADA, and the WAM, display the user selectable link, and receive a user selection of the user selectable link. The one or more computing devices are also configured to, in response to receiving the user selection, perform one of downloading the native application using the ADA, installing the native application, launching the native application, and setting the native application into the application state using the AAM, and launching the web-based application, and setting the web-based application into the web application state using the WAM.

Another aspect of the disclosure provides a system that includes one or more computing devices configured to transmit a search query to a search system configured to generate search results in response to a received search query, and receive search results from the search system in response to transmitting the search query. The search results include an AAM that specifies an application state of a native application, an ADA that indicates a location at which the native application may be downloaded, and preview data that includes at least a portion of data associated with the application state. The one or more computing devices are further configured to generate a user selectable link that includes the AAM, the ADA, and the preview data, display the user selectable link, and receive a user selection of the user selectable link. The one or more computing devices are also configured to, in response to receiving the user selection, perform one or more of downloading the native application using the ADA, installing the native application, launching the native application, and setting the native application into the application state using the AAM, and displaying the preview data.

In yet another aspect of the disclosure, a non-transitory computer-readable storage medium includes instructions that cause one or more computing devices to transmit a search query to a search system configured to generate search results in response to a received search query, and receive search results from the search system in response to transmitting the search query. The search results include an AAM that specifies an application state of a native application, an ADA that indicates a location at which the native application may be downloaded, and a WAM that specifies a web application state of a web-based application. The instructions further cause the one or more computing devices to generate a user selectable link that includes the AAM, the ADA, and the WAM, display the user selectable link, and receive a user selection of the user selectable link.

The instructions also cause the one or more computing devices to, in response to receiving the user selection, perform one of downloading the native application using the ADA, installing the native application, launching the native application, and setting the native application into the application state using the AAM, and launching the web-based application, and setting the web-based application into the web application state using the WAM.

Another aspect of the disclosure provides a non-transitory computer-readable storage medium that includes instructions that cause one or more computing devices to transmit a search query to a search system configured to generate search results in response to a received search query, and receive search results from the search system in response to transmitting the search query. The search results include an AAM that specifies an application state of a native application, an ADA that indicates a location at which the native application may be downloaded, and preview data that includes at least a portion of data associated with the application state. The instructions further cause the one or more computing devices to generate a user selectable link that includes the AAM, the ADA, and the preview data, display the user selectable link, and receive a user selection of the user selectable link. The instructions also cause the one or more computing devices to, in response to receiving the user selection, perform one or more of downloading the native application using the ADA, installing the native application, launching the native application, and setting the native application into the application state using the AAM, and displaying the preview data.

A number of implementations have been described. Nevertheless, it will be understood that various modifications may be made without departing from the spirit and scope of the disclosure. Accordingly, other implementations are within the scope of the following claims.

BRIEF DESCRIPTION OF DRAWINGS

FIGS. 4D and 4E show example access tables.

FIGS. 7A and 7B illustrate example graphical user interfaces (GUIs) that may be generated on a user device according to the present disclosure.

Like reference symbols in the various drawings indicate like elements.

DETAILED DESCRIPTION

Figure 1:
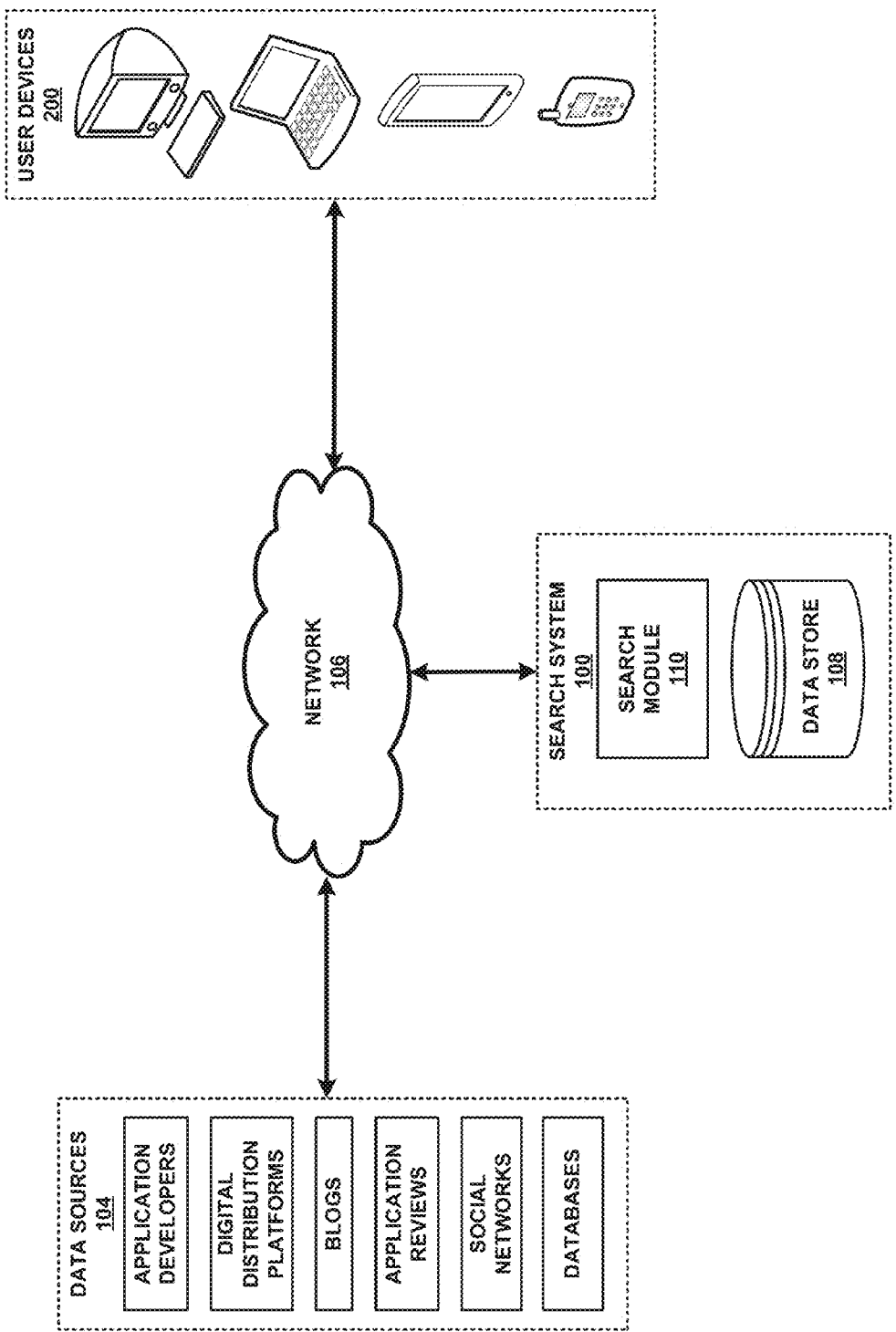
FIG. 1 shows an example environment including a search system.

A search system of the present disclosure receives a search query from a user device and generates search results in response to the received search query. The search system transmits the search results to the user device that generated the search query. The search results include a list of application access mechanisms (AAMs) that may be selected by a user. An AAM may be a string that includes a reference to a native application and indicates one or more operations for a user device to perform. In response to selection of an AAM on a user device, the user device may launch the native application referenced in the AAM and perform the one or more operations indicated in the AAM.

Native applications can perform a variety of different functions for a user. For example, a restaurant reservation application can make reservations for restaurants. As another example, an Internet media player application can stream media (e.g., a song or movie) from the Internet. In some examples, a single native application can perform more than one function. For example, a restaurant reservation application may allow a user to retrieve information about a restaurant and read user reviews for the restaurant in addition to making restaurant reservations. As another example, an Internet media player application may allow a user to perform searches for digital media, purchase digital media, and generate media playlists in addition to streaming media from the Internet.

An AAM includes data that a user device can use to access functionality provided by a native application. For example, an AAM can include data that causes a user device to launch a native application and perform a function associated with the application. Performance of a function according to the AAM may set the native application into a specified state. Accordingly, the process of launching a native application and performing a function according to an AAM may be referred to herein as launching the application and setting the application into a state specified by the AAM. In one example, an AAM for a restaurant reservation application can include data that causes a user device to launch the application and make a reservation at a restaurant. In this example, the restaurant reservation application may be set in a state that displays reservation information to a user, such as a reservation time, a description of the restaurant, and user reviews. In another example, an AAM for an Internet media player application can include data that causes a user device to launch the application and stream media from the Internet. In this example, the Internet media player application may be set in a state that displays information regarding the media being streamed, such as a song, artist, or album name.

AAMs may have various different formats and content. The format and content of an AAM may depend on the native application with which the AAM is associated and the operations that are to be performed by the application in response to selection of the AAM. For example, an AAM for an Internet music player application may differ from an AAM for a shopping application. An AAM for an Internet music player application may include references to musical artists, songs, and albums, for example. The AAM for the Internet music player application may also reference operations, such as randomizing a list of songs and playing a song or album. An AAM for a shopping application may include references to different products that are for sale. The AAM for the shopping application may also include references to one or more operations, such as adding products to a shopping cart and proceeding to a checkout.

The search system transmits additional data in the search results along with the AAMs. For example, the search system may transmit data (e.g., text and/or images), which may be used by the user device to generate user selectable links (or "links") in the search results. A link may include text and/or images that a user may select (e.g., touch, or click on) via a user interface of the user device. Each user selectable link may be associated with an AAM such that when a user selects a link, the user device launches the native application referenced by the AAM and performs the one or more operations indicated by the AAM. The text and/or images of a link displayed to a user may indicate the operations that will be performed in response to selection of the link. For example, if the link is to a song in a music playing application, the text and/or images may identify the application that will be launched by the user device and the song that will be played by the application when the user selects the link. Example links are illustrated in FIGS. 2, 7A, 12, 14A, 16A, and 17.

A user may select a link to cause the user device to launch the native application identified in the link and perform one or more operations according to the AAM associated with the link. Put another way, when a user selects a link, the user device launches a native application and sets the application into a state defined by the AAM associated with the link. In general, a state of a native application may refer to the operations and/or the resulting outcome of the application in response to selection of a link. A state of a native application may also be referred to herein as an "application state."

An application state specified by an AAM may depend on the functionality provided by the native application. For example, if a native application is configured to retrieve and display information from the Internet, the application can be set into a state in which the application retrieves information from the Internet and displays information to the user. In another example, if a native application is configured to play media from the Internet (e.g., music and/or video), the application can be set into a state in which the application is playing a song or a movie from the Internet. In another example, if a native application is configured to make restaurant reservations, the application can be set into a state in which the application displays available restaurant reservations to the user.

The search system includes a data store that the search system uses to generate the search results. The data store includes one or more different function records (e.g., the function record 150a of FIG. 3B). Each function record may include data related to a function of a native application and/or the state of the application resulting from performance of the function. As described herein, a function record may include a function identifier (ID), application state information (ASI), and an AAM.

An AAM included in a function record includes data that causes a user device to launch a native application and perform a function associated with the application. For example, an AAM included in a function record may be a string that includes a reference to a native application and indicates one or more operations for a user device (e.g., the application) to perform. An AAM may include an application resource identifier (ARI) and/or one or more operations for the user device to perform. An ARI is a string having an application specific scheme in some examples. The ARI may include a reference to a native application and indicate one or more operations for the user device (e.g., the application) to perform. For example, the ARI may include a reference to a native application, a domain name, and a path to be used by the application to retrieve and display information to the user.

In some examples, the AAMs include operations for the user device to perform in addition to the operation(s) indicated in the ARI. For example, a search application on the user device, an operating system (OS) of the user device, and/or a native application on the user device may perform the operations included in the AAM. In some examples, the operations are included in a script. Examples of operations may include, but are not limited to, launching a native application, creating and sending a search request to an application server, setting a current geographic location in a native application, making a restaurant reservation, sending a text message, and adding an appointment to a calendar.

In some examples, an AAM does not include an ARI. Instead, the AAM can include one or more operations that reference a native application and indicate one or more operations for the user device to perform. The operations may include instructions for at least one of the search application, the OS, and/or a native application on the user device. In response to selection of the AAM, the user device may perform the operations included in the AAM.

A function ID included in a function record may be a string that uniquely identifies the function record among the other function records in the data store. In some examples, the function ID describes a function and/or an application state in human readable form. For example, the function ID may be a human readable string that describes a function performed according to the AAM and/or an application state resulting from performance of the function. In a more specific example, a function ID for an Internet music player application may include the name of the application along with the name of the song that will be played when the application is set into the state defined by the AAM included in the function record.

A function record includes ASI. The ASI includes data that describes an application state into which a native application is set according to the AAM in the function record. In some examples, the ASI includes data that describes the function performed according to the AAM included in the function record. The ASI can include text, numbers, and symbols that describe the application state. The types of data included in the ASI may depend on the type of information associated with the application state and the functionality specified by the AAM.

In some examples, the ASI includes data that may be presented to the user when the native application is in the application state defined by the AAM. For example, a function record associated with a shopping application may include ASI that describes products (e.g., names and prices) that are shown when the application is set into the application state defined by the AAM of the function record. As another example, a function record associated with a music player application may include ASI that describes a song (e.g., name and artist) that is played when the application is set into the application state defined by the AAM of the function record.

The ASI included in a function record may be generated in a variety of different ways. In one example, data to be included in the ASI may be retrieved via partnerships with database owners and developers of native applications. For example, the data may be automatically retrieved from online databases that include, but are not limited to, data related to movies, television programs, music, and restaurants. In some examples, some data included in the ASI is manually generated by a human operator. The data included in the ASI may be updated over time so that the search system provides up-to-date search results.

The search system generates search results including a list of AAMs that are included in selected function records. Initially, the search system analyzes the search query received from a user device. The search system then identifies a set of function records based on the received search query. For example, the search system may identify the set of function records based on one or more matches (e.g., text matches) between one or more terms of the search query and one or more terms of the ASI included in the identified function records.

The search system processes (e.g., scores) the identified set of function records. For example, the search system may determine how well the function records match the received search query. The search system may then select the AAMs from the function records that best match the received search query. The search system transmits search results including the selected AAMs to the user device that generated the search query. The search system may also transmit additional data along with the AAMs. For example, the search system may transmit data (e.g., text and/or images) to be included in user selectable links.

In some implementations, a function record (e.g., the function record 150, 150d of FIG. 8A) includes multiple different AAMs. For example, the different AAMs may be associated with different editions of a native application. A native application edition (hereinafter, "application edition") refers to a particular implementation or variation of a native application. For example, an application edition may refer to a version of a native application, such as a version 1.0 or 2.0 of the application (e.g., a free or a paid version). In another example, an application edition may refer to an implementation of a native application for a specific platform, such as a specific OS.

The different AAMs included in the function record may cause the corresponding application editions to launch and perform similar functions. Accordingly, the different AAMs included in the function record may cause the corresponding application editions to be set into similar application states. In one example, if the different AAMs reference different editions of an information retrieval application, the different AAMs may cause the corresponding application editions to retrieve similar information. In another example, if the different AAMs reference different editions of an Internet music player application, the different AAMs may cause the corresponding application editions to play the same song.

In a specific example, a function record for a native application that retrieves restaurant information may include multiple different AAMs for multiple different application editions. Assuming the function record is associated with a specific Mexican restaurant, the AAMs for the different application editions may cause each application edition to retrieve information for the same specific Mexican restaurant. For example, a first AAM may cause a first application edition (e.g., on a first OS) to retrieve information for the specific Mexican restaurant. A second AAM may cause a second application edition (e.g., on a second OS) to retrieve information for the specific Mexican restaurant.

During some searches, the search system may identify one or more function records that each includes multiple AAMs. In these scenarios, the search system may process (e.g., score) the identified set of function records as described above. For each identified function record including multiple AAMs, the search system may select which of the AAMs to transmit to the user device. In some examples, the search system transmits each AAM of the identified function record to the user device so that the user device may determine which AAM to use. In other examples, the search system may determine which of the multiple AAMs to transmit to the user device based on information included in a query wrapper received from the user device. For example, the search system may select and transmit one or more of the AAMs that are likely to be compatible with the user device, e.g., based on the OS version of the user device.

In some implementations, a function record (e.g., the function record 150e of FIG. 9) includes a web access mechanism (WAM). The WAM may be a resource identifier that can be processed by a wide variety of user devices running different operating systems. In some examples, the WAM includes a uniform resource locator (URL) (i.e., a web address) used with the hypertext transfer protocol (HTTP). For example, the WAM may be a URL that is optimized for a desktop website (e.g., a so-called "full" site) or a mobile device website.

The WAM (e.g., a URL) included in a function record may be used by a web browser application to access a web resource that includes similar information and/or performs similar functions as would be performed by a native application that receives an AAM of the function record. In one specific example, a WAM of a function record may direct a web browser application of a user device to a web version of a native application referenced by an AAM of the function record. For example, if AAMs included in a function record for a specific Mexican restaurant cause each corresponding application edition to retrieve information for the Mexican restaurant, a WAM also included in the function record may direct a web browser application of a user device to a web page entry for the same Mexican restaurant.

During some searches, the search system may identify one or more function records that each includes AAMs and a WAM. In these scenarios, the search system may process (e.g., score) the identified set of function records in the manner described above. For each identified function record including AAMs and a WAM, the search system may determine whether to transmit the WAM and the AAMs. In some examples, the search system transmits the WAM and each of the multiple AAMs to the user device so that the user device can determine which of the access mechanisms (AMs) to use. In other examples, the search system may determine whether any of the AAMs should be transmitted to the user device. If the search system determines that none of the AAMs is likely to be compatible with the user device, the search system can refrain from sending the AAMs to the user device. Instead, the search system may transmit the WAM to the user device. As described above, the user device may use a web browser application to access the web resource identified by the WAM.

In some implementations of the search system, a function record (e.g., a function record 150g of FIG. 11) includes a quality score. The quality score may be a number used by the search system to generate a result score for a function record. For example, the quality score may be a record scoring feature input into one or more machine-learned models used to generate a result score, as described hereinafter.

The quality score may be determined based on metrics associated with a person, place, or thing described in the function record. For example, the quality score may be based on the popularity of a place described in the function record and/or ratings (e.g., user ratings) of the place described in the function record. In another example, if the function record describes a song, the quality score may be based on the popularity of the song described in the function record and/or ratings (e.g., user ratings) of the song described in the function record. The quality score may also be determined based on measurements associated with the function record. For example, the quality score may be determined based on data indicating how often the function record is retrieved during a search and how often AMs (e.g., an AAM, a WAM, and/or an application download address, or ADA) of the function record are selected by a user.

Figure 2:
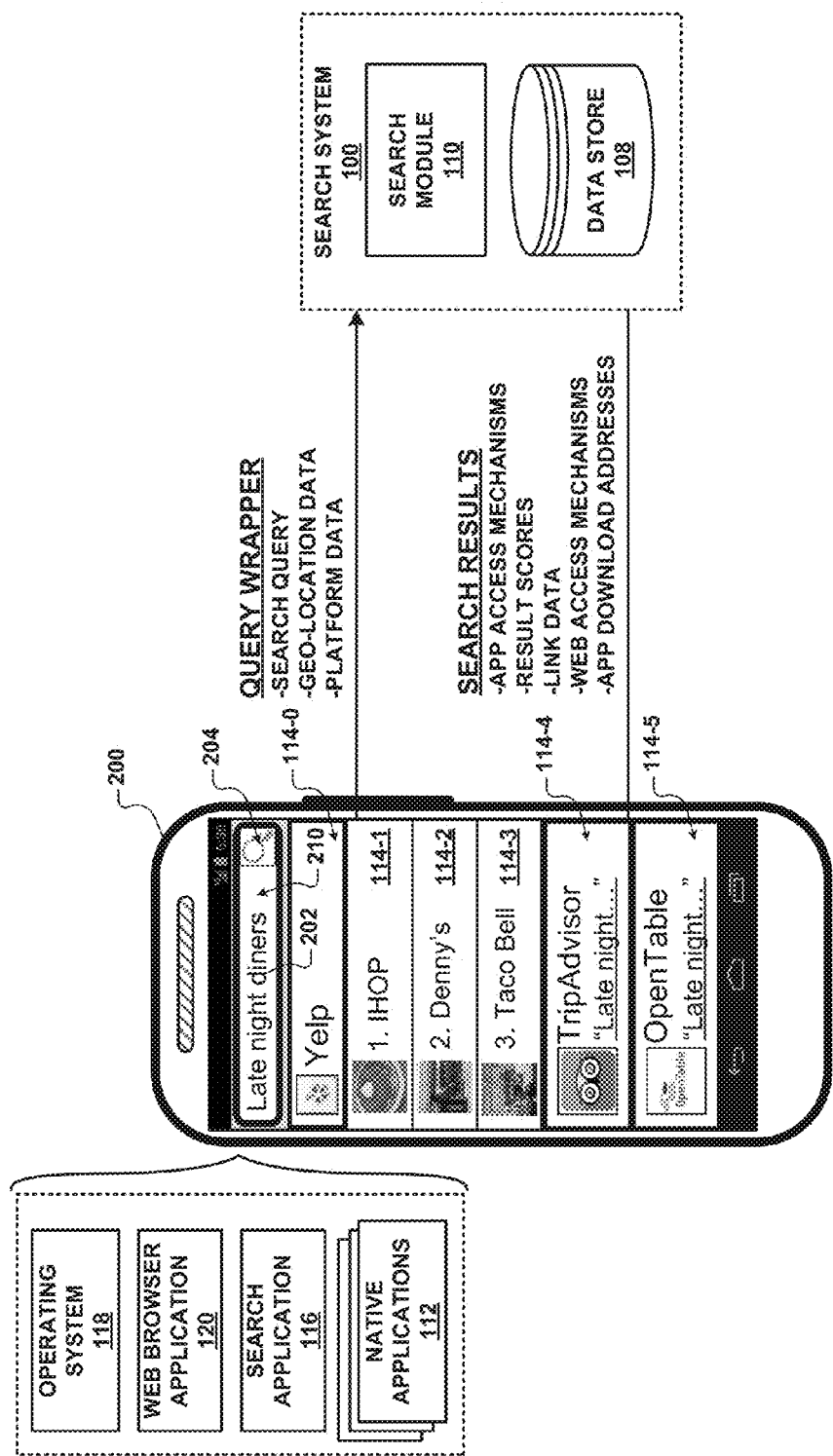
FIG. 2 shows an example user device in communication with a search system.

FIG. 1 is a functional block diagram illustrating an example environment including a search system 100 that communicates with user devices 200 and data sources 104 via a network 106. FIG. 2 shows an example user device 200 in communication with the search system 100 via the network 106 (not shown in FIG. 2). The search system 100 is configured to receive a search query from a user device 200 and perform a search for function records included in a data store 108 based on the search query. The function records include AAMs that can be used by a user device 200 to access different functions for a variety of native applications (e.g., the native applications 112 of FIG. 2) installed on the user device 200. The search system 100 transmits search results including a list of AAMs to the user device 200 that generated the search query.

The user device 200 may generate user selectable links based on the received search results (e.g., the links 114-1, 114-2, . . . , 114-5 of FIG. 2). Each user selectable link displayed to the user may include an AAM. The user may select a link in the search results on the user device 200. In response to selection of a link, the user device 200 may launch the native application referenced by the AAM and perform the one or more operations indicated by the AAM.

A software application may refer to computer software that causes a computing device to perform a task. In some examples, a software application is referred to as an "application," an "app," or a "program." Example applications include, but are not limited to, word processing applications, spreadsheet applications, messaging applications, media streaming applications, social networking applications, and games.

Applications can be executed on a variety of different computing devices. For example, applications can be executed on mobile computing devices, such as smart phones, tablets, and wearable computing devices (e.g., headsets and/or watches). Applications can also be executed on other types of computing devices having other form factors, such as laptop computers, desktop computers, or other consumer electronic devices. In some examples, applications are installed on a computing device prior to a user purchasing the device. In other examples, the user may download and install applications on the computing device.

The functionality of an application may be accessed on the computing device on which the application is installed. Additionally, or alternatively, the functionality of an application may be accessed via a remote computing device. In some examples, all of an application's functionality is included on the computing device on which the application is installed. These applications may function without communication with other computing devices (e.g., via the Internet). In other examples, an application installed on a computing device may access information from other remote computing devices during operation. For example, a weather application installed on a computing device may access the latest weather information via the Internet and display the information to the user through the installed weather application. In still other examples, an application (e.g., a web based application) may be partially executed by the user's computing device and partially executed by a remote computing device. For example, a web application may be an application that is executed, at least in part, by a web server and accessed by a web browser application of the user's computing device. Example web applications include web-based email, online auctions, and online retail sites.

As described above, the search system 100 is configured to receive search queries from one or more user devices 200 via the network 106. A search query may include text, numbers, and/or symbols (e.g., punctuation) entered into the user device 200 by the user. For example, with reference to FIG. 2, the user may have entered a search query 202 into a search field (e.g., a search box) 210 of a search application 116 running on the user device 200. The user may have entered the search query 202 using a user interface such as, for example, a touchscreen keypad, a mechanical keypad, and/or via speech recognition. The user may have caused the user device 200 to transmit the search query 202 to the search system 100 by selecting (e.g., touching, or clicking on) a search button 204 of the search application 116. As described herein, in some examples, the search application 116 is a native application dedicated to search, or a more general application, such as a web browser application.

In some examples, a user device 200 transmits additional data along with the search query. The search query and the additional data may be referred to as a query wrapper. The query wrapper may include data associated with the search query, such as geo-location data (e.g., the location of the user device 200), platform data (e.g., a version of an OS 118 of the user device 200, a device type, and a web-browser version), an identity of a user of the user device 200 (e.g., a username), partner specific data, and other data. The user device 200 transmits the query wrapper to the search system 100. The search system 100 can use the search query and/or the additional data included in the query wrapper to generate the search results.

The search system 100 performs a search for function records included in the data store 108 in response to the received search query. The search system 100 generates search results that include a list of AAMs selected from the function records identified during the search. In some examples, the search system 100 generates result scores for the selected AAMs. Each AAM may be associated with a result score that indicates the rank of the AAM relative to the other AAMs in the list of AAMs. The search system 100 may transmit the result scores to the user device 200 that generated the search query.

In some examples, the search system 100 transmits additional data to the user device 200 along with the AAMs and result scores. For example, the search system 100 may transmit link data (e.g., text and/or images). Link data can refer to data that is to be included in user selectable links on the user device 200. The user device 200 displays the user selectable links to the user. Each user selectable link may be associated with an AAM included in the search results such that when a user selects a link, the user device 200 launches the native application referenced in the AAM and sets the application into the state specified by the AAM. A user may select a link by touching (e.g., tapping) or clicking on the link.

In some examples described herein, the search system 100 transmits one or more WAMs to the user device 200 along with AAMs. WAMs may include web addresses that are accessible via a web browser application 120 of the user device 200, as shown in FIG. 2. In examples where the search system 100 transmits one or more WAMs, the search system 100 may transmit data (e.g., text and/or images) to be included in user selectable links associated with the WAMs. When a user selects a link associated with a WAM, the user device 200 may launch the web browser application 120 and perform the function indicated in the WAM. The generation of search results including WAMs is described herein with respect to FIG. 9.

FIG. 2 shows an example list of search results that may be displayed to a user on a user device 200. The search results include links 114-1, 114-2, . . . , 114-5 (collectively, the "links 114"). Each of the links 114 includes link data. For example, each of the links 114 includes an image (e.g., an application icon) and text (e.g., application name) that describe the corresponding native application and application state (e.g., "IHOP," "Denny's," and "Taco Bell" entries in the native application "YELP®" by Yelp, Inc. (hereinafter, "Yelp")). Each of the links 114 may be associated with an AAM such that when the user selects a link, the user device 200 launches a native application and sets the application into a state that is specified by the AAM associated with the link. As described herein, the links 114 may be arranged for the user based on result scores associated with the AAMs. In some examples, as illustrated in FIG. 2, links for the same native application (e.g., Yelp) are combined together in the search results displayed to the user. For example, as shown in FIG. 2, the Yelp links 114-1, 114-2, and 114-3 are grouped together under a Yelp header 114-0. In other examples, links for different native applications may be mixed instead of grouped.

Referring back to FIG. 1, the search system 100 includes the data store 108 and a search module 110. The data store 108 includes one or more different function records, as described herein. Each function record may include data related to a function of a native application and/or a state of the application resulting from performance of the function. A function record may include a function ID, ASI, and an AAM used to access functionality provided by a native application. The data store 108 may include one or more databases, indices (e.g., inverted indices), tables, files, or other data structures, which may be used to implement the techniques of the present disclosure. The search module 110 receives a search query and generates search results based on the data included in the data store 108.

As described above, the search system 100 may communicate with the user devices 200 and the data sources 104 via the network 106. Examples of the user devices 200, the data sources 104, and the network 106 are now described in turn with reference to FIGS. 1 and 2.

The user devices 200 can be any computing devices that are capable of providing search queries to the search system 100. The user devices 200 include, but are not limited to, smart phones, tablet computers, laptop computers, and desktop computers. The user devices 200 may also include other computing devices having other form factors, such as computing devices included in vehicles, gaming devices, televisions, or other appliances (e.g., networked home automation devices and home appliances).

The user devices 200 may use a variety of different operating systems. In an example where a user device 200 is a mobile device, the user device 200 may run an OS including, but not limited to, ANDROID® developed by Google Inc., IOS® developed by Apple Inc., or WINDOWS PHONE® developed by Microsoft Corporation. Accordingly, the OS 118 running on the user device 200 of FIG. 2 may include one of ANDROID®, IOS®, and WINDOWS PHONE®. In an example where a user device 200 is a laptop or desktop computing device, the user device 200 may run an OS including, but not limited to, MICROSOFT WINDOWS® developed by Microsoft Corporation, MAC OS® developed by Apple Inc., or LINUX® (LINUX® is the registered trademark of Linus Torvalds in the U.S. and other countries). The user devices 200 may also access the search system 100 while running operating systems other than those described above, whether presently available or developed in the future.

The user devices 200 can communicate with the search system 100 via the network 106. In some examples, a user device 200 communicates with the search system 100 using a native application installed on the user device 200 (e.g., the search application 116). In general, a user device 200 may communicate with the search system 100 using any application that can transmit search queries to the search system 100. In some examples, a user device 200 runs an application that is dedicated to interfacing with the search system 100, such as an application dedicated to searches (e.g., the search application 116). In other examples, a user device 200 may communicate with the search system 100 using a more general application, such as a web-browser application. The application run by a user device 200 to communicate with the search system 100 may display a search field 210 on a graphical user interface (GUI) in which the user may enter search queries. The user may enter a search query using a touchscreen or physical keyboard, a speech-to-text program, or other form of user input.

In general, a search query may be a request for information retrieval (e.g., search results) from the search system 100. For example, a search query may be directed to retrieving a list of links to native application functionality or application states in examples where the search system 100 is configured to generate a list of AAMs as search results. A search query directed to retrieving a list of links to native applications may indicate a user's desire to access functionality of one or more native applications described by the search query.

A user device 200 may receive a set of search results from the search system 100 that are responsive to the search query transmitted to the search system 100. The user device 200 may run a search application 116 including a GUI that displays the search results received from the search system 100. For example, the search application 116 used to transmit the search query to the search system 100 may also display the received search results to the user.

The GUI of the search application 116 running on the user device 200 may display the search results to the user in a variety of different ways, depending on what information is transmitted to the user device 200. In examples where the search results include a list of AAMs, the search system 100 may transmit the list of AAMs to the user device 200 along with additional data to be displayed in user selectable links.

In some examples, the GUI displays the search results to the user as a list of user selectable links including text and images. The text and images in the links may include the native application names associated with the AAMs, text describing the AAMs, images associated with the native application referenced by the AAMs (e.g., application icons), and images associated with the application states (e.g., application screen images) defined by the AAMs.

In some examples, the GUI displays the search results as a list of links (e.g., the links 114 of FIG. 2) arranged under the search field (e.g., the search field 210 of FIG. 2) in which the user entered the search query. The user device 200 may arrange the links in order by result scores associated with the links. In other words, the user device 200 may arrange the links in order by the result scores associated with the AAMs included in the links. In some examples, the user device 200 groups the links together if the links are related to a same native application.

In some examples, user devices 200 communicate with the search system 100 via a partner computing system (not illustrated). The partner computing system may be a computing system of a third party that may leverage the search functionality of the search system 100. The partner computing system may belong to a company or organization other than that which operates the search system 100. Example third parties, which may leverage the functionality of the search system 100 may include, but are not limited to, Internet search providers and wireless communications service providers. The user devices 200 may send search queries to the search system 100 and receive search results via the partner computing system. The partner computing system provides a user interface to the user devices 200 in some examples and/or modifies the search experience provided on the user devices 200.

FIG. 1 shows a plurality of data sources 104. The data sources 104 may be sources of data, which the search system 100 may use to generate and update the data store 108. For example, the search system 100 may use the data to update one or more databases, indices, tables, files, or other data structures included in the data store 108. The search system 100 may generate new function records and update existing function records based on data retrieved from the data sources 104. Although not illustrated in FIG. 1, the search system 100 may include modules that generate new function records and update existing function records based on the data retrieved from the data sources 104. In some examples, some data included in the data store 108 are manually generated by a human operator.

The data sources 104 may include a variety of different data providers. The data sources 104 may include data from application developers, such as application developers' websites and data feeds provided by developers. The data sources 104 may include operators of digital distribution platforms configured to distribute applications to user devices 200. The data sources 104 may also include other websites, such as websites that include web logs (i.e., blogs), application review websites, or other websites including data related to applications. Additionally, the data sources 104 may include social networking sites, such as "FACEBOOK®" by Facebook, Inc. (e.g., Facebook posts) and "TWITTER®" by Twitter, Inc. (e.g., text from tweets). The data sources 104 may also include online databases that include, but are not limited to, data related to movies, television programs, music, and restaurants. The data sources 104 may also include additional types of data sources in addition to the data sources described above. Different data sources may have their own content and update rates.

The search system 100 retrieves data from one or more of the data sources 104. The retrieved data can include any type of data related to application functionality and/or states. The search system 100 generates function records based on the data retrieved from the data sources 104. In some examples, some data included in the function records (e.g., ASI) is manually generated by a human operator. The data included in the function records may be updated over time so that the search system 100 provides up-to-date search results.

As described above, the user devices 200, search system 100, and data sources 104 may communicate with one another via the network 106. The network 106 may include various types of networks, such as a wide area network (WAN) and/or the Internet. Although the network 106 may represent a long range network (e.g., Internet or WAN), in some implementations, the network 106 includes a shorter range network, such as a local area network (LAN). In some implementations, the network 106 uses standard communications technologies and/or protocols. Thus, the network 106 can include links using technologies, such as Ethernet, Wireless Fidelity (WiFi) (e.g., 802.11), worldwide interoperability for microwave access (WiMAX), 3G, Long Term Evolution (LTE), digital subscriber line (DSL), asynchronous transfer mode (ATM), InfiniBand, PCI Express Advanced Switching, etc. Similarly, the networking protocols used on the network 106 can include multiprotocol label switching (MPLS), the transmission control protocol/Internet protocol (TCP/IP), the User Datagram Protocol (UDP), HTTP, the simple mail transfer protocol (SMTP), the file transfer protocol (FTP), etc. The data exchanged over the network 106 can be represented using technologies and/or formats including the hypertext markup language (HTML), the extensible markup language (XML), etc. In addition, all or some of the links can be encrypted using conventional encryption technologies, such as secure sockets layer (SSL), transport layer security (TLS), virtual private networks (VPNs), Internet Protocol security (IPsec), etc. In other examples, the network 106 can use custom and/or dedicated data communications technologies instead of, or in addition to, the ones described above.

Figure 3A:
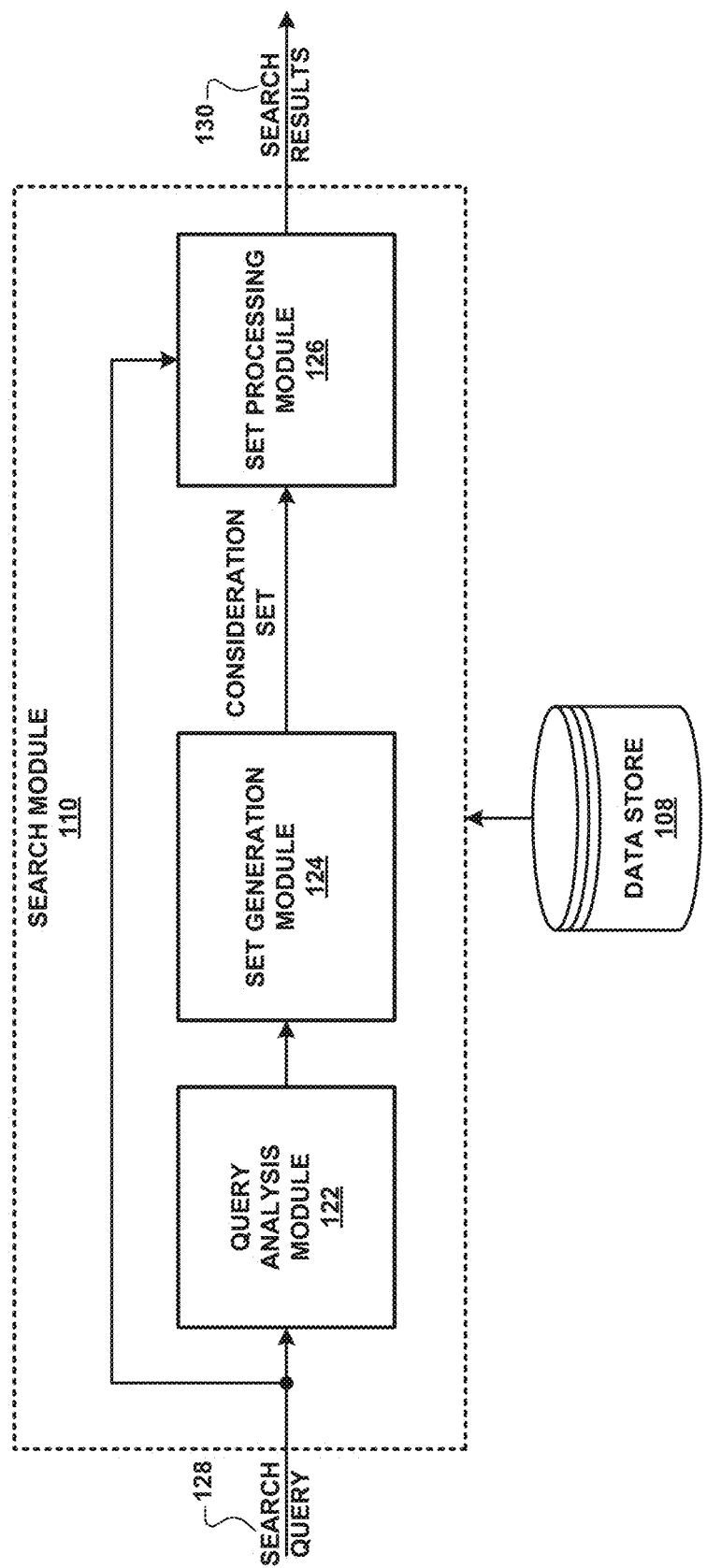
FIG. 3A is a functional block diagram of an example search module.

FIG. 3A shows an example search module 110, which may be included in the search system 100. The search module 110 includes a query analysis module 122, a consideration set generation module 124 (hereinafter, the "set generation module 124"), and a consideration set processing module 126 (hereinafter, the "set processing module 126"). The query analysis module 122 receives a query wrapper including a search query 128. The query analysis module 122 analyzes the received search query 128. The set generation module 124 identifies a set of function records based on the received search query 128. The identified set of function records may be referred to herein as a "consideration set." The set processing module 126 processes (e.g., scores) the consideration set to generate a set of search results 130 that include a list of AAMs selected from the function records of the consideration set.

Figure 3C:
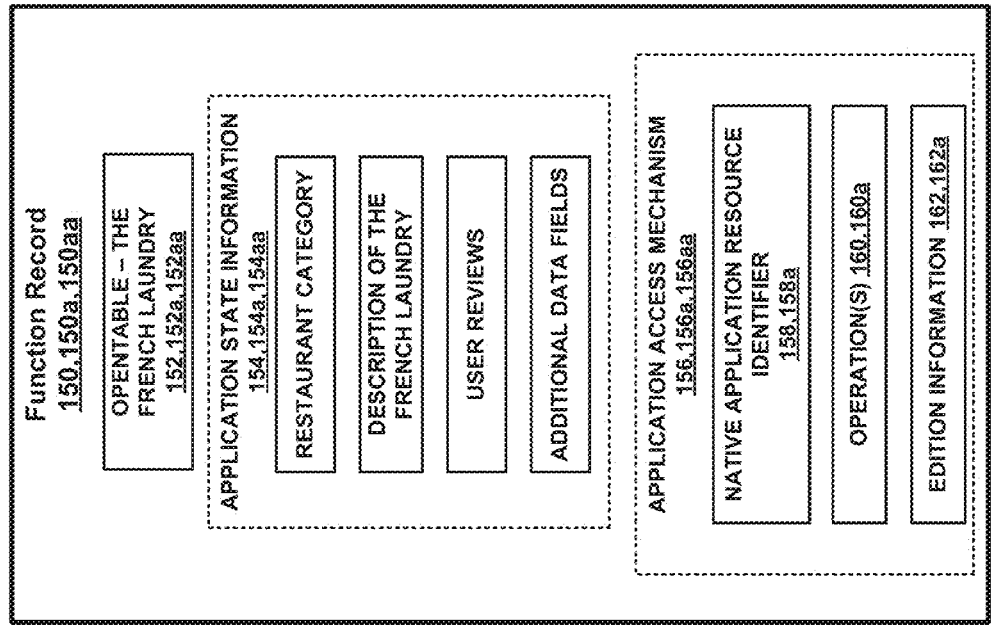
FIGS. 3B and 3C show example function records.
Figure 3B:
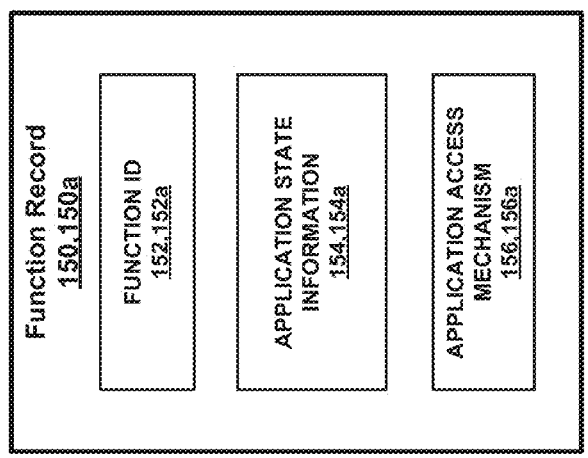

Referring now to FIG. 3B, an example function record 150, 150a includes a function ID 152, 152a, ASI 154, 154a, and an AAM 156, 156a. The function record 150a may include data related to a function of a native application and/or a state of the application resulting from performance of the function. The data store 108 may include one or more function records each having a similar structure as the function record 150a. Put another way, the data store 108 may include one or more function records each having a function ID, ASI, and an AAM.

The function ID 152a may be used to identify the function record 150a among other function records 150 included in the data store 108. The function ID 152a may be a string of alphabetic, numeric, and/or symbolic characters (e.g., punctuation marks) that uniquely identify the function record 150a. In some examples, the function ID 152a describes a function and/or an application state in human readable form. For example, the function ID 152a may include the name of the native application referenced by the AAM 156a. Additionally, or alternatively, the function ID 152a may be a human readable string that describes a function performed according to the AAM 156a and/or an application state resulting from performance of the function according to the AAM 156a. In some examples, the function ID 152a includes a string in the format of a URL of a WAM for the function record 150a, which may uniquely identify the function record, as described with respect to FIG. 9.

In a more specific example, if the function record 150a describes a function of Yelp, the function ID 152a may include the name "Yelp" along with a description of an application state of Yelp specified by the function record 150a and described by the ASI 154a. For example, if the function record 150a describes an entry in Yelp for the restaurant "The French Laundry®" (hereinafter, "The French Laundry"), the function ID 152a may be "Yelp—The French Laundry." In an example where the function ID 152a includes a string in the format of a URL, the function ID 152a may include the following string "www.yelp.com/biz/the-french-laundry-yountville-2?ob=1" to uniquely identify the function record 150a.

The ASI 154a may include data that describes an application state into which a native application is set according to the AAM 156a included in the function record 150a. Additionally, or alternatively, the ASI 154a may include data that describes the function performed according to the AAM 156a. The ASI 154a may include a variety of different types of data. For example, the ASI 154a may include structured, semi-structured, and/or unstructured data. The ASI 154a may be extracted or inferred from documents retrieved from the data sources 104. In some examples, the ASI 154a includes data that is manually generated. The ASI 154a may be updated so that up-to-date search results 130 can be provided in response to a user search query 128.

In some examples, the ASI 154a includes data that is presented to the user when the native application is in the application state defined by the AAM 156a. For example, the ASI 154a may include data that describes a state of the native application after the user device 200 has performed the one or more operations indicated by the AAM 156a. In one example, if the function record 150a is associated with a shopping application, the ASI 154a may include data that describes products (e.g., names and prices) that are shown when the application is set to the application state defined by the AAM 156a of the function record 150a. As another example, if the function record 150a is associated with a music player application, the ASI 154a may include data that describes a song (e.g., name and artist) that is played when the application is set to the application state defined by the AAM 156a of the function record 150a.

The types of data included in the ASI 154a may depend on the type of information associated with the application state and the functionality defined by the AAM 156a. In one example, if the function record 150a is for a native application that provides reviews of restaurants, the ASI 154a may include information (e.g., text and numbers) related to a restaurant, such as a category of the restaurant, reviews of the restaurant, and a menu for the restaurant. In this example, the AAM 156a may cause the native application to launch and retrieve information for the restaurant. As another example, if the function record 150a is for a native application that plays music, the ASI 154a may include information related to a song, such as the name of the song, the artist, lyrics, and listener reviews. In this example, the AAM 156a may cause the native application to launch and play the song described in the ASI 154a.

The AAM 156a may include an ARI and/or one or more operations for a user device 200 to perform. For example, an ARI may be a string having an application specific scheme. The ARI may include a reference to a native application and indicate one or more operations for the user device 200 (e.g., the application) to perform. For example, the ARI may include a reference to a native application, a domain name, and a path to be used by the application to retrieve and display information to the user.

An example ARI for the native application "OPENTABLE®" by OpenTable, Inc. (hereinafter, "OpenTable") on the ANDROID® OS is "vnd.opentable.deeplink:// opentable.com/restaurant/profile?rid=88333&refid=1." A portion of the example ARI references OpenTable. For example, the substring "vnd.opentable.deeplink" of the ARI references OpenTable. The example ARI also indicates one or more operations for OpenTable to perform. For example, OpenTable may retrieve and display the information included in the ARI domain and path defined by the substring "opentable.com/restaurant/ profile?rid=88333&refid=1." In response to receiving the ARI, a user device 200 may launch OpenTable and display information retrieved from the location indicated in the ARI. The ARI may be provided by an app developer, for example.

In some examples, the AAM 156a includes operations for the user device 200 to perform in addition to the operation(s) indicated in the ARI. For example, the search application 116 on the user device 200, the OS 118 of the user device 200, and/or a native application installed on the user device 200 may perform the operations included in the AAM 156a to set the native application into an application state specified by the AAM 156a. In some examples, the operations are included in a script. Examples of operations may include, but are not limited to, launching a native application, waiting for the application to start, creating and sending a search request to a server associated with the application, setting a current geo-location in a native application, making a restaurant reservation, sending a text message, and adding an appointment to a calendar.

In some examples, the AAM 156a does not include an ARI. Instead, the AAM 156a can include one or more other operations that reference a native application. The operations may be performed by the user device 200. The operations may include instructions for at least one of the search application 116, the OS 118, and a native application on the user device 200. In response to selection of the AAM 156a, the user device 200 may perform the operations included in the AAM 156a. In some examples, the operations are included in a script.

The AAM 156a may also include edition information 162, 162a that indicates the native application edition with which the AAM 156a is compatible. For example, the edition information 162, 162a may indicate the OS with which the AAM 156a is compatible. In some examples, the search system 100 can determine whether to transmit the AAM 156a in the search results 130 based on whether the user device 200 (e.g., the OS 118) can handle the AAM 156a. As one example, the search system 100 may transmit the edition information 162, 162a for the AAM 156a to the user device 200. In the event the user device 200 does not include the native application edition (e.g., for a particular OS) with which the AAM 156a is compatible, the user device 200 may not display a user selectable link for the AAM 156a. In some examples, e.g., in instances where none of the AAM(s) of the function record 150a is compatible with the user device 200 but where the function record 150a also includes a WAM, the user device 200 instead displays a user selectable link for the WAM. In other examples, in cases where the user device 200 does not include the native application edition with which the AAM 156a is compatible, the user device 200 may display a download and install user selectable link for the native application edition to the user. Upon the user selecting the link, the user device 200 may download and install the native application edition, launch the application edition, and set the application edition into an application state specified by the AAM 156.

In some examples, an ARI is an application specific resource identifier that is defined by a developer of a native application. In this example, the search application 116 receives the ARI and the OS 118 may send the ARI to the native application referenced in the ARI. The native application launches and is set into the state specified by the ARI.

In some examples, a native application function is not accessible using an ARI. For example, a function of the native application may not include a corresponding ARI that the application may use to perform the function. As another example, some native applications may not be configured to receive ARIs. In these examples, an AAM for a native application can include one or more operations that cause the application to perform the function that may not otherwise be accessible using an ARI. For example, the search application 116 may receive the one or more operations and execute the operations to set the native application into the desired application state. In a specific example, the one or more operations may include launching the native application along with additional operations for the application to perform. For example, the search application 116 may initially trigger the native application to start the application, and then wait for a period of time for the application to start. Then the search application 116 may perform additional operations included in the received AAM, such as issuing a search instruction to the native application.

In still other examples, a native application may be configured to directly receive the operations transmitted by the search system 100. In these examples, the native application may be launched according to the AAM and then the launched application may directly perform the operations received from the search system 100.

A single native application can provide a variety of different functionalities. For example, a restaurant reservation application can access reviews for a variety of different restaurants and set up reservations at a variety of different restaurants. Similarly, a travel application can book hotels, book flights, and provide reviews for different travel destinations. The different functionalities associated with a single native application may be accessed using a plurality of different AAMs. For example, with respect to the restaurant reservation application, the data store 108 may include function records having different AAMs for accessing different restaurant reviews and setting up reservations. Similarly, the data store 108 may include function records having different AAMs for booking hotels, booking flights, and accessing reviews for different travel destinations.

The AAMs for a single native application may vary in complexity. In some examples, the AAMs cause a native application to launch (e.g., the OS 118 may be instructed to launch the application) and then perform additional operations after launching, as described above. In other examples, the AAMs may cause a native application to launch into a default state (e.g., a default homepage) without performing any additional operations. A function record including an AAM that causes a native application to launch into a default state may be thought of as an AAM that is related to the application, but not to any particular state that may be accessed by the application. A function record including such an AAM may include ASI describing the native application, instead of any particular application state. For example, the ASI may include the name of the developer of the native application, the publisher of the application, a category (e.g., genre) of the application, a description of the application (e.g., a developer's description), and the price of the application. The ASI may also include security or privacy data about the native application, battery usage of the application, and bandwidth usage of the application. The ASI may also include application statistics. Application statistics may refer to numerical data related to a native application. For example, application statistics may include, but are not limited to, a number of downloads, a download rate (e.g., downloads per month), a number of ratings, and a number of reviews.

FIG. 3C shows an example function record 150, 150a, 150aa associated with OpenTable. OpenTable is a restaurant-reservation application that allows users to search for restaurants and make restaurant reservations. OpenTable provides information about restaurants, including descriptions of restaurants and user reviews of the restaurants. The example function record 150aa of FIG. 3C describes an application state of OpenTable in which OpenTable accesses information for the restaurant The French Laundry.

The function record 150aa includes a function ID "Opentable—The French Laundry" indicated at 152aa, which may uniquely identify the function record 150aa. In other examples, the function ID 152aa could include a URL as a unique identifier for the function record 150aa. For example, the function ID 152aa may include the string "http://www.opentable.com/the-french-laundry" as a unique identifier for the function record 150aa. Such a function ID may be included in a WAM of a function record. In another example, the function ID 152aa could be a string of characters, numbers, and/or symbols that are not in human readable form.

The function record 150aa includes ASI 154aa. The ASI 154aa includes data fields for a restaurant category of the French Laundry, a description of the French Laundry, user reviews of the French Laundry, and additional data fields. The restaurant category field may include the text "French cuisine" and "contemporary," for example. The description field may include text that describes The French Laundry. The user reviews field may include text of user reviews for The French Laundry. The additional data fields may include additional data for The French Laundry that may not specifically fit within the other defined fields, such as a menu for the restaurant, prices, and operating hours for the restaurant.

The function record 150aa includes an AAM 156aa. The AAM 156aa may include a reference to OpenTable along with one or more operations to be performed by a user device 200. For example, the AAM 156aa may include a native ARI 158, 158a and/or one or more operations 160, 160a that cause the user device 200 to access the entry for The French Laundry in OpenTable. An example ARI 158a may be "vnd.opentable.deeplink://opentable.com/restaurant/profile?rid=1180&refid=1."

Referring back to FIG. 3A, the search query 128 received by the search module 110 is used to perform a search of the data store 108. The query analysis module 122 receives the search query 128. The query analysis module 122 may perform various analysis operations on the received search query 128. For example, analysis operations performed by the query analysis module 122 may include, but are not limited to, tokenization of the search query 128, filtering of the search query 128, stemming, synonymization, and stop word removal.

The set generation module 124 identifies a set of function records (i.e., the consideration set) based on the search query 128. In some examples, the set generation module 124 identifies the set of function records based on one or more matches between one or more terms of the search query 128 and one or more terms included in the function records. For example, the set generation module 124 may identify a set of function records in the data store 108 based on matches between tokens generated by the query analysis module 122 and words included in the function records, e.g., in the ASI and/or function IDs of the function records.

The set processing module 126 processes the consideration set to generate a set of search results 130 that includes a list of AAMs. In some examples, the set processing module 126 scores the functions records included in the consideration set. The scores associated with the function records may be referred to as "result scores." Accordingly, in some examples, each function record of the consideration sets has a corresponding result score. The set processing module 126 may then select one or more function records from the consideration set based on the result scores associated with the function records. For example, the set processing module 126 may select the highest scoring one or more function records of the consideration set.

The set processing module 126 selects AAMs from the selected function records (e.g., the highest scoring function records). The set processing module 126 transmits the selected AAMs to the user device 200 that generated the search query 128. The set processing module 126 may also transmit the result scores associated with the AAMs. For example, an AAM may be associated with the result score of the function record from which the AAM was selected.

The information conveyed by the search results 130 may depend on how the result scores are calculated by the set processing module 126. For example, the result scores may indicate the relevance of an application function or state to the search query 128, the popularity of an application function or state, or other properties of the application function or state, depending on what parameters the set processing module 126 uses to score the function records.

The set processing module 126 may generate result scores for function records in a variety of different ways. In some examples, the set processing module 126 generates a result score for a function record based on one or more scoring features. The scoring features may be associated with the function record and/or the search query 128. A function record scoring feature (hereinafter, "record scoring feature") may be based on any data associated with a function record. For example, record scoring features may be based on any data included in ASI of a function record. Example record scoring features may be a quality score and whether the function record includes an AAM that leads to a default state or a deeper application state. A query scoring feature may include any data associated with the search query 128. For example, query scoring features may include a number of words in the search query 128, popularity of the search query 128, and an expected frequency of the words in the search query 128. A record-query scoring feature may include any data that may be generated based on data associated with both the function record and the search query 128 that resulted in identification of the function record by the set generation module 124. For example, record-query scoring features may include parameters that indicate how well terms of the search query 128 match terms of ASI of the identified function record. The set processing module 126 may generate a result score for a function record based on at least one of the record scoring features, the query scoring features, and the record-query scoring features.

The set processing module 126 may determine a result score based on one or more of the scoring features listed herein and/or additional scoring features not explicitly listed. In some examples, the set processing module 126 includes one or more machine-learned models (e.g., a supervised learning model) configured to receive one or more scoring features. The one or more machine-learned models may generate result scores based on at least one of the record scoring features, the query scoring features, and the record-query scoring features. For example, the set processing module 126 may pair the search query 128 with each function record and calculate a vector of features for each (query, record) pair. The vector of features may include one or more record scoring features, one or more query scoring features, and one or more record-query scoring features. The set processing module 126 may then input the vector of features into a machine-learned regression model to calculate a result score for the function record. In some examples, the machine-learned regression model includes a set of decision trees (e.g., gradient boosted decision trees). In another example, the machine-learned model may be trained by a simple form of logistic regression. In some examples, the machine-learned task described above can be framed as a semi-supervised learning task, where a minority of the training data is labeled with human curated scores and the rest of the data is used without human labels.

The result scores associated with the AAMs may be used in a variety of different ways. In some examples, the result scores associates with the AAMs are used to rank the list of the AAMs. In these examples, a higher result score may indicate that the AAM (e.g., the function or application state) is more relevant to a user than an AAM having a smaller result score. In examples where the search results 130 are displayed as a list on a user device 200, the links for AAMs associated with larger result scores may be listed closer to the top of the results list (e.g., near to the top of the screen). In these examples, links for AAMs having lower result scores may be located farther down the list (e.g., off screen) and may be accessed by scrolling down the screen of the user device 200. In some examples, as illustrated in FIG. 2, the user device 200 groups together the links associated with the same native application.

Figure 4A:
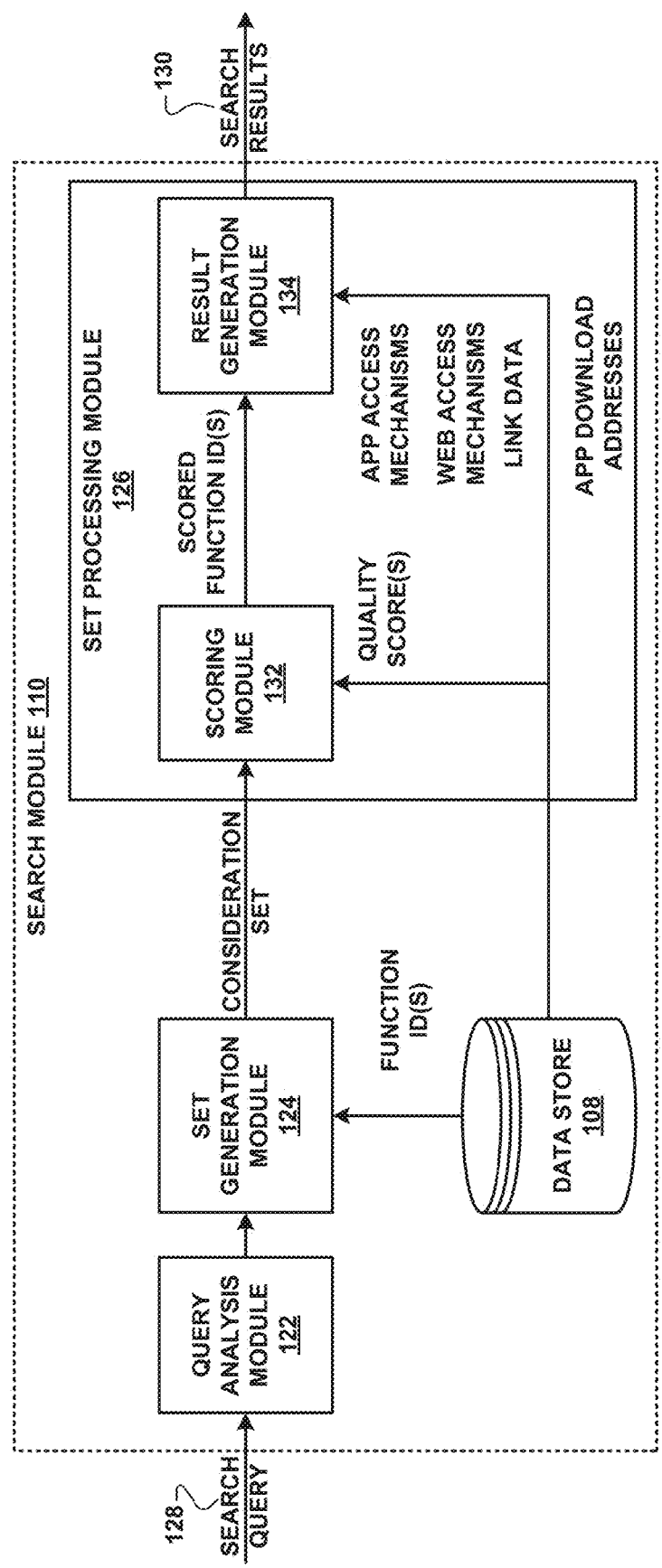
FIG. 4A is a functional block diagram of another example search module.

FIG. 4A is a functional block diagram of another example of the search module 110 described above with reference to FIG. 3A. Like the search module 110 of FIG. 3A, the search module 110 of FIG. 4A also includes the query analysis module 122, the set generation module 124, and the set processing module 126. In the example of FIG. 4A, the query analysis module 122 receives a query wrapper that includes a search query 128 from one of the user devices 200 and analyzes the received search query 128. Also in this example, the set generation module 124 identifies a consideration set of one or more function records (e.g., the function record 150*b* or 150*c* of FIGS. 4B and 4C) included in the data store 108 based on the received search query 128. For example, the set generation module 124 may identify the function records of the consideration set based on matches between terms of function IDs and/or ASI included in the function records and terms of the received search query 128. In the example of FIG. 4A, the set generation module 124 retrieves one or more function IDs that correspond to the identified function records of the consideration set from the data store 108. In this example, the consideration set includes the function ID(s) of the identified function records, rather than the function records themselves. In other examples, the set generation module 124 may retrieve the function records of the consideration set from the data store 108 in their entirety. In these examples, the consideration set may include the function records. In any case, as described in greater detail below, the set processing module 126 processes (e.g., scores) the consideration set to generate search results 130 that include one or more AMs (e.g., AAMs, WAMs, and ADAs) selected from the function records of the consideration set.

As shown in FIG. 4A, the set processing module 126 includes a scoring module 132 and a result generation module 134. In the example of FIG. 4A, the scoring module 132 receives the consideration set from the set generation module 124. In this example, the scoring module 132 receives the function ID(s) that correspond to the function records of the consideration set from the set generation module 124. In other examples, the scoring module 132 may receive the function records of the consideration set in their entirety, as described above. Also in this example, the scoring module 132 receives one or more quality scores associated with the function records of the consideration set. Specifically, as shown in FIG. 4A, the scoring module 132 retrieves the quality scores from the data store 108. In some examples, the quality scores are included in the function records of the consideration set. In other examples, the quality scores may be stored in other data structures included in the data store 108. The scoring module 132 scores the function records of the consideration set using the quality scores in the manner described above with reference to FIG. 3A. As shown in FIG. 4A, upon scoring the function records of the consideration set, the scoring module 132 generates one or more scored function IDs that correspond to the scored function records and transmits the scored function ID(s) to the result generation module 134, which is described in greater detail below.

As also shown in FIG. 4A, the result generation module 134 receives the scored function ID(s) that correspond to the scored function records of the consideration set from the scoring module 132. The result generation module 134 then generates the search results 130 that include the AMs (e.g., AAMs, WAMs, and ADAs) selected from the scored function records. As one example, the result generation module 134 may identify the scored function records in the data store 108 using the received scored function ID(s). The result generation module 134 may then select one or more AMs from the identified scored function records and transmit some or all of the AMs as the search results 130 to the user device 200. As another example, the result generation module 134 may identify one or more access tables (e.g., access table 174, 174*a* of FIG. 4D) in the data store 108, or in another data store, using the received scored function ID(s). The result generation module 134 may then select one or more AMs from the identified access tables and transmit some or all of the AMs as the search results 130 to the user device 200. The result generation module 134 may also retrieve link data associated with the AMs and transmit the link data to the user device 200 along with the search results 130. For example, the link data may be stored in the scored function records, or in other data structures included in the data store 108, or in another data store. The user device 200 may use the link data to generate one or more user selectable links for the AMs.

Figure 4C:
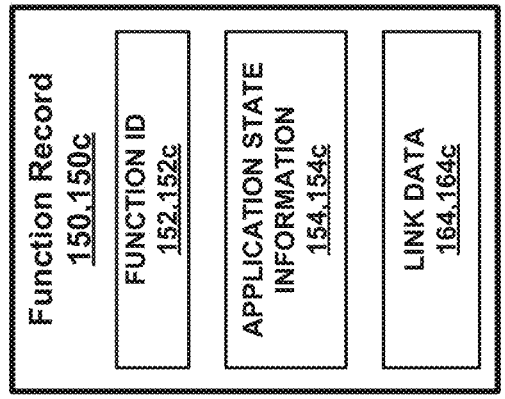
FIGS. 4B and 4C show other example function records.
Figure 4B:
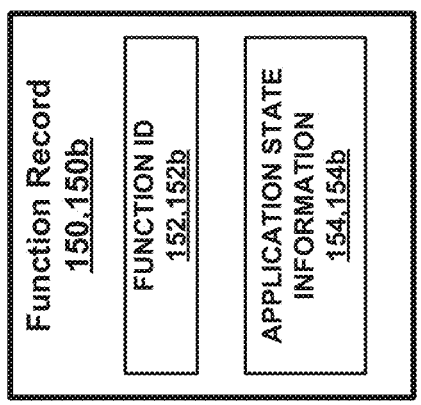

FIGS. 4B and 4C illustrate other example function records 150b and 150c that may be included in the data store 108 of the search system 100. Specifically, the search module 110 of FIG. 4A may use the function records 150b and 150c to generate the search results 130 in response to receiving the search query 128 from the user device 200, as described above with reference to FIG. 4A. As shown in FIG. 4B, the function record 150b includes a function ID 152b and ASI 154b. As shown in FIG. 4C, the function record 150c includes a function ID 152c, ASI 154c, and link data 164, 164c. The function records 150b and 150c include data that is similar to that of the function record 150a described above with respect to FIG. 3B. In contrast to the function record 150a, the function records 150b and 150c do not include AMs (e.g., AAMs, WAMs, or ADAs). Instead, the AMs that correspond the function records 150b and 150c are included in access tables (e.g., the access table 174, 174a), which are described below with respect to FIGS. 4D and 4E.

Referring again to FIG. 4A, the set generation module 124 may identify the consideration set based on the received search query 128 such that the consideration set includes one of the function records 150b and 150c. For example, the set generation module 124 may identify the function record 150b or 150c based on matches between terms of the function ID 152b or 152c and/or ASI 154b or 154c and terms of the received search query 128, as described above. As explained below with reference to FIGS. 4D and 4E, the set processing module 126 processes (e.g., scores) the consideration set including the function record 150b or 150c and generates the search results 130 that include one or more AMs (e.g., AAMs, WAMs, and ADAs) selected from one or more access tables (e.g., the access table 174a of FIG. 4D) that are associated with the function record 150b or 150c.

FIGS. 4D and 4E illustrate example access tables 174a and 174b that may be included in the data store 108 of the search system 100. Specifically, the search module 110 of FIG. 4A may use each of the access tables 174a and 174b along with a function record (e.g., the function record 150b or 150c) associated with the respective access table to generate search results 130 in response to receiving a search query 128, as described above with reference to FIGS. 4A-4C.

As explained herein, the data store 108 may include one or more databases, indices (e.g., inverted indices), tables, files, or other data structures that may be used to implement the disclosed techniques. In some examples, the data store 108 also includes one or more access tables that each includes one or more different AMs (e.g., one or more AAMs, WAMs, and ADAs). For example, the access table 174a of FIG. 4D includes a function ID 176a, AAMs 1-N 178a, WAMs 1-M 180a, and ADAs 1-P 182, 182a, where N, M, and P each represent an integer value that is greater than or equal to 1. The function ID 176a may serve as a unique identifier for the access table 174a and associate the access table 174a with a function record included in the data store 108 and having the same function ID. In this example, in response to receiving a search query 128 from a user device 200, the search system 100 may identify and score a consideration set of one or more function records, as described above. The consideration set may include a function record that has the function ID 176a. The search system 100 may identify the access table 174a using the function ID 176a of the identified function record and select one or more AMs (e.g., AAM(s), WAM(s), and/or ADA(s)) from the access table 174a. The search system 100 may transmit the AMs to the user device 200.

The access table 174b of FIG. 4E represents a specific example of the access table 174a of FIG. 4D for a function record having a function ID 186 "http://www.yelp.com/search?find_desc=dentists." As shown in FIG. 4E, the access table 174b includes multiple AAMs 178ba-178bc, multiple WAMs 180ba-190bb, and multiple ADAs 182, 182ba-182bc. In the example of FIG. 4E, the AAMs 178ba-178bc correspond to AAMs for the ANDROID® OS, the IOS® OS, and the WINDOWS PHONE® OS, respectively. Also in this example, the WAMs 180ba-180bb correspond to WAMs for the desktop and mobile web-based application versions of Yelp, respectively. Additionally, the ADAs 182ba-182bc shown in FIG. 4E correspond to ADAs for the native application versions of Yelp provided by the GOOGLE PLAY®, ITUNES®, and WINDOWS PHONE® digital distribution platforms, respectively.

Figure 5:
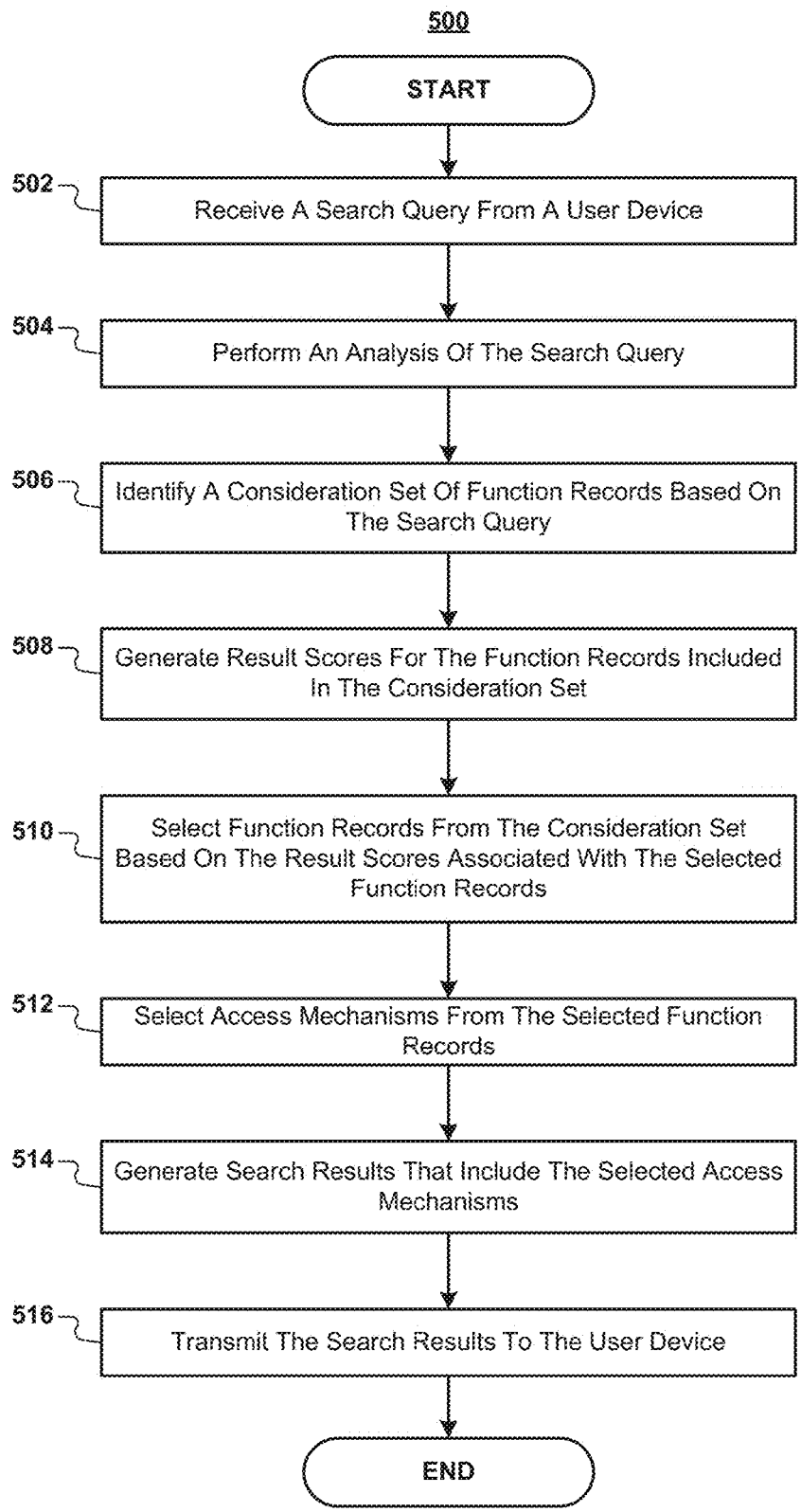
FIG. 5 is a flow diagram illustrating an example method for performing a search for function records based on a search query received from a user device.

FIG. 5 shows an example method 500 for performing a search for function records (e.g., any of the function records 150 described with reference to FIGS. 3B, 4B, 4C, 8A, and 9-11) based on a search query 128 received from a user device 200. The method 500 is described with reference to the search module 110 of FIGS. 3A and 4A and the various components thereof. In block 502, the query analysis module 122 receives a search query 128 from (e.g., generated by) a user device 200. For example, a user of the user device 200 may have entered the search query 128 into a GUI of a search application 116 included on the user device 200. The user may have then caused the user device 200 to transmit the search query 128 to the query analysis module 122 by interacting with the GUI. In block 504, the query analysis module 122 performs an analysis of the search query 128. For example, the query analysis module 122 may perform one or more of tokenization, filtering, stemming, synonymization, and stop word removal with respect to the search query 128.

In block 506, the set generation module 124 identifies a consideration set of one or more function records included in the data store 108 based on the search query 128 (e.g., based on an output of the query analysis module 122). In blocks 508-510, the set processing module 126 processes the consideration set of function records. Specifically, in block 508, the set processing module 126 generates one or more result scores for the function records included in the consideration set. For example, the set processing module 126 may generate a result score for each function record included in the consideration set. In block 510, the set processing module 126 selects one or more function records from the consideration set based on the result scores associated with the selected function records. For example, the set processing module 126 may select one or more function records having the highest (e.g., largest) result scores.

In block 512, the set processing module 126 selects one or more AMs from the selected function records. For example, the set processing module 126 may select one or more AAMs, WAMs, and/or ADAs from each of the selected function records. In block 514, the set processing module 126 generates search results 130 that include the selected AMs. For example, the set processing module 126 may generate the search results 130 such that the search results 130 include one or more of the AMs selected from each selected function record. In block 516, the set processing module 126 transmits the search results 130 to the user device 200 that generated the search query 128.

Figure 6:
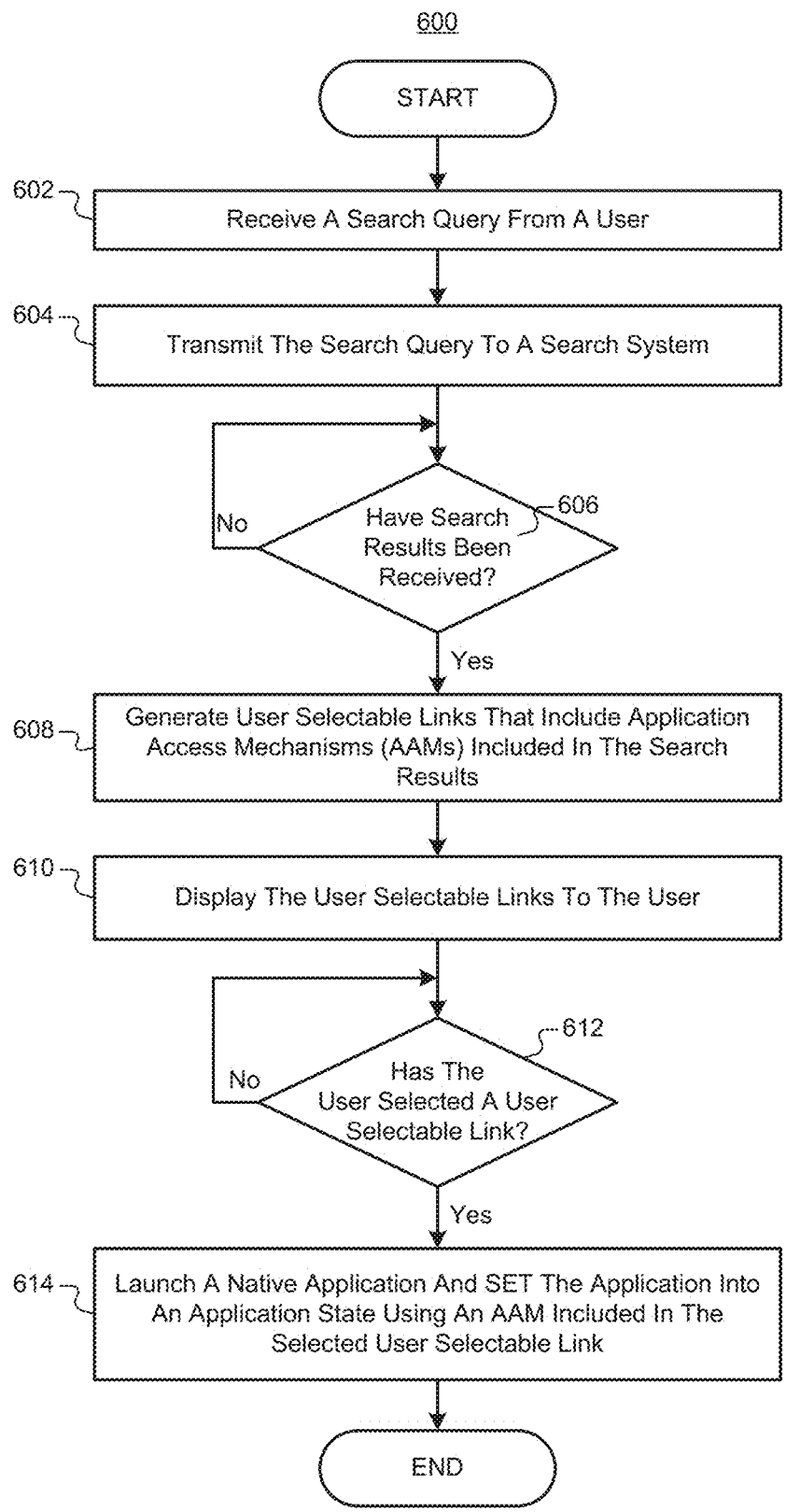
FIG. 6 is a flow diagram illustrating an example method describing operation of a user device.

FIG. 6 shows an example method 600 describing operation of one of the user devices 200. It may be assumed that the user device 200 described according to the method 600 includes a search application 116 (e.g., a native application, or web browser implementation) that is configured to communicate with the search system 100. It may also be assumed that the search application 116 running on the user device 200 generates a GUI that receives search queries 128 from users of the user device 200, and displays search results 130 received by the user device 200 from the search system 100 in response to the user device 200 transmitting the search queries 128 to the search system 100. The method 600 is described with reference to the search system 100 and one of the user devices 200 of FIGS. 1 and 2, and the various components thereof.

In block 602, the search application 116 receives a search query 128 from a user of the user device 200. For example, the user may have entered the search query 128 into the GUI (e.g., into a search field of the GUI) of the search application 116. In block 604, the user device 200 transmits the search query 128 to the search system 100. For example, the user may have caused the user device 200 to transmit the search query 128 to the search system 100 by selecting (e.g., touching, or clicking on) a search button included in the GUI. In block 606, the user device 200 waits to receive search results 130 that are responsive to the search query 128 from the search system 100. The method 600 continues in block 608 when the user device 200 receives the search results 130 from the search system 100 in response to transmitting the search query 128 to the search system 100. As described herein, the search results 130 received by the user device 200 from the search system 100 may include one or more AAMs that each reference a native application and indicate one or more operations for the application to perform. In some examples, the search results 130 further include one or more WAMs and/or ADAs. The search results 130 may also include one or more result scores associated with the AAMs, as also described herein. Additionally, the search results 130 may include link data (e.g., text and/or images) for each of the AAMs, as further described herein. As described below, the search application 116 may generate one or more user selectable links for the AAMs included in the search results 130 using the received link data, and display the links to the user within the GUI (e.g., by arranging the links within a list using the corresponding received results scores).

Accordingly, in block 608, the search application 116 generates one or more user selectable links that include the AAMs included in the search results 130 (e.g., using link data received from the search system 100 as part of the search results 130). For example, the search application 116 may generate one user selectable link for each AAM included in the search results 130. In block, 610, the search application 116 displays the user selectable links to the user. For example, the search application 116 may arrange the user selectable links within a list (e.g., using result scores received from the search system 100 as part of the search results 130), and display the list within the GUI of the search application 116. In block 612, the search application 116 waits for the user to select one of the user selectable links displayed to the user via the GUI. The method 600 continues in block 614 when the user selects (e.g., touches, or clicks on) one of the user selectable links. In block 614, in response to the user selecting one of the user selectable links, the user device 200 launches the native application referenced by the AAM included in the selected user selectable link on the user device 200, and sets the launched application into an application state specified by the AAM using the AAM. For example, to set the native application into the application state, the user device 200 may cause the application to perform the one or more operations indicated by the AAM.

FIGS. 7A and 7B illustrate an example of a search application 116 executing on a user device 200a. In FIG. 7A, a user has entered a search query 202 into a GUI of the search application 116. Specifically, the user has entered the search query "Late night diners" into a search field (e.g., a search bar) 210 of the GUI. The user can select (e.g., touch, or click on) a search button 204 of the GUI to transmit a query wrapper including the search query 202 to the search system 100. The search system 100 receives the query wrapper and identifies one or more function records based on the search query 202 included in the query wrapper. The search system 100 processes the identified function records and selects AAMs from the identified function records. In the example of FIG. 7A, the search system 100 has identified function records that represent application states in Yelp and the native application "TRIPADVISOR®" by TripAdvisor, LLC (hereinafter, "TripAdvisor"). For example, the search system 100 has identified function records that correspond to entries in Yelp for "IHOP," "Denny's," and "Taco Bell." The search system 100 has also identified function records that correspond to entries in TripAdvisor for "McDonald's," "Perkins," and "In-N-Out." Although only links for Yelp and TripAdvisor are visible in the GUI in FIG. 7A, the search system 100 may have identified additional function records for Yelp, TripAdvisor, and additional native applications that are not illustrated in FIG. 7A. Furthermore, the search system 100 may have transmitted additional AAMs to the user device 200a that are not shown in the GUI of FIG. 7A.

The search results 130 transmitted to the user device 200a include AAMs for the application functions/states indicated in the links 206-1, 206-2, . . . , 206-6 (collectively, the "links 206"). The search results 130 also include link data (e.g., text and images) associated with each of the AAMs. For example, the "IHOP" link 206-1 includes the text "IHOP" and an image of pancakes. A user may select (e.g., touch, or click on) the links 206 to access the application function/state indicated in the links 206. For example, a user may select an area of the GUI including the "IHOP" link 206-1 to access the entry in Yelp for "IHOP." In FIG. 7A, the links 206 are grouped together according to the native applications associated with the links 206. For example, the Yelp links 206-1, 206-2, and 206-3 and the TripAdvisor links 206-4, 206-5, and 206-6 are grouped together under Yelp and TripAdvisor headers 208-1, 208-2, respectively. In other examples, links for different native applications may be mixed instead of grouped.

In the example of FIG. 7A, the user selects the "Denny's" link 206-2. In response to selection of the "Denny's" link 206-2, the user device 200a launches Yelp and performs one or more operations according to the AAM associated with the "Denny's" link 206-2. In the example of FIG. 7A, the AAM associated with the "Denny's" link 206-2 may reference Yelp and indicate a path for Yelp to find information for the particular "DENNY'S®" restaurant indicated by the link. For example, an ARI may reference Yelp and indicate one or more operations for Yelp to perform, such as retrieving data from the path included in the ARI. Accordingly, the ARI of the AAM may cause Yelp to perform the function of retrieving and displaying information for the "DENNY'S®" restaurant. An example ARI for Yelp may include the string "yelp:///biz/dennys-sunnyvale." FIG. 7B shows an example GUI 212 of Yelp after the user has selected the "Denny's" link 206-2. In FIG. 7B, Yelp is set into a state in which Yelp is displaying retrieved information about the "DENNY'S®" restaurant.

Figure 8B:
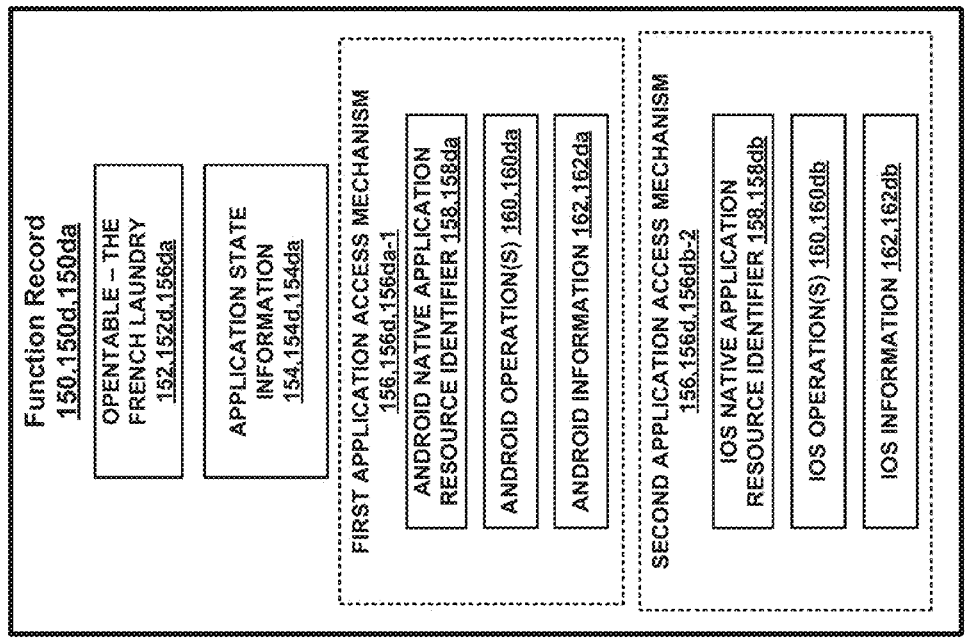
FIGS. 8A and 8B show example function records that include multiple native application access mechanisms.
Figure 8A:
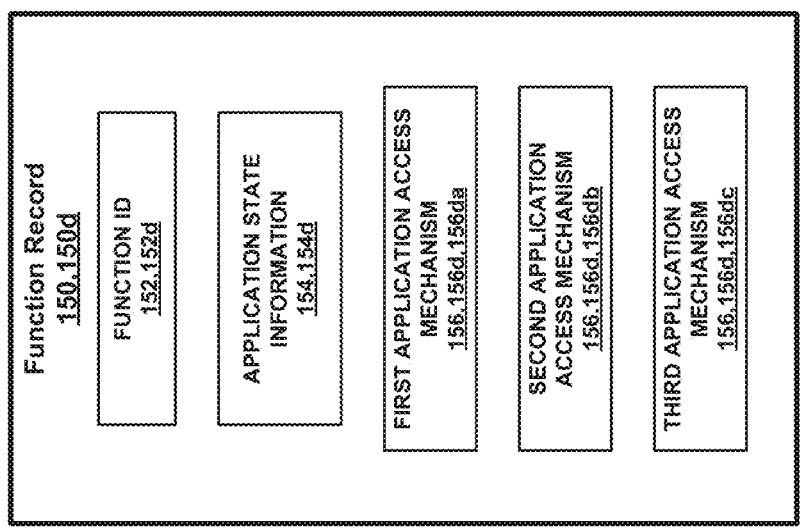

FIG. 8A shows an example function record 150*d* that includes multiple different AAMs. The function record 150*d* includes a function ID 152*d* and ASI 154*d*, as described above. The function record 150*d* also includes a first AAM 156*da*, a second AAM 156*db*, and a third AAM 156*dc* (collectively, the "AAMs 156*d*").

The different AAMs 156*d* included in the function record 150*d* may be associated with different editions of a native application. For example, the first, second, and third AAMs 156*d* may be associated with first, second, and third editions of a native application, respectively. The different AAMs 156*d* in the function record 150*d* may be associated with different operating systems and/or different versions of a native application. In a specific example, the AAMs 156*d* may be associated with different operating systems. For example, the AAMs 156*d* may each include an ARI that is specific to a different OS, such as ANDROID®, IOS®, or WINDOWS PHONE®. More specifically, an ARI for a first edition of a native application that runs on a first OS may be different than an ARI for a second edition of the application that runs on a second OS. As another example, the ARIs of the AAMs 156*d* may be different for native application editions that are different versions, but run on the same OS. The operations included in the AAMs 156*d* may also be specific to different operating systems and/or versions.

In some examples, the different AAMs 156*d* in the function record 150*d* are associated with different versions of a native application for the same OS. For example, the AAMs 156*d* may each be associated with a different version of a native application for the ANDROID® OS. Different versions may include a version 1.0 of a native application and a later released version 2.0 of the application. In another example, different versions of a native application may be versions of the application designed for different devices. For example, a first version of a native application may be designed for a smart phone. A second version of the native application may be designed for a tablet computing device having a different set of specifications (e.g., screen size and resolution) than the smart phone for which the first version of the application was designed.

As described with respect to FIG. 3B, an AAM 156 may include edition information 162, 162*a* that indicates the native application edition with which the AAM is associated. In this context, the first AAM 156*da* may include an ARI and/or one or more operations that are compatible with a specific native application edition. The first AAM 156*da* may also include edition information that indicates the specific native application edition with which the ARI and/or the operations are compatible. The second and third AAMs 156*db*, 156*dc* may also include edition information that indicates the specific native application editions with which the second and third AAMs 156*db*, 156*dc* are associated.

The different AAMs 156*d* included in the function record 150*d* may cause the corresponding native application editions to launch and perform similar functions so that the application editions are set into similar application states. For example, the different AAMs 156*d* included in the function record 150*d* may cause the corresponding native application editions to be set into the application state described by the function record 150*d* (e.g., the ASI 154*d*). Accordingly, although the ARIs and/or the operations included in the AAMs 156*d* may be different, the different AAMs 156*d* may cause the different native application editions to be set into similar application states. In one example, if the different AAMs 156*d* reference different editions of an Internet music player application, the different AAMs 156*d* may cause the different application editions to play the same song. In another example, if the different AAMs 156*d* reference different editions of a restaurant reservation application, the different AAMs 156*d* may cause the different editions to retrieve reservation information for the same restaurant.

FIG. 8B shows a specific example of a function record 150, 150*d*, 150*da* that specifies an entry in OpenTable for The French Laundry. The function record 150*da* includes a function ID 152*da* "Opentable—The French Laundry." The function record 150*da* also includes ASI 154*da* that may include information that is similar to that described above with respect to FIG. 3C.

The function record 150*da* includes two AAMs 156*da*-1, 156*db*-2. The first AAM 156*da*-1 is associated with an edition of OpenTable that runs on the ANDROID® OS. Accordingly, edition (i.e., ANDROID®) information 162*da* included in the function record 150*da* may indicate that ANDROID® operations 160*da* and ANDROID® native ARI 158*da* also included in the function record 150*da* are compatible with the ANDROID® OS. Furthermore, the edition information 162*da* may specify one or more specific versions of the ANDROID® OS and one or more versions of OpenTable with which the ARI 158*da* and the operations 160*da* are compatible. The second AAM 156*db*-2 is associated with an edition of OpenTable that runs on the IOS® OS. Accordingly, edition (i.e., IOS) information 162*db* included in the function record 150*da* may indicate that IOS® operations 160*db* and IOS® native ARI 158*db* also included in the function record 150*da* are compatible with the IOS® OS. Furthermore, the edition information 162*db* may specify one or more specific versions of the IOS® OS and one or more versions of OpenTable with which the ARI and the operations 160*db* are compatible.

During a search for function records, the search system 100 (e.g., the set generation module 124) may identify one or more function records that each include multiple AAMs, as described above. In these scenarios, the set processing module 126 may process (e.g., score) the identified set of function records in the manner described above. For example, the set processing module 126 may select one or more function records from the consideration set based on the result scores associated with function records.

As described above, the set processing module 126 selects AAMs from the selected function records (e.g., the highest scoring function records) and transmits the selected AAMs to the user device 200 that generated the search query 128. In some implementations of the search system 100, the set processing module 126 transmits each of the multiple AAMs of a function record to the user device 200 so that the user device 200 can determine which AAM to use. For example, assuming that the function record 150*da* of FIG. 8B was selected by the set processing module 126, the set processing module 126 may transmit both the first and second AAMs 156*da*-1, 156*db*-2 to the user device 200. In this example, the user device 200 may determine which of the AAMs 156*da*-1, 156*db*-2 to use. If the user device 200 is running an ANDROID® OS, the user device 200 may select the first AAM 156*da*-1. Alternatively, if the user device 200 is running an IOS® OS, the user device 200 may select the second AAM 156*db*-2. In other examples where the AAMs 156*da*-1, 156*db*-2 reference different versions, or revisions, of OpenTable for the same OS (e.g., ANDROID®), the user device 200 may select the one of the AAMs 156*da*-1, 156*db*-2 that is compatible with the version of OpenTable that is installed on the user device 200.

In some implementations of the search system 100, the set processing module 126 determines which of multiple AAMs of a function record to transmit to the user device 200. The set processing module 126 may determine which of the AAMs to transmit using information included in the query wrapper received from the user device 200. For example, the set processing module 126 may select and transmit one or more of the AAMs that are likely to be compatible with the user device 200. In cases where the function record 150*da* of FIG. 8B is selected by the set processing module 126 and the set processing module 126 determines that the user device 200 is running the ANDROID® OS, the set processing module 126 may select the first AAM 156*da*-1 to transmit to the user device 200, and refrain from transmitting the second AAM 156*db*-2 associated with the IOS® OS to the user device 200. In other examples where the AAMs 156*da*-1, 156*db*-2 reference different versions, or revisions, of OpenTable for the same OS, the user device 200 may transmit an indication of a version, or revision, of each of one or more native applications that are installed on the user device 200, including that of OpenTable, to the search system 100 (e.g., as part of the query wrapper). In these examples, the search system 100 may select the one of the AAMs 156*da*-1, 156*db*-2 that is compatible with the version of OpenTable that is installed on the user device 200 using the indication, and transmit the one of the AAMs 156*da*-1, 156*db*-2 to the user device 200.

Figure 9:
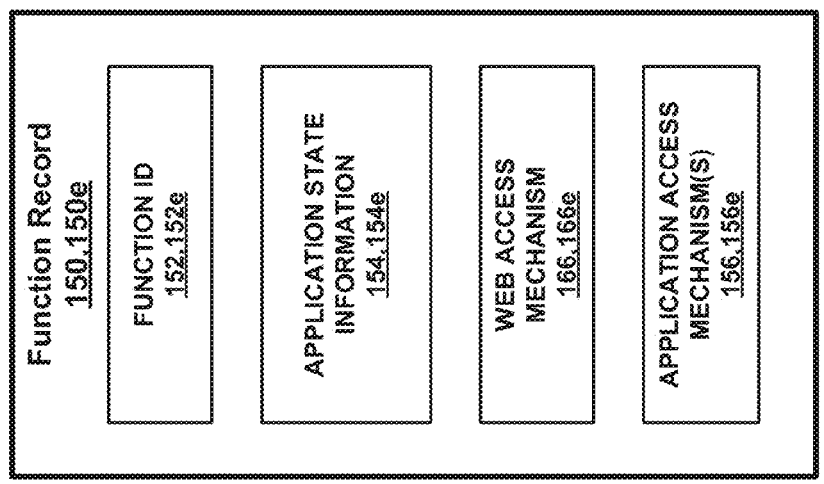

FIG. 9 shows an example function record 150*e* that includes a WAM 166, 166*e*. The function record 150*e* also includes a function ID 152*e*, ASI 154*e*, and one or more AAMs 156*e*, as described above. The WAM 166*e* may be used by a wide variety of user devices 200 running different operating systems. In some examples, the WAM 166*e* includes a web resource identifier, such as a URL (i.e., a web address) used with HTTP.

The WAM 166*e* (e.g., a URL) included in the function record 150*e* may be used by a web browser application 120 to access a web resource that includes similar information and/or performs similar functions as would be performed by a native application that receives the AAM(s) 156*e* of the function record 150*e*. In one example, the WAM 166*e* may direct a web browser application 120 to a web version of the native application referenced by the AAM(s) 156*e*. For example, if the function record 150*e* specifies an entry in Yelp for a specific Mexican restaurant, the AAM(s) 156*e* may include a reference to Yelp and one or more operations for accessing the entry for the Mexican restaurant in Yelp. In this example, the WAM 166*e* may include a web address that a web browser application 120 may use to access an entry for the same Mexican restaurant on a Yelp web page.

During a search for function records, the search system 100 (e.g., the set generation module 124) may identify one or more function records that each include a WAM. In these scenarios, the set processing module 126 may process (e.g., score) the identified set of function records in the manner described above. For example, the set processing module 126 may select function records from the consideration set based on the result scores associated with the identified function records.

In some implementations of the search system 100, the set processing module 126 determines which of the multiple AAM(s) 156*e* and the WAM 166*e* should be transmitted to the user device 200. The set processing module 126 may determine whether to transmit the WAM 166*e* and/or the AAM(s) 156*e* of the function record 150*e* based on information included in the query wrapper received from the user device 200. For example, the set processing module 126 may select and transmit the WAM 166*e* and/or the AAM(s) 156*e* based on which of the WAM 166*e* and/or the AAM(s) 156*e* are likely to be compatible with the user device 200.

In scenarios where the set processing module 126 determines that one or more of the AAM(s) 156*e* is compatible with the user device 200, the set processing module 126 may transmit the one or more compatible AAMs. In these scenarios, the set processing module 126 may refrain from transmitting the WAM 166*e* and those AAMs that are determined to be incompatible with the user device 200. In other scenarios, if the set processing module 126 determines that none of the AAM(s) 156*e* is compatible with the user device 200, the set processing module 126 may transmit the WAM 166*e* and refrain from transmitting the AAM(s) 156*e*.

Figure 10:
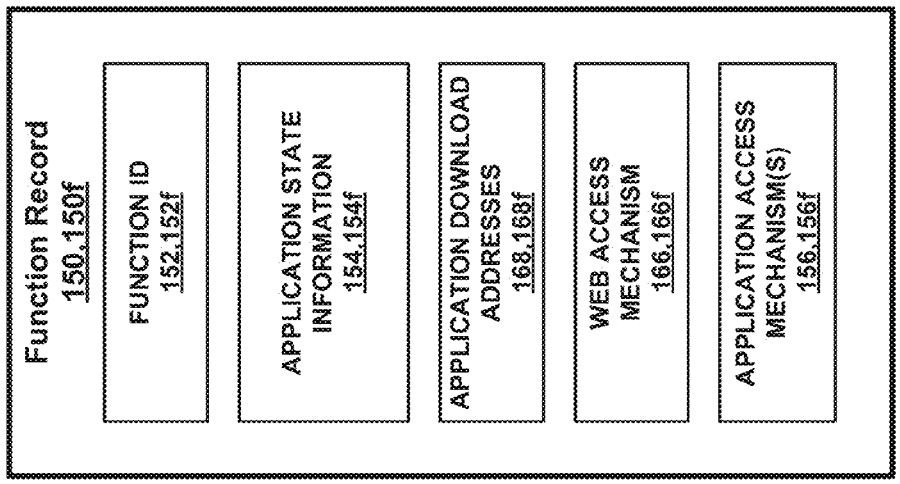

FIG. 10 shows an example function record 150*f* that includes one or more ADAs 168, 168*f*. The function record 150*f* also includes a function ID 152*f*, ASI 154*f*, one or more AAMs 156*f*, and a WAM 166, 166*f*, as described above. An ADA 168*f* can be used by a user device 200 to download a native application referenced by the AAM(s) 156*f* in the event that the application is not installed on the user device 200. In some examples, the ADA 168*f* includes a web address (e.g., a URL) at which the native application can be previewed and downloaded. For example, the ADA 168*f* may direct a web browser application 120 of a user device 200 to a digital distribution platform that is configured to distribute native applications. Example digital distribution platforms include, but are not limited to, GOOGLE PLAY® developed by Google Inc., the APP STORE® developed by Apple Inc., and WINDOWS PHONE STORE developed by Microsoft Corporation. If a user device 200 includes a native download application for accessing a digital distribution platform, the ADA 168*f* may direct the application to a site where the native application referenced by the AAM(s) 156*f* can be downloaded. In other examples, the ADA 168*f* may indicate a location from which another location where the native application can be downloaded can be accessed.

During a search, the search system 100 (e.g., the set generation module 124) may identify one or more function records that each include an ADA 168*f*. In these cases, the set processing module 126 may process (e.g., score) the identified set of function records as described above. The set processing module 126 may also select function records from the consideration set and select which AAMs of the selected function records to transmit to the user device 200, as also described above. The set processing module 126 may transmit the selected AAMs and the one or more ADAs 168*f* to the user device 200.

As described above, different AAMs in a function record may be associated with different operating systems. A first AAM may be for a native application running on the ANDROID® OS. A second AAM may be for the native application running on the IOS® OS. In this example, the first AAM can be associated with a first ADA for downloading the ANDROID® edition of the native application. The second AAM can be associated with a second ADA for downloading the IOS® edition of the native application.

Figure 12:
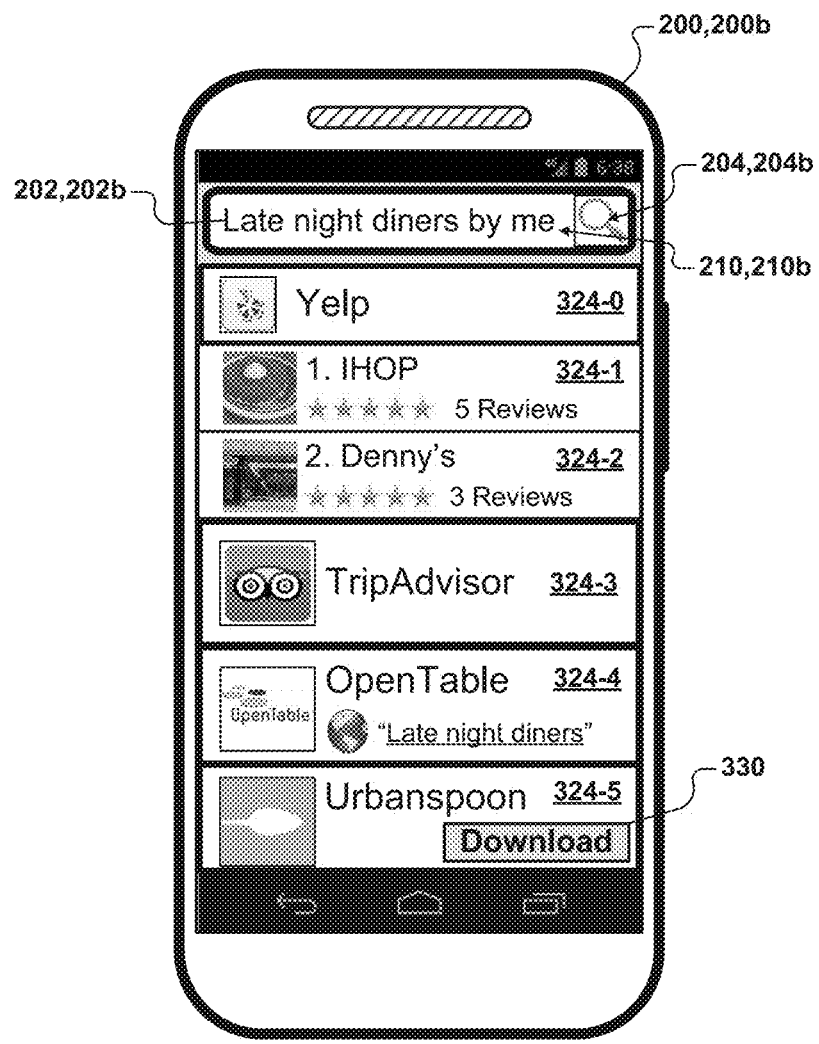
FIG. 12 shows an example GUI that includes various different user selectable links.

As described above, the search system 100 may transmit an AAM 156*f* and an ADA 168*f* for downloading the native application referenced by the AAM 156*f*. If the user device 200 has the native application referenced by the AAM 156*f* installed, the user device 200 (e.g., the search application 116) may generate a user selectable link that includes the AAM 156*f*. In this example, in response to selection of the user selectable link, using the AAM 156*f*, the user device 200 launches the native application referenced by the AAM 156*f* and performs one or more operations indicates by the AAM 156*f*. If the user device 200 does not have the native application installed, the user device 200 may determine that the application is not installed and generate a user selectable link that includes the ADA 168*f*. In response to selection of the user selectable link, using the ADA 168*f*, the user device 200 may launch a web browser application 120 or a dedicated native application and direct the user to a site (e.g., a digital distribution platform) where the native application referenced by the AAM 156*f* can be downloaded. A user selectable link including the ADA 168*f* may include link data (e.g., text and/or images) indicating that the user can download the native application by selecting (e.g., touching) the link. An example user selectable link 324-5 including an ADA is shown in FIG. 12.

As described above, the data store 108 may include one or more databases, indices (e.g., inverted indices), tables, files, or other data structures that may be used to implement the techniques of the present disclosure. In some examples, as described above with reference to FIGS. 4D and 4E, the data store 108 includes access tables that include different AMs. With respect to FIG. 10, an access table for the function record 150*f* may include the ADAs 168*f*, WAM 166*f*, and AAM(s) 156*f*. The access table may also include the function ID 152*f*, which serves as a unique identifier for the access table. In examples where the data store 108 includes access tables for function records, the search system 100 may identify function records and score the function records as described above. The search system 100 may then select the AMs from the access tables identified by the function IDs of the function records and transmit the AMs to the user device 200. For example, with respect to the function record 150*f* of FIG. 10, the search system 100 may identify and score the function record 150*f* as described above. The search system 100 (e.g., the set processing module 126) may then use the function ID 152*f* to identify an access table that includes the ADAs 168*f*, WAM 166*f*, and AAM(s) 156*f*. The search system 100 may then select the ADAs 168*f*, WAM 166*f*, and AAM(s) 156*f* from the access table and transmit the ADAs 168*f*, WAM 166*f*, and AAM(s) 168*f* to the user device 200.

Multiple different ways for accessing native application and/or web application functionality are described above. For example, a user device 200 may access the functionality of a native application using an AAM. In the case where the user device 200 does not have a native application installed, the user device 200 may download the application using an ADA and install the application, thereby allowing the user device 200 to access the functionality of the application using the AAM in the manner described above. Additionally, or alternatively, the user device 200 may access the functionality of a web application using a WAM. For example, if the user device 200 does not have a native application installed, the user device 200 may instead generate a user selectable link including a WAM to access similar functionality. Providing these different mechanisms for accessing application functionality may help ensure that a user device 200 is able to access desired functionality present in the search results 130.

In some examples, the search application 116 is configured to generate user selectable links according to a hierarchy. For example, the search application 116 may be configured to generate a link including an AAM if a compatible AAM is received and the corresponding native application is installed. If the native application is not installed, the search application 116 may generate a link including a WAM or an ADA. In some examples, instructions to the search application 116 for which mechanism to use a included along with the search results 130.

Figure 11:
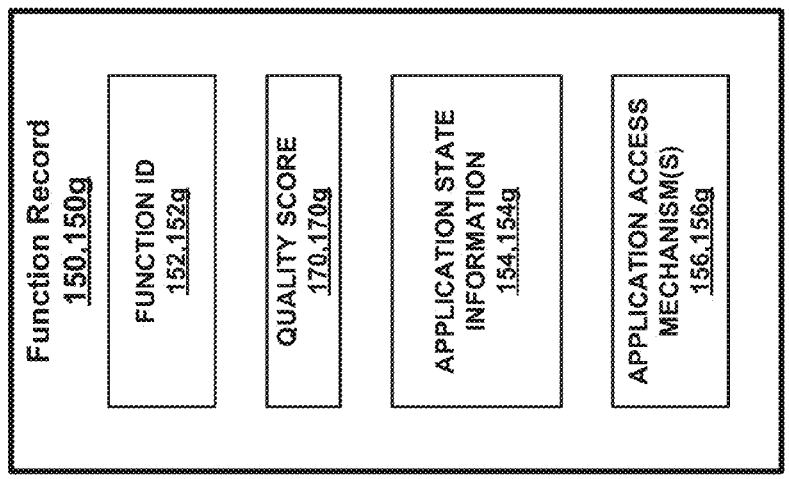
FIGS. 9-11 show example function records that include web access mechanisms, application download addresses, and quality scores, respectively.

Referring now to FIG. 11, the function record 150*g* includes a quality score 170*g*. The function record 150*g* also includes a function ID 152*g*, ASI 154*g*, and one or more AAMs 156*g*, as described above. The quality score 170*g* may be included in any of the function records described herein. The quality score 170*g* may be a number used by the search system 100 to generate a result score for the function record 150*g*. For example, the set processing module 126 may generate the result score for the function record 150*g* based on the quality score 170*g* included in the function record 150*g*. As described above, in some implementations, the set processing module 126 generates a result score for a function record based on one or more scoring features, including record scoring features that may be based on data associated with a function record. For those function records that include quality scores, the set processing module 126 may use the quality score as a record scoring feature. In these examples, the set processing module 126 may generate a result score based on the quality score 170, 170*g*. For example, one or more machine-learned models may generate result scores using the quality score 170*g* as a record scoring feature.

The quality score 170*g* may be determined based on metrics associated with a person, place, or thing described in the function record 150*g* (e.g., in the ASI 154*g*). For example, the quality score 170*g* may be based on the popularity of a place described in the function record 150*g* and/or ratings (e.g., user ratings) of the place described in the function record 150*g*. In another example, the quality score 170*g* may be based on the popularity of a song described in the function record 150*g* and/or ratings (e.g., user ratings) of the song described in the function record 150*g*. The quality score 170*g* may also be determined based on measurements associated with the function record 150*g*. For example, the quality score 170*g* may be determined based on data indicating how often the function record 150*g* is retrieved during a search and how often the AAM(s) 156*g* of the function record 150*g* are selected by a user.

FIG. 12 illustrates an example GUI of a search application 116 running on a user device 200,200*b*. In FIG. 12, a user has entered a search query 202, 202*b* ("Late night diners by me") into the GUI of the search application 116 (e.g., into a search field 210, 210*b* of the GUI). The user has interacted with the GUI to transmit a query wrapper including the search query 202*b* to the search system 100 (e.g., by selecting a search button 204, 204*b* of the GUI). The search system 100 has identified function records and selected AAMs, WAMs, and ADAs from the identified function records, as described above. In the example of FIG. 12, the search system 100 has identified function records including references to the native applications Yelp, TripAdvisor, OpenTable, and "URBANSPOON®" by Wanderspot LLC (hereinafter, "Urbanspoon"). It may be assumed that the user device 200*b* of FIG. 12 has Yelp and TripAdvisor installed. It may also be assumed that OpenTable and Urbanspoon are not installed on the user device 200*b*.

The GUI of FIG. 12 illustrates different types of links 324-1, 324-2, . . . , 324-5 for the function records identified for Yelp, TripAdvisor, OpenTable, and Urbanspoon. As described above, the search system 100 has identified function records that correspond to the entries in Yelp for "IHOP" and "Denny's," which are included in the GUI. The links 324-1, 324-2, include AAMs that launch Yelp and retrieve the entries in Yelp for "IHOP" and "Denny's." If Yelp was not installed on the user device 200b, the GUI may still display the entries in Yelp for "IHOP" and "Denny's," but the user device 200b may include an ADA in the links 324-1, 324-2 so that, upon a user selecting any of the links 324-1, 324-2, the user device 200b would be directed to download Yelp. In an example where the links 324-1, 324-2 include an ADA, the links 324-1, 324-2 may also include data (e.g., text and/or images) that indicate to a user that selection of the links 324-1, 324-2 will direct the user to a site for downloading Yelp. For example, the links 324-1, 324-2 may include text and/or an image that says "Download." The GUI of FIG. 12 also includes a link 324-0 that represents a Yelp header for the links 324-1, 324-2, as described herein.

The link 324-3 may be associated with an AAM for TripAdvisor. For example, the AAM included in the link 324-3 may cause the user device 200b to launch TripAdvisor to a default state, as described above. In other examples, the AAM included in the link 324-3 may cause the user device 200b to launch TripAdvisor and cause TripAdvisor to perform a search within TripAdvisor using the search query 202b (i.e., cause TripAdvisor to search for "Late night diners by me"). In other words, in some examples, a user device 200 receives an AAM along with search results 130 received in response to transmitting a search query 128 to the search system 100. The user device 200 may include the AAM in a user selectable link as part of displaying the search results 130 to a user. Upon the user selecting the user selectable link, the AAM may cause the user device 200 to perform a search within a native application included on the user device 200 using the search query 128. In some examples, the AAM references the native application. In this manner, the AAM may be used as part of so-called "search forwarding." In search forwarding, a search result 130 received by a user device 200 from the search system 100 in response to a search query 128 causes a native application included on the user device 200 to perform a search using the same search query 128.

The link 324-4 may include a WAM for the OpenTable web-based application. For example, the WAM may direct a web browser application 120 of the user device 200b to entries for one or more late night diners in the OpenTable web-based application. In some examples, the WAM included in the link 324-4 causes the user device 200b to launch the OpenTable web-based application and cause it to perform a search using the search query 202b in a similar manner as described above with respect to search forwarding. Accordingly, in response to selection of the link 324-4, the user device 200b may launch a web browser application 120 and retrieve information at the web address included in the WAM. As described above, since OpenTable is not installed on the user device 200b, the search application 116 may have presented the link 324-4 to the user so that the user may access the desired functionality via a WAM.

The link 324-5 may include an ADA for Urbanspoon. Since the user device 200b does not have Urbanspoon installed, the user device 200b displays the link 324-5 that includes an ADA for Urbanspoon. The user device 200b also displays the link 324-5 such that it includes a GUI element 330 with a string "Download," which prompts the user to select the link 324-5 to download and install Urbanspoon. In response to selection of the link 324-5, the user device 200b may access a site (e.g., a digital distribution platform) for downloading Urbanspoon.

In some implementations, a function record includes location data. The search system 100 may use location data in function records to filter out function records that may not be relevant to a user because of the location of the user relative to the places described in the function records. For example, the search system 100 may filter out function records in which the user is located too far from the place(s) described in the function records for the place(s) to be relevant to the user.

In some examples, the search results 130 includes an AAM that references a native application that is not included (e.g., installed) on the user device 200, and that requires a relatively large amount of data (e.g., ten megabytes or more) to download, install, and/or store on the user device 200. In other examples, the search results 130 may include multiple AAMs that reference a relatively large number of (e.g., five or more) different native applications that are not included on the user device 200. In these examples, one or more of the native applications may further require a relatively large amount of data to download, install, and/or store the native application(s) on the user device 200. In still other examples, the user device 200 may include a data connection (e.g., a cellular network connection, or a Wi-Fi connection) that has a relatively low bandwidth (e.g., a 3G connection, or a slower connection, rather than a 4G connection, or a faster connection) and/or a relatively low connection quality (e.g., reliability). In the examples described above, upon a user of the user device 200 selecting a user selectable link that includes one of the AAMs included in the search results 130 that references a native application that is not included on the user device 200, the user device 200 may download, install, and store the application on the user device 200, in the manner described herein. Downloading, installing, and storing a single native application that requires a relatively large amount of data, or a relatively large number of native applications (e.g., one or more of which requires a relatively large amount of data) in this manner may consume significant time, bandwidth, and processing and storage resources. Furthermore, downloading one or more native applications in the manner described above using a data connection that has a relatively low bandwidth and/or a relatively low connection quality may also consume significant time, bandwidth, and processing and storage resources. The present disclosure describes techniques that, in some examples, address at least some of the above-described shortcomings associated with downloading, installing, and storing one or more native applications that are not included on the user device 200.

In some examples, upon the user selecting a user selectable link that includes an AAM that references a native application that is not included on the user device 200, instead of downloading, installing, and launching the application, and setting the application into an application state specified by the AAM, the user device 200 launches a web-based application, and set the web-based application into a web application state specified by a WAM included in the link. In these examples, the web application state may correspond, or be similar to the application state of the native application specified by the AAM, but require less data to access than the application state. In some examples, the user device 200 determines whether to download, install, and launch the native application, and set the application into the application state, or launch the web-based application, and set the web-based application into the web application state based on any of the following: (1) a user input received from the user; (2) a size of (e.g., an amount of data used to download, install, and/or store) the native application; (3) bandwidth and/or quality of a data connection using which the user device 200 may download the native application (e.g., from a location indicated by an ADA included in the link); (4) an amount of storage space (e.g., memory) available on the user device 200 to download, install, and/or store the native application; (5) an amount of processing resources (e.g., a degree of availability of processing devices) present on the user device 200 to download, install, and/or store the native application; (6) a number of native applications referenced by the AAMs included in the search results 130 that are not included on the user device 200, and other considerations. In other examples, upon (e.g., in parallel with) launching the web-based application, and setting the application into the web application state, the user device 200 may download and install the native application for later use (e.g., to launch the native application, and set the application into an application state specified by another AAM received by the user device 200 at a later point in time). In these examples, the user device 200 may download and install the native application automatically upon launching the web-based application, and setting the web-based application into the web application state, or based on a user input.

In some examples, the application state specified by the AAM does not include a corresponding, or similar web application state of a web-based application. In these examples, upon the user selecting the link, instead of, or in addition to, downloading, installing, and launching the native application, and setting the application into the application state, the user device 200 may display a subset (e.g., a preview) of the information included in the application state to the user using preview data included in the link. In these examples, the preview data may require less data to access than the application state. For example, the user device 200 may display the preview of the application state as part of the link (e.g., by expanding the link), or in place of the link (e.g., by displaying another GUI, or screen that includes the preview). In some examples, the user device 200 determines whether to download, install, and launch the native application, and set the application into the application state, and/or display the preview of the application state based on any of the following: (1) a user input received from the user; (2) a size of (e.g., an amount of data used to download, install, and/or store) the native application; (3) bandwidth and/or quality of a data connection using which the user device 200 may download the native application (e.g., from a location indicated by an ADA included in the link); (4) an amount of storage space (e.g., memory) available on the user device 200 to download, install, and/or store the native application; (5) an amount of processing resources (e.g., a degree of availability of processing devices) present on the user device 200 to download, install, and/or store the native application; (6) a number of native applications referenced by the AAMs included in the search results 130 that are not included on the user device 200, and other considerations. In other examples, upon (e.g., in parallel with) displaying the preview, the user device 200 may download and install the native application for immediate or later use (e.g., to launch the application, and set the application into the application state specified by the AAM, or an application state specified by another AAM received by the user device 200 at a later point in time). In these examples, upon downloading and installing the native application, the user device 200 may launch the application and set it into the application state specified by the AAM (e.g., automatically upon downloading and installing the application, or based on a user input).

Figure 13:
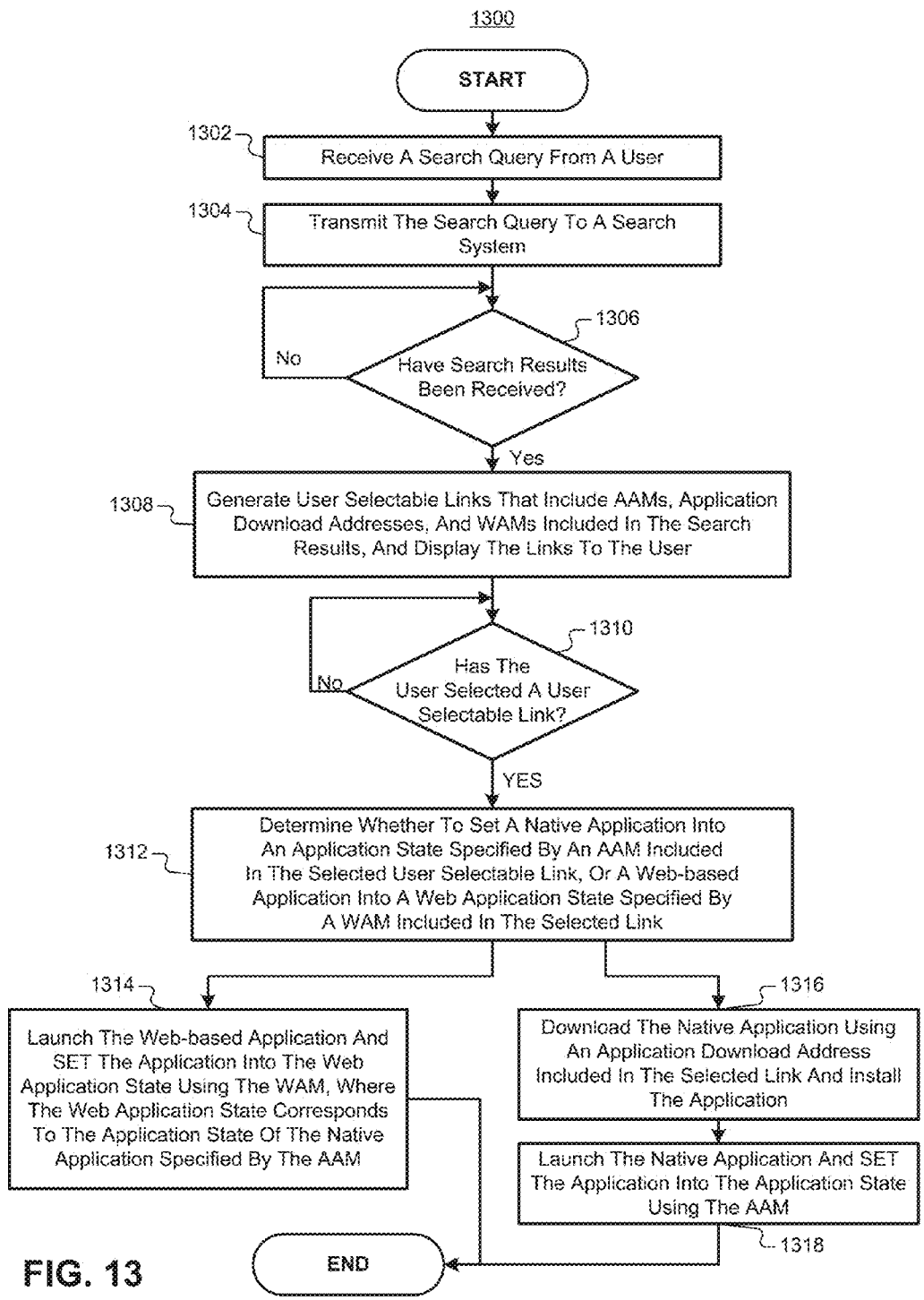
FIG. 13 is a flow diagram illustrating another example method describing operation of a user device.
Figure 14:
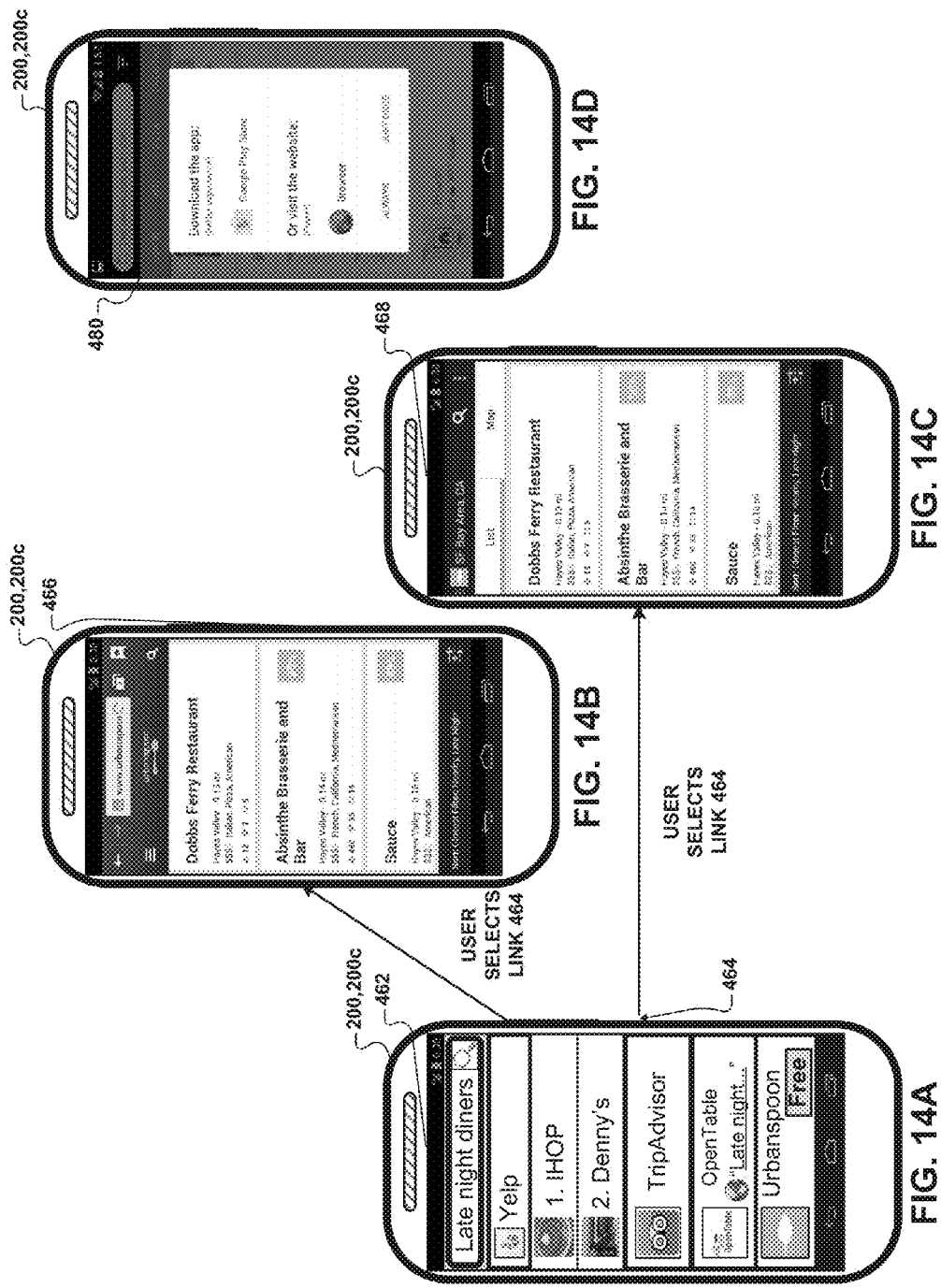
FIGS. 14A-14D illustrate other example GUIs that may be generated on a user device according to the present disclosure.

FIGS. 13-14D and the corresponding description below are directed to techniques for selectively launching one of a native application and a web-based application, and setting the launched application into an application state using a user device 200. Specifically, FIG. 13 is a flow diagram that illustrates an example method for selectively launching one of a native application and a web-based application, and setting the launched application into an application state, consistent with the techniques of this disclosure. FIGS. 14A-14D, in turn, illustrate example GUIs that may be displayed on a user device 200 both prior to and after a native application or a web-based application is launched on the user device 200 and set into an application state using the user device 200, in the manner described with reference to FIG. 13.

FIG. 13 shows another example method 1300 describing operation of one of the user devices 200. In a similar manner as described above with reference to FIG. 6, it may be assumed that the user device 200 described with reference to the method 1300 includes a search application 116 that is configured to communicate with the search system 100, and that the search application 116 executing on the user device 200 generates a GUI that receives search queries 128 from users of the user device 200, and displays search results 130 received by the user device 200 from the search system 100 in response to the user device 200 transmitting the search queries 128 to the search system 100. The method 1300 is described with reference to the search system 100 and one of the user devices 200 of FIGS. 1 and 2, and the components thereof.

In block 1302, the search application 116 receives a search query 128 from a user of the user device 200. For example, the user may have entered the search query 128 into the GUI (e.g., into a search field of the GUI) of the search application 116. In block 1304, the user device 200 transmits the search query 128 to the search system 100. For example, the user may have caused the user device 200 to transmit the search query 128 to the search system 100 by selecting (e.g., touching, or clicking on) a search button included in the GUI. In block 1306, the user device 200 waits to receive search results 130 that are responsive to the search query 128 from the search system 100. The method 1300 continues in block 1308 when the user device 200 receives the search results 130 from the search system 100 in response to transmitting the search query 128 to the search system 100.

As described herein, the search results 130 received by the user device 200 from the search system 100 may include one or more AAMs that each reference a native application and indicate one or more operations for the application to perform. As also described herein, the search results 130 may further include one or more ADAs that each indicate a location (e.g., a digital distribution platform) at which the user device 200 may download a native application referenced by one of the AAMs included in the search results 130. For example, for each of one or more of the AAMs included in the search results 130, the search results 130 may further include one or more ADAs that are each associated with the AAM (i.e., that each indicate a location at which the user device 200 may download the native application referenced by the AAM). As also described herein, the search results 130 may still further include one or more WAMs that each specify a web application state of a web-based application (e.g., reference the web-based application, and indicate one or more operations for the application to perform). For example, each WAM included in the search results 130 may specify a web application state of a web-based application that corresponds, or is similar to an application state of a native application specified by an AAM included in the search results 130. For instance, for each of one or more of the AAMs included in the search results 130, the search results 130 may further include one or more WAMs that are each associated with the AAM (i.e., that each specify a web application state of a web-based application that corresponds, or is similar to an application state of a native application specified by the AAM). As described herein, each WAM may include a resource identifier (e.g., a URL, or a web address) that identifies a web resource (e.g., a web page of a website). In this manner, each WAM may specify a web page of a website that includes some or all of the same or similar information as that of a GUI, or screen, of a native application specified by one of the AAMs.

The search results 130 may also include one or more result scores associated with the AAMs, as described herein. Additionally, the search results 130 may include link data (e.g., text and/or images) for each of the AAMs, as also described herein. As described in greater detail below, the search application 116 may generate one or more user selectable links for the AAMs included in the search results 130 using the received link data, and display the links to the user within the GUI (e.g., by arranging the links within a list using the corresponding received results scores). As also described below, the search application 116 may generate the user selectable links such that one or more of the links each includes one or more of the ADAs included in the search results 130. As further described below, the search application 116 may generate the user selectable links such that one or more of the links each includes one or more of the WAMs included in the search results 130.

Accordingly, in block 1308, the search application 116 generates one or more user selectable links that include the AAMs, ADAs, and WAMs included in the search results 130 (e.g., using link data received from the search system 100 as part of the search results 130), and displays the links to the user. For example, the search application 116 may generate one user selectable link for each AAM included in the search results 130. The search application 116 may further generate the user selectable links such that each of one or more of the links also includes one or more of the WAMs included in the search results 130. For example, the search application 116 may generate the user selectable links such that each of one or more of the links includes one of the AAMs included in the search results 130, and one or more of the WAMs included in the search results 130 that are each associated with the AAM (i.e., that each specify a web application state of a web-based application that corresponds, or is similar to an application state of a native application specified by the AAM). In some examples, the search application 116 generates a particular user selectable link such that the link includes one or more of the WAMs in the event the native application referenced by the AAM included in the link is not currently installed on the user device 200. The search application 116 may still further generate the user selectable links such that each of one or more of the links also includes one or more of the ADAs included in the search results 130. For example, the search application 116 may generate the user selectable links such that each of one or more of the links includes one of the AAMs included in the search results 130, and one or more of the ADAs included in the search results 130 that are each associated with the AAM (i.e., that each indicate a location at which the user device 200 may download the native application referenced by the AAM). In some examples, the search application 116 generates a particular user selectable link such that the link includes one or more of the ADAs in the event the native application referenced by the AAM included in the link is not currently installed on the user device 200.

As described above, upon generating the user selectable links, the search application 116 displays the links to the user. For example, the search application 116 may arrange the user selectable links within a list (e.g., using result scores received from the search system 100 as part of the search results 130), and display the list within the GUI of the search application 116. In block 1310, the search application 116 waits for the user to select one of the user selectable links displayed to the user. The method 1300 continues in block 1312 when the user selects (e.g., touches, or clicks on) one of the user selectable links displayed to the user.

In block 1312, in response to the user selecting one of the user selectable links, the user device 200 determines whether to set a native application referenced by an AAM included in the selected link into an application state specified by the AAM, or to set a web-based application referenced by a WAM also included in the selected link into a web application state specified by the WAM. In the example of the method 1300, the native application referenced by the AAM is not included (e.g., installed) on the user device 200. Also in this example, the web application state corresponds, or is similar to the application state of the native application. As described herein, in some examples, the user device 200 automatically determines whether to set the native application or the web-based application into its corresponding application state based on one or more of the following: (1) a size of (e.g., an amount of data used to download, install, and/or store) the native application; (2) bandwidth and/or quality of a data connection using which the user device 200 may download the native application (e.g., from a location indicated by an ADA included in the selected link); (3) an amount of storage space (e.g., memory) available on the user device 200 to download, install, and/or store the native application; (4) an amount of processing resources (e.g., a degree of availability of processing devices) present on the user device 200 to download, install, and/or store the native application; and (5) a number of native applications referenced by the AAMs included in the search results 130 that are not included (e.g., installed) on the user device 200, as well as any number of other considerations. As also described herein, in other examples, the user device 200 may determine whether to set the native application or the web-based application into its application state based on a user input received from the user. As one example, the user device 200 may prompt the user (e.g., via a "Download," or "Install" GUI element, or button) to download the native application onto the user device 200, and install the downloaded application on the user device 200. The user may accept the prompt, causing the user device 200 to download and install the native application, as described below with reference to block 1316. The user device 200 may then launch the native application, and set the application into the application state specified by the AAM, as described below with reference to block 1318. As another example, the user device 200 may prompt the user (e.g., via a "Web" GUI element, or button) to launch the web-based application, and set the launched application into the web application state specified by the WAM. The user may accept the prompt, causing the user device 200 to launch the web-based application, and set the application into the web application state, as described below with reference to block 1314.

In block 1314, upon determining to set the web-based application into the web application state, the user device 200 launches the web-based application on the user device 200, and sets the launched application into the web application state using the WAM. As described herein, in the example of the method 1300, the web application state corresponds, or is similar to the application state of the native application. For example, to set the web-based application into the web application state, the user device 200 may cause the application to perform one or more operations indicated by the WAM. For instance, the user device 200 may launch a web browser application 120 included on the user device 200, and cause the launched web browser application 120 to access a web resource (e.g., a web page of a website) identified by the WAM (e.g., by a resource identifier, such as a URL, or a web address, included in the WAM). Upon the user device 200 launching the web-based application, and setting the launched application into the web application state, the user may interact with the web application state. For example, the user may cause the web-based application to perform some or all of the functions associated with the corresponding, or similar application state of the native application specified by the AAM.

In some examples, upon (e.g., following, or in parallel with) launching the web-based application and setting the launched application into the web application state in the manner described above with reference to block 1314, the user device 200 also downloads and installs the native application in a similar manner as described below with reference to block 1316. In these examples, the user device 200 may download and install the native application for later use. For instance, at a later point in time, the user device 200 may launch the native application on the user device 200, and set the launched application into an application state specified by another AAM received by the user device 200 and included in another user selectable link upon the user selecting the link, in a similar manner as described below with reference to block 1318.

In block 1316, upon determining to set the native application into the application state, the user device 200 downloads the application onto the user device 200, and installs the downloaded application on the user device 200. For example, to download the native application, the user device 200 may access a location (e.g., a digital distribution platform) indicated by an ADA also included in the selected link. For instance, the user device 200 may download and install the native application in parallel with (e.g., in the background of) the search application 116. In some examples, rather than automatically downloading and installing the native application upon determining to set the application into the application state, the user device 200 is directed to the location indicated by the ADA (e.g., an entry, or a page, within a digital distribution platform). In these examples, the user device 200 may prompt the user (e.g., via a "Download," or "Install" GUI element, or button associated with the location) to download the native application from the location, and install the downloaded application on the user device 200. The user may accept the prompt, causing the user device 200 to download and install the native application.

In block 1318, upon downloading and installing the native application, the user device 200 launches the application on the user device 200, and sets the launched application into the application state using the AAM. For example, to set the native application into the application state, the user device 200 may cause the application to perform one or more operations indicated by the AAM. In some examples, rather than automatically launching the native application and setting the launched application into the application state upon downloading and installing the application, the user device 200 prompts the user (e.g., via an "Open," or a "View" GUI element, or button) to launch the application, and set the launched application into the application state.

The user may accept the prompt, causing the user device 200 to launch the native application, and set the launched application into the application state. Additionally, or alternatively, the user device 200 may update the selected link, or generate a new user selectable link that includes the AAM, to indicate to the user that the native application has been downloaded and installed on the user device 200. The user may select the updated or new link, causing the user device 200 to launch the native application, and set the launched application into the application state. Upon the user device 200 launching the native application, and setting the launched application into the application state, the user may interact with the application state (e.g., cause the application to perform some or all of the functions associated with the application state). In these examples, the user device 200 may minimize, move to the background, terminate (e.g., close), or otherwise manipulate (e.g., suspend, or alter a visible area of) the search application 116 such that the user may interact with the application state of the native application on the user device 200.

FIGS. 14A-14D illustrate other example GUIs that may be generated on one of the user devices 200 according to the present disclosure. Specifically, FIG. 14A shows an example GUI 462 of a search application 116 included on a user device 200, 200c. The GUI 462 includes some of the same or similar elements (e.g., user selectable links, headers, and other GUI elements, such as search fields, search buttons, and other buttons or links) as those of the GUI of the search application 116 included on the user device 200b, as described above with reference to FIG. 12. As shown in FIG. 14A, the GUI 462 includes a user selectable link 464 that specifies an application state of Urbanspoon (e.g., a particular application state, or a main page, or screen, of Urbanspoon). In this example, the link 464 includes an AAM that references Urbanspoon and indicates one or more operations for Urbanspoon to perform. As described herein, Urbanspoon performing the operations sets Urbanspoon into the application state. FIGS. 14B-14D show other example GUIs displayed on the user device 200c as a result of a user of the user device 200c interacting with the GUI 462 (i.e., as a result of the user selecting the link 464).

In the example of FIGS. 14A-14D, Urbanspoon is not installed on the user device 200c. Accordingly, the link 464 also includes an ADA that indicates a location (e.g., a download site, or a digital distribution platform, such as Google Play*) by Google Inc.) where the user device 200c may download Urbanspoon. Using the ADA, the user device 200c may access the location, download Urbanspoon onto the user device 200c, and install Urbanspoon on the user device 200c. As shown in FIG. 14A, the link 464 also includes a GUI element, or button, including the string "Free," indicating that the user may select the link 464 (e.g., the button) to download and install Urbanspoon in the manner described above free of charge. In other examples, the link 464 may include a GUI element, or button, including the string "Download," or "Install," indicating that the user may select the link 464 (e.g., the button) to download and install Urbanspoon for a fee. In this example, the link 464 also includes a WAM that specifies a web application state of a web-based version of Urbanspoon (e.g., references the web-based version, and indicates one or more operations for the web-based version to perform). Also in this example, the web application state of the web-based version of Urbanspoon corresponds, or is similar to (e.g., includes some or all of the same or similar information as) the application state of Urbanspoon specified by the AAM.

In the example of FIGS. 14A-14D, the user selects the link 464 included in the GUI 462 of FIG. 14A. In response to the user selecting the link 464, the user device 200c determines whether to launch Urbanspoon, and set Urbanspoon into the application state specified by the AAM included in the link 464, or to launch the web-based version of Urbanspoon (e.g., via a web browser application 120 included on the user device 200c), and set the web-based version of Urbanspoon into the web application state specified by the WAM included in the link 464. As described herein, the user device 200c may make this determination based one any of the following: (1) a user input received from the user (e.g., as shown in FIG. 14D); (2) a size of Urbanspoon; (3) bandwidth and/or quality of a data connection using, which the user device 200c may download Urbanspoon using the ADA; (4) an amount of storage space available on the user device 200c to download, install, and/or store Urbanspoon; (5) an amount of processing resources present on the user device 200c to download, install, and/or store Urbanspoon; and (6) a number of native applications referenced by AAMs received by the user device 200c as part of search results 130 in response to a search query 128 that are not included on the user device 200c. In a specific example, the GUI 480 of the user device 200c (e.g., of the search application 116) depicted in FIG. 14D is an example GUI, or screen that may be displayed on the user device 200c as part of the user device 200c determining whether to launch Urbanspoon, and set Urbanspoon into the application state, or to launch the web-based version of Urbanspoon, based on a user input (e.g., a response to a user prompt shown in FIG. 14D).

Upon determining to launch Urbanspoon, and set Urbanspoon into the application state, the user device 200c is directed to the location indicated by the ADA (not shown). The user device 200c then downloads Urbanspoon from the location, and installs Urbanspoon (e.g., automatically, or in response to a user input, as described herein). For example, the user device 200c may download and install Urbanspoon in the background of the search application 116. After downloading and installing Urbanspoon, the user device 200c launches Urbanspoon, and sets Urbanspoon into the application state (e.g., automatically, or in response to a user input, as also described herein), as shown in FIG. 14C'. Specifically, the GUI 468 of the user device 200c (e.g., of Urbanspoon executing on the user device 200c) depicted in FIG. 14C is an example GUI, or screen that may be displayed on the user device 200c upon the user device 200c launching Urbanspoon, and setting Urbanspoon into the application state specified by the AAM included in the link 464. In some examples (not shown), rather than automatically launching Urbanspoon, and setting Urbanspoon into the application state, upon downloading and installing Urbanspoon, the user device 200c modifies the link 464, or generate a new user selectable link that includes the AAM (and, e.g., excludes the ADA), so as to indicate to the user that Urbanspoon has been downloaded and installed on the user device 200c. In these examples, upon the user selecting the modified link, or the new link, the user device 200c launches Urbanspoon, and sets Urbanspoon into the application state, in a similar manner as described above.

Alternatively, upon determining to launch the web-based version of Urbanspoon, and set the web-based version of Urbanspoon into the web application state, the user device 200c may launch the web browser application 120 included on the user device 200c, and cause the launched web browser application 120 to access a web resource identified by the WAM, as shown in FIG. 14B. Specifically, the GUI 466 of the user device 200c (e.g., of the web browser application 120 executing on the user device 200c) depicted in FIG. 14B is an example GUI, or screen that may be displayed on the user device 200c upon the user device 200c launching the web-based version of Urbanspoon, and setting the web-based version of Urbanspoon into the web application state specified by the WAM included in the link 464, as described above. Notably, as shown in FIG. 14B, the GUI 466 includes some of the same or similar information as that included in the GUI 468 of FIG. 14C, which corresponds to the application state of Urbanspoon specified by the AAM included in the link 464. As also described herein, upon determining to launch the web-based version of Urbanspoon, and set the web-based version of Urbanspoon into the web application state, the user device 200c may also download and install Urbanspoon for later use.

Figure 15:
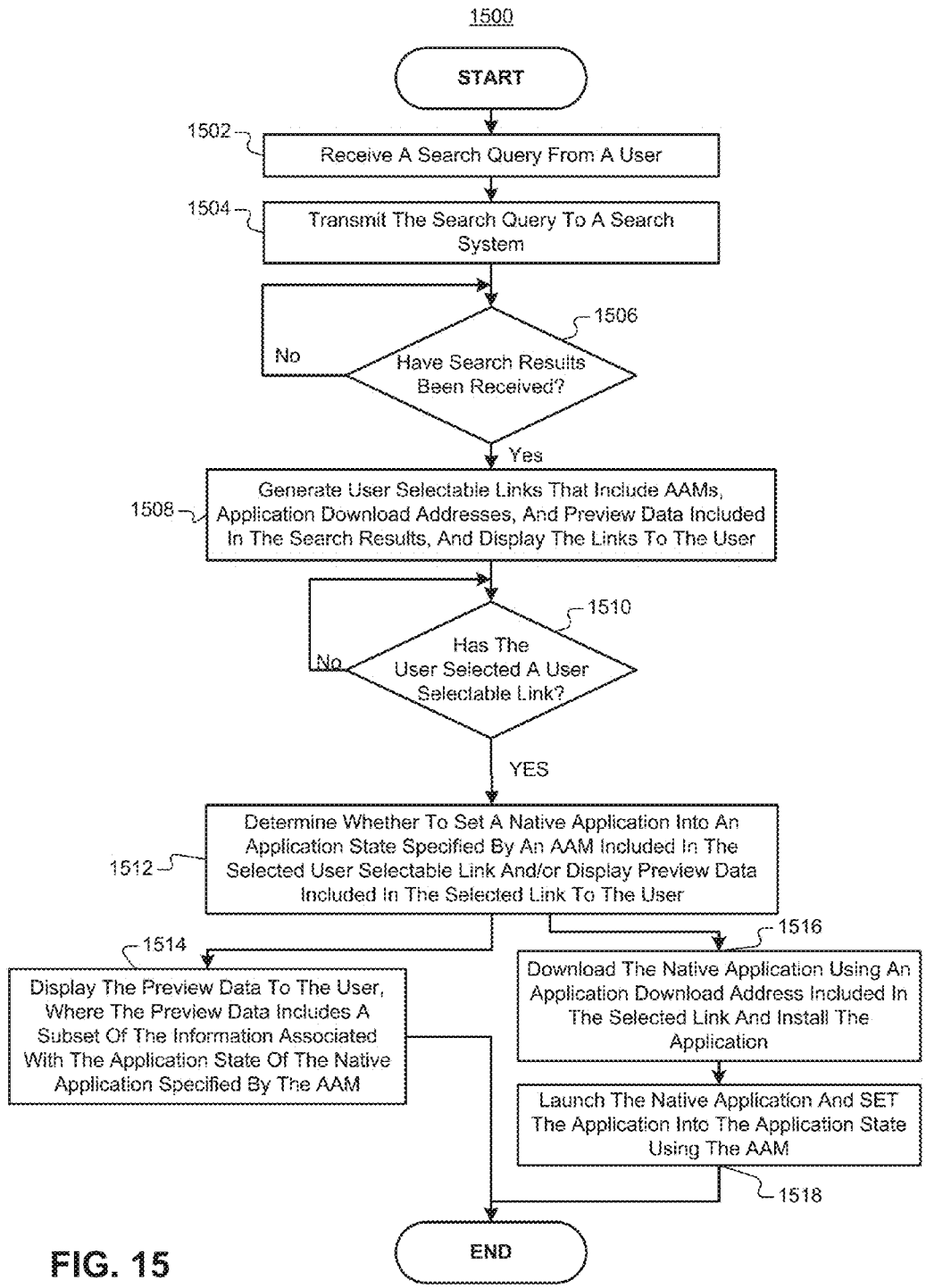
FIG. 15 is a flow diagram illustrating another example method describing operation of a user device.
Figure 16:
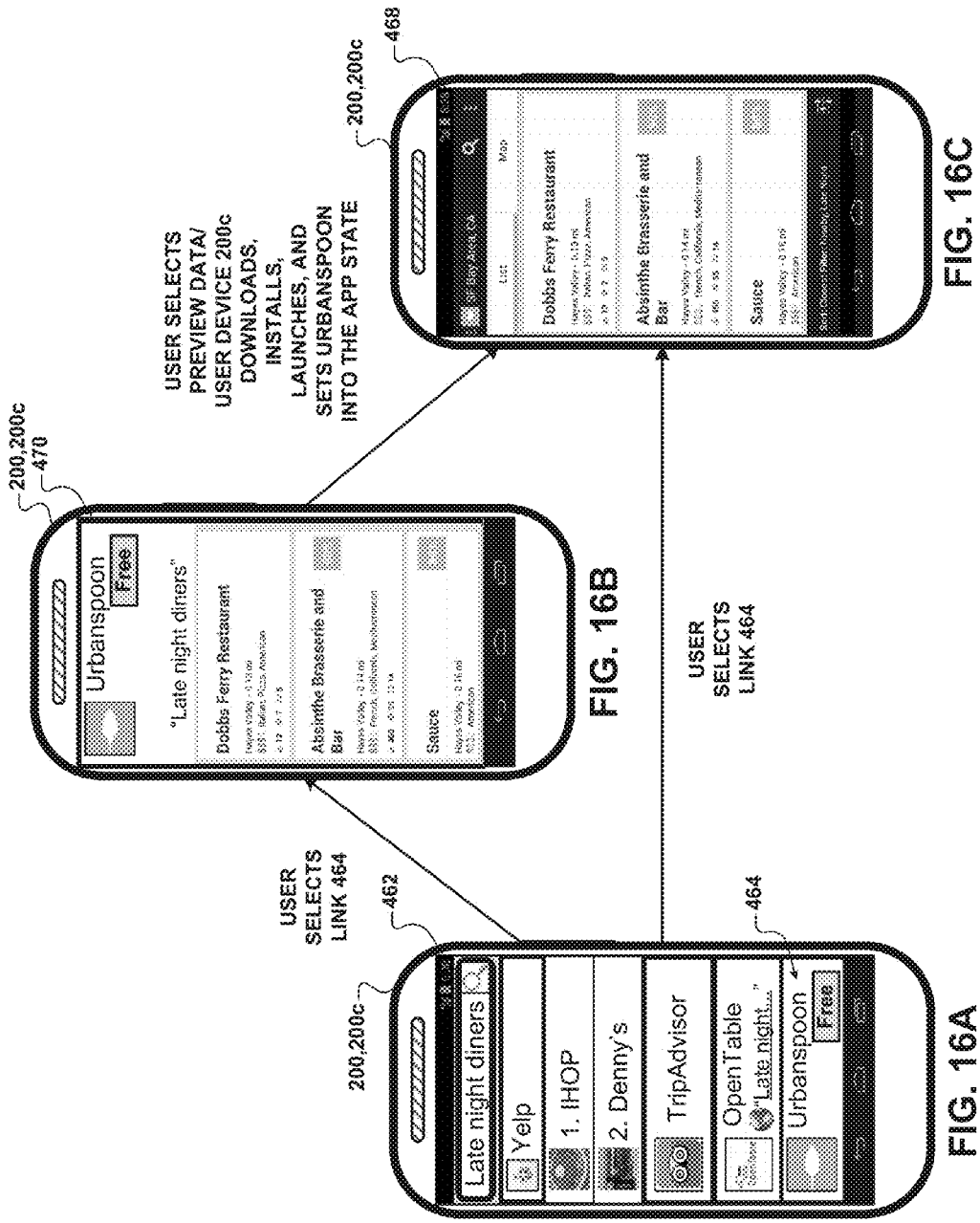
FIGS. 16A-16C illustrate other example GUIs that may be generated on a user device according to the present disclosure.

FIGS. 15-16C and the corresponding description below are directed to techniques for selectively performing one or more of launching a native application, and setting the application into an application state using a user device 200, and displaying a preview of the application state on the user device 200. Specifically, FIG. 15 is a flow diagram that illustrates an example method for selectively launching a native application, and setting the application into an application state, and/or displaying a preview of the application state, consistent with the techniques of this disclosure. FIGS. 16A-16C, in turn, illustrate example GUIs that may be displayed on a user device 200 both prior to and after a native application is launched and set into an application state using the user device 200, and a preview of the application state is displayed on the user device 200, in the manner described with reference to FIG. 15.

FIG. 15 shows another example method 1500 describing operation of one of the user devices 200. In a similar manner as described above with reference to FIGS. 6 and 13, it may be assumed that the user device 200 described with reference to the method 1500 includes a search application 116 that is configured to communicate with the search system 100, and that the search application 116 executing on the user device 200 generates a GUI that receives search queries 128 from users of the user device 200, and displays search results 130 received by the user device 200 from the search system 100 in response to the user device 200 transmitting the search queries 128 to the search system 100. The method 1500 is described with reference to the search system 100 and one of the user devices 200 of FIGS. 1 and 2, and the components thereof.

Blocks 1502-1506 of the example method 1500 are analogous to blocks 1302-1306 of the example method 1300 described above with reference to FIG. 13. In the example method 1500, the search results 130 received by the user device 200 from the search system 100 may include one or more AAMs that each reference a native application and indicate one or more operations for the application to perform. Also in this example, the search results 130 may further include one or more ADAs that each indicate a location (e.g., a digital distribution platform) at which the user device 200 may download a native application referenced by one of the AAMs included in the search results 130. For example, for each of one or more of the AAMs included in the search results 130, the search results 130 may further include one or more ADAs that are each associated with the AAM (i.e., that each indicate a location at which the user device 200 may download the native application referenced by the AAM). Also in this example, the search results 130 may still further include preview data associated with each of one or more of the AAMs included in the search results 130. For example, the preview data included in the search results 130 may include a subset (e.g., a preview) of the information associated with (e.g., displayed as part of) an application state of a native application specified by each of one or more of the AAMs. For instance, for each of one or more of the AAMs, the search results 130 may further include preview data that is associated with the AAM (i.e., that includes a subset of the information associated with an application state specified by the AAM). In some examples, the preview data includes text, image, and/or audiovisual data. For instance, in examples where one of the AAMs included in the search results 130 specifies an application state of a native online shopping application, the application state may include a description (e.g., text and/or image data) of one or more products that are available for sale via the application. In these examples, the preview data associated with the AAM and included in the search results 130 may include a subset of the description (e.g., some of the text and/or image data). Additionally, in examples where one of the AAMs specifies an application state of a native media (e.g., audio and/or video) playing (e.g., streaming) application, the application state may include one or more songs and/or videos that are available for playback via the application, as well as a description (e.g., text and/or image data) thereof. In these examples, the preview data associated with the AAM and included in the search results 130 may include a subset of the songs and/or videos (e.g., a short audio snippet and/or a movie trailer) and/or of the description (e.g., some of the text and/or image data).

The search results 130 may also include one or more result scores associated with the AAMs, as described herein. Additionally, the search results 130 may include link data (e.g., text and/or images) for each of the AAMs, as also described herein. As described in greater detail below, the search application 116 may generate one or more user selectable links for the AAMs included in the search results 130 using the received link data, and display the links to the user within the GUI of the search application 116 (e.g., by arranging the links within a list using the corresponding received results scores). As also described below, the search application 116 may generate the user selectable links such that one or more of the links each includes one or more of the ADAs included in the search results 130. As further described below, the search application 116 may generate the user selectable links such that one or more of the links each includes the corresponding preview data included in the search results 130.

Accordingly, in block 1508, the search application 116 generates one or more user selectable links that include the AAMs, ADAs, and preview data included in the search results 130 (e.g., using link data received from the search system 100 as part of the search results 130). For example, the search application 116 may generate one user selectable link for each AAM included in the search results 130. The search application 116 may further generate the user selectable links such that each of one or more of the links also includes one or more of the ADAs included in the search results 130. For example, the search application 116 may generate the user selectable links such that each of one or more of the links includes one of the AAMs included in the search results 130, and one or more of the ADAs included in the search results 130 that are each associated with the AAM (i.e., that each indicate a location at which the user device 200 may download the native application referenced by the AAM). In some examples, the search application 116 generates a particular user selectable link such that the link includes one or more of the ADAs in the event the native application referenced by the AAM included in the link is not currently installed on the user device 200. The search application 116 may still further generate the user selectable links such that each of one or more of the links also includes preview data included in the search results 130. For example, the search application 116 may generate the user selectable links such that each of one or more of the links includes one of the AAMs included in the search results 130, and the preview data included in the search results 130 that is associated with the AAM (i.e., that includes a subset of the information associated with an application state specified by the AAM). In some examples, the search application 116 generates a particular user selectable link such that the link includes the preview data in the event the native application referenced by the AAM included in the link is not currently installed on the user device 200.

As described above, upon generating the user selectable links, the search application 116 displays the links to the user. For example, the search application 116 may arrange the user selectable links within a list (e.g., using result scores received from the search system 100 as part of the search results 130), and display the list within the GUI of the search application 116. In block 1510, the search application 116 waits for the user to select one of the user selectable links displayed to the user. The method 1500 continues in block 1512 when the user selects (e.g., touches, or clicks on) one of the user selectable links displayed to the user.

In block 1512, in response to the user selecting one of the user selectable links, the user device 200 determines whether to set a native application referenced by an AAM included in the selected link into an application state specified by the AAM, and/or to display preview data also included in the selected link to the user. In the example of the method 1500, the native application referenced by the AAM is not included (e.g., installed) on the user device 200. Also in this example, the preview data includes a subset of the information associated with the application state specified by the AAM. As described herein, in some examples, the user device 200 automatically determines whether to set the native application into the application state and/or to display the preview data based on one or more of the following: (1) a size of the native application; (2) bandwidth and/or quality of a data connection using which the user device 200 may download the native application; (3) an amount of storage space available on the user device 200 to download, install, and/or store the native application; (4) an amount of processing resources present on the user device 200 to download, install, and/or store the native application; and (5) a number of native applications referenced by the AAMs included in the search results 130 that are not included (e.g., installed) on the user device 200, as well as any number of other considerations. As also described herein, in other examples, the user device 200 may determine whether to set the native application into the application state and/or display the preview data based on a user input received from the user. As one example, the user device 200 may prompt the user (e.g., via a "Download," or "Install" GUI element, or button) to download the native application onto the user device 200, and install the downloaded application on the user device 200. The user may accept the prompt, causing the user device 200 to download and install the native application, as described below with reference to block 1516. The user device 200 may then launch the native application, and set the application into the application state specified by the AAM, as described below with reference to block 1518. As another example, the user device 200 may prompt the user (e.g., via a "Preview" GUI element, or button) to display the preview data to the user. The user may accept the prompt, causing the user device 200 to display the preview data to the user, as described below with reference to block 1514.

In block 1514, upon determining to display the preview data to the user, the user device 200 displays the preview data on the user device 200 (e.g., on a display of the user device 200). In some examples, the search application 116 displays the preview data along with the links. As one example, the search application 116 may display the preview data by expanding the selected link, and displaying the preview data within the expanded link. As another example, the search application 116 may display the preview data adjacent to the selected link. In other examples, the search application 116 may display the preview data in place of the links, or in another manner. Upon the user device 200 displaying the preview data to the user, the user may interact with the displayed preview data. As one example, the user may view the preview data. As another example, the user may select (e.g., touch, or click on) the displayed preview data, causing the user device 200 to perform one or more of downloading, installing, and launching the native application, and setting the application into the application state specified by the AAM, in a similar manner as described below with reference to blocks 1516 and 1518.

Blocks 1516 and 1518 of the example method 1500 are analogous to blocks 1316 and 1318 of the example method 1300 described above with reference to FIG. 13. Specifically, in blocks 1516 and 1518, upon determining to set the native application into the application state, the user device 200 downloads, installs, and launches the application, and sets the application into the application state, in a similar manner as described above with reference to blocks 1316 and 1318 (e.g., automatically, or using the various user inputs and prompts described above with reference to the example method 1300). In some examples, in block 1512 described above, the user device 200 determines to set the native application into the application state and to display the preview data to the user. In these examples, the method 1500 may proceed from block 1512 to each of blocks 1514, 1516, and 1518. For example, the user device 200 may download and install the native application, as described above with reference to block 1516, in parallel with (e.g., in the background of) the user device 200 displaying the preview data to the user, as described above with reference to block 1514. Upon downloading and installing the native application, the user device 200 may launch the application and set the application into the application state, as described above with reference to block 1518. In these examples, the user device 200 may minimize, move to the background, terminate (e.g., close), or otherwise manipulate (e.g., suspend, or alter a visible area of) the displayed preview data (e.g., automatically, or based on a user input) such that the user may interact with the application state of the native application on the user device 200.

In some examples, in a similar manner as described above with reference to the example method 1300 of FIG. 13, in response to the user selecting the link, the user device 200 further determines whether to set a web-based application referenced by a WAM also included in the selected link into a web application state specified by the WAM.

FIGS. 16A-16C illustrate still other example GUIs that may be generated on one of the user devices 200 according to the present disclosure. FIGS. 16A and 16C are analogous to FIGS. 14A and 14C, respectively, and include some of the same or similar elements (e.g., user selectable links, headers, and other GUI elements, such as search fields, search buttons, and other buttons or links) as those described above with reference to FIGS. 14A and 14C. FIG. 16B shows an example GUI 470 displayed on the user device 200c as a result of the user interacting with the GUI 462 of FIG. 16A (i.e., as a result of the user selecting the link 464).

In the example of FIGS. 16A-16C, the link 464 includes the AAM, the ADA, and preview data that includes a subset of the information associated with the application state specified by the AAM. For example, the preview data may include a subset of the text, image, and/or audiovisual data that is included in (e.g., displayed as part of) the application state. In this example, in response to the user selecting the link 464, the user device 200c determines whether to launch Urbanspoon, and set Urbanspoon into the application state, or to display the preview data to the user. As described herein, the user device 200c may make this determination based one any of the following: (1) a user input received from the user; (2) a size of Urbanspoon; (3) bandwidth and/or quality of a data connection using, which the user device 200c may download Urbanspoon using the ADA; (4) an amount of storage space available on the user device 200c to download, install, and/or store Urbanspoon; (5) an amount of processing resources present on the user device 200c to download, install, and/or store Urbanspoon; and (6) a number of native applications referenced by AAMs received by the user device 200c as part of search results 130 in response to a search query 128 that are not included on the user device 200c. Upon determining to launch Urbanspoon, and set Urbanspoon into the application state, the user device 200c may display the GUI 468 shown in FIG. 16C, in a similar manner as described above with reference to FIG. 14C (e.g., automatically, based on one or more user inputs, and/or by updating the link 464, or generating a new user selectable link, as previously described). Additionally, or alternatively, upon determining to display the preview data to the user, the user device 200c may display the preview data on the user device 200 (e.g., on a display of the user device 200c), as shown in FIG. 16B. Specifically, the GUI 470 of the user device 200c (e.g., of the search application 116) depicted in FIG. 16B is an example GUI, or screen that may be displayed on the user device 200c upon the user device 200c displaying the preview data to the user. For example, the search application 116 may display the preview data alongside the link 470 (not shown), within an expanded version of the link 470, as shown in FIG. 16B, or in place of the link 470 (not shown). Notably, as shown in FIG. 16B, the GUI 470, which corresponds to the preview data included in the link 464, includes a subset of the information included in the GUI 468 of FIG. 16C, which corresponds to the application state of Urbanspoon specified by the AAM included in the link 464.

As described herein, the user may interact with the displayed preview data. For example, the user may view and/or select the preview data (e.g., touch, or click on, the GUI 470). In response to the user selecting the preview data, the user device 200c may download, install, and launch Urbanspoon, and set Urbanspoon into the application state (e.g., automatically, or based on one or more user inputs, as previously described), as shown in FIG. 16C. In other examples, the user device 200c may download, install, and launch Urbanspoon, and set Urbanspoon into the application state without the user selecting the preview data (e.g., in parallel with displaying the preview data). In some examples, the user device 200c downloads and installs Urbanspoon in the background of the displayed preview data. In these examples, upon launching Urbanspoon, and setting Urbanspoon into the application state, the user device 200c may minimize, move to the background, terminate (e.g., close), or otherwise manipulate (e.g., suspend, or alter a visible area of) the preview data such that the user may interact with the application state of the native application on the user device 200.

Figure 17:
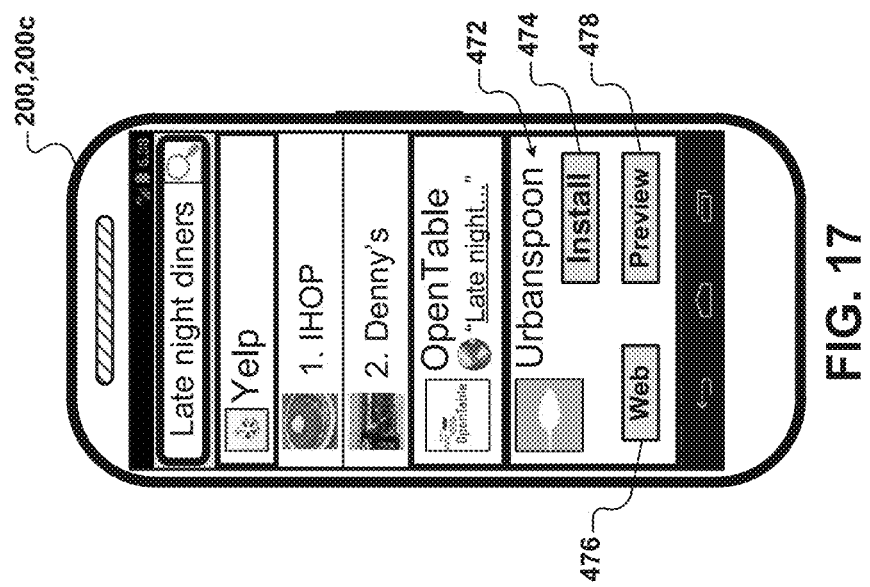
FIG. 17 shows an example GUI that includes a user selectable link including various user selectable GUI elements.

FIG. 17 illustrates still another example GUI that may be generated on one of the user devices 200 according to the present disclosure. Specifically, the GUI of FIG. 17 illustrates various GUI elements, or buttons that the search application 116 of the user device 200c may display to the user as part of a user selectable link 472. The link 472 of FIG. 17 is analogous to the link 464 described above with reference to FIGS. 14A-14D and 16A-16C. As shown in FIG. 17, the link 472 includes a GUI element, or button, 474 including the string "Install," indicating that the user may select the link 472 (e.g., the button 474) to download, install, and launch Urbanspoon on the user device 200c, and set Urbanspoon into an application state specified by an AAM included in the link 472. As also shown in FIG. 17, the link 472 further includes a GUI element, or button, 476 including the string "Web," indicating that the user may select the link 472 (e.g., the button 476) to launch a web-based version of Urbanspoon on the user device 200c, and set the web-based version of Urbanspoon into a web application state specified by a WAM included in the link 472. As also shown in FIG. 17, the link 472 still further includes a GUI element, or button, 478 including the string "Preview," indicating that the user may select the link 472 (e.g., the button 478), causing the user device 200c to display preview data included in the link 472 that includes a subset of the information associated with the application state.

The modules and data stores included in the search system 100 represent features that may be included in the search system 100 of the present disclosure. For example, the search module 110 and the data store 108 may represent features included in the search system 100. The modules and data stores described herein may be embodied by electronic hardware, software, firmware, or any combination thereof. Depiction of different features as separate modules and data stores does not necessarily imply whether the modules and data stores are embodied by common or separate electronic hardware or software components. In some implementations, the features associated with the one or more modules and data stores depicted herein are realized by common electronic hardware and software components. In other implementations, the features associated with the one or more modules and data stores depicted herein may be realized by separate electronic hardware and software components.

The modules and data stores may be embodied by electronic hardware and software components including, but not limited to, one or more processing units, one or more memory components, one or more input/output (I/O) components, and interconnect components. The interconnect components may be configured to provide communication between the one or more processing units, memory components, and I/O components. For example, the interconnect components may include one or more buses that are configured to transfer data between electronic components. The interconnect components may also include control circuits (e.g., a memory controller and/or an I/O controller) that are configured to control communication between electronic components.

The one or more processing units may include one or more central processing units (CPUs), graphics processing units (GPUs), digital signal processing units (DSPs), or other processing units. The one or more processing units may be configured to communicate with the one or more memory components and I/O components. For example, the one or more processing units may be configured to communicate with the one or more memory components and I/O components via the interconnect components.

A memory component, or memory, may include any volatile or non-volatile media. For example, the memory may include electrical media, magnetic media, and/or optical media, such as a random access memory (RAM), read-only memory (ROM), non-volatile RAM (NVRAM), electrically-erasable programmable ROM (EEPROM), Flash memory, hard disk drives (HDD), magnetic tape drives, optical storage technology (e.g., compact disc, digital versatile disc, and/or Blu-ray Disc), or any other memory components.

The one or more memory components may include (e.g., store) the data described herein. For example, the one or more memory components may include the data included in the function records of the data store 108. The one or more memory components may also include instructions that may be executed by the one or more processing units. For example, the one or more memory components may include computer-readable instructions that, when executed by one or more processing units, cause the one or more processing units to perform the various functions attributed to the modules and data stores described herein.

The one or more I/O components may refer to electronic hardware and software that provides communication with a variety of different devices. For example, the one or more I/O components may provide communication between other devices and the one or more processing units and memory components. In some examples, the one or more I/O components are configured to communicate with a computer network. For example, the one or more I/O components may be configured to exchange data over a computer network using a variety of different physical connections, wireless connections, and protocols. The one or more I/O components may include network interface components (e.g., a network interface controller), repeaters, network bridges, network switches, routers, and firewalls. In some examples, the one or more I/O components include hardware and software that is configured to communicate with various human interface devices, including, but not limited to, display screens, keyboards, pointer devices (e.g., a mouse), touchscreens, speakers, and microphones. In some examples, the one or more I/O components include hardware and software that is configured to communicate with additional devices, such as external memory (e.g., external HDDs).

In some implementations, the search system 100 is a system of one or more computing devices (e.g., a computer search system) that is configured to implement the techniques described herein. Put another way, the features attributed to the modules and data stores described herein may be implemented by one or more computing devices. Each of the one or more computing devices may include any combination of electronic hardware, software, and/or firmware described above. For example, each of the one or more computing devices may include any combination of the one or more processing units, memory components, I/O components, and the interconnect components described above. The one or more computing devices may also include various human interface devices, including, but not limited to, display screens, keyboards, pointing devices (e.g., a mouse), touchscreens, speakers, and microphones. The one or more computing devices may also be configured to communicate with additional devices, such as external memory (e.g., external HDDs).

The one or more computing devices of the search system 100 may be configured to communicate with the network 106. The one or more computing devices may also be configured to communicate with one another via a computer network. In some examples, the one or more computing devices include one or more server computing devices configured to communicate with the user devices 200 (e.g., receive search queries 128, and transmit search results 130), gather data from the data sources 104, index the data, store the data, and store other documents. The one or more computing devices reside within a single machine at a single geographic location in some examples. In other examples, the one or more computing devices may reside within multiple machines at a single geographic location. In still other examples, the one or more computing devices may be distributed across a number of geographic locations.

Additionally, the various implementations of the search system 100 described above (e.g., using one or more computing devices that include one or more processing units, memory components, I/O components, and interconnect components) are equally applicable to any of the user devices 200, as well as to the various components thereof, as described herein.

Figure 18:
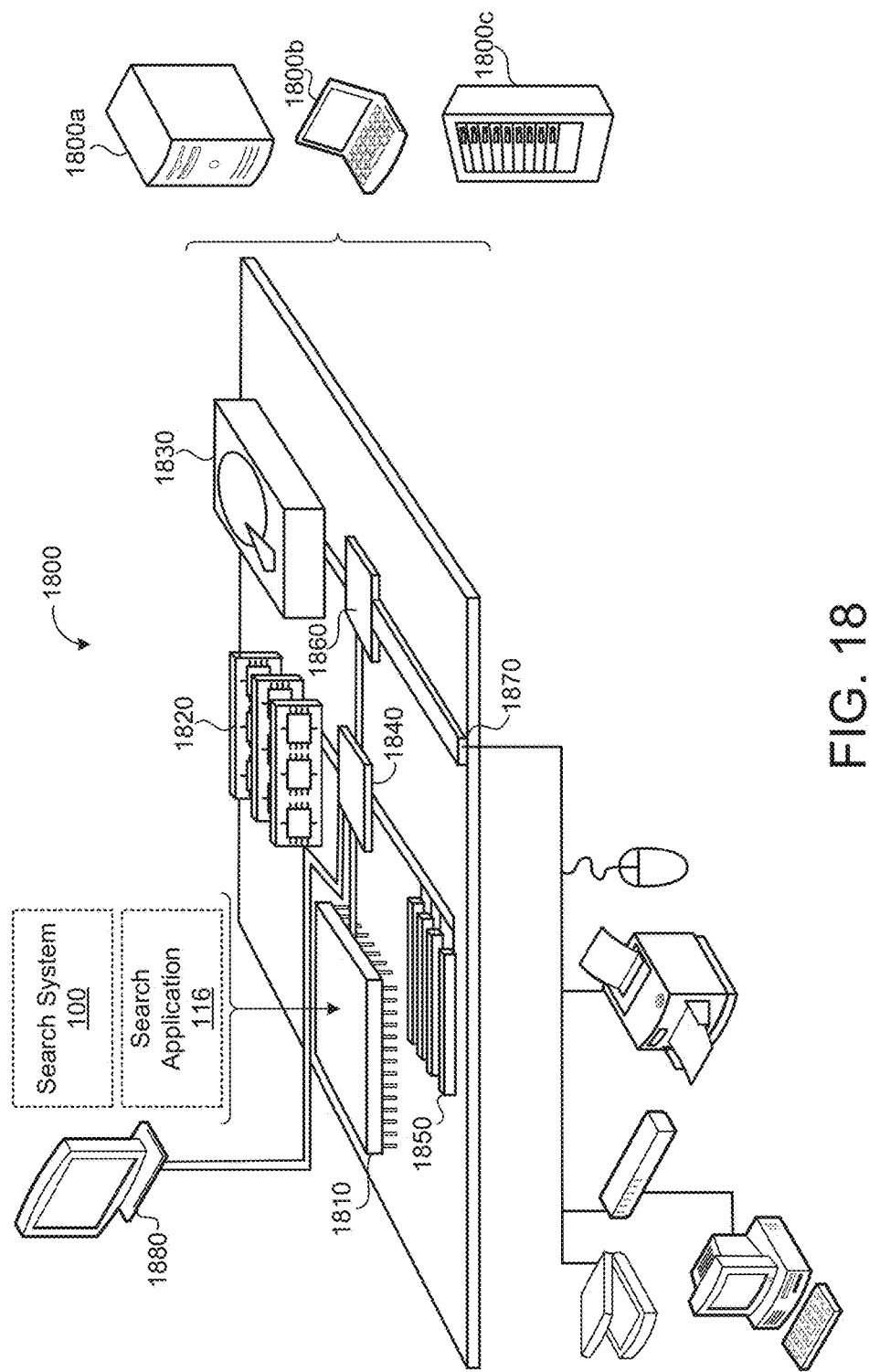
FIG. 18 is a schematic view of an example computing device executing any systems or methods described herein.

FIG. 18 is schematic view of an example computing device 1800 that may be used to implement the systems and methods described in this document. The computing device 1800 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 1800 includes a processor 1810, memory 1820, a storage device 1830, a high-speed interface/controller 1840 connecting to the memory 1820 and high-speed expansion ports 1850, and a low speed interface/controller 1860 connecting to low speed bus 1870 and storage device 1830. Each of the components 1810, 1820, 1830, 1840, 1850, and 1860, are interconnected using various busses, and may be mounted on a common motherboard or in other manners as appropriate. The processor 1810 may process instructions for execution within the computing device 1800, including instructions stored in the memory 1820 or on the storage device 1830 to display graphical information for a graphical user interface (GUI) on an external input/output device, such as display 1880 coupled to high speed interface 1840. In other implementations, multiple processors and/or multiple buses may be used, as appropriate, along with multiple memories and types of memory. Also, multiple computing devices 1800 may be connected, with each device providing portions of the necessary operations (e.g., as a server bank, a group of blade servers, or a multi-processor system).

The memory 1820 stores information non-transitorily within the computing device 1800. The memory 1820 may be a computer-readable medium, a volatile memory unit(s), or non-volatile memory unit(s). The non-transitory memory 1820 may be physical devices used to store programs (e.g., sequences of instructions) or data (e.g., program state information) on a temporary or permanent basis for use by the computing device 1800. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 1830 is capable of providing mass storage for the computing device 1800. In some implementations, the storage device 1830 is a computer-readable medium. In various different implementations, the storage device 1830 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 1820, the storage device 1830, or memory on processor 1810.

The high speed controller 1840 manages bandwidth-intensive operations for the computing device 1800, while the low speed controller 1860 manages lower bandwidth-intensive operations. Such allocation of duties is exemplary only. In some implementations, the high-speed controller 1840 is coupled to the memory 1820, the display 1880 (e.g., through a graphics processor or accelerator), and to the high-speed expansion ports 1850, which may accept various expansion cards (not shown). In some implementations, the low-speed controller 1860 is coupled to the storage device 1830 and low-speed expansion port 1870. The low-speed expansion port 1870, which may include various communication ports (e.g., USB, Bluetooth, Ethernet, wireless Ethernet), may be coupled to one or more input/output devices, such as a keyboard, a pointing device, a scanner, or a networking device, such as a switch or router, e.g., through a network adapter.

The computing device 1800 may be implemented in a number of different forms, as shown in the figure. For example, it may be implemented as a standard server 1800a or multiple times in a group of such servers 1800a, as a laptop computer 1800b, or as part of a rack server system 1800c.

Various implementations of the systems and techniques described here may be realized in digital electronic and/or optical circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification may be implemented in digital electronic circuitry, or in computer software, firmware, or hardware, including the structures disclosed in this specification and their structural equivalents, or in combinations of one or more of them. Moreover, subject matter described in this specification may be implemented as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as an application, program, software, software application, script, or code) may be written in any form of programming language, including compiled or interpreted languages, and it may be deployed in any form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor may receive instructions and data from a read only memory or a random access memory or both. The essential elements of a computer are a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, one or more aspects of the disclosure may be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user may provide input to the computer. Other kinds of devices may be used to provide interaction with a user as well; for example, feedback provided to the user may be any form of sensory feedback, e.g., visual feedback, auditory feedback, or tactile feedback; and input from the user may be received in any form, including acoustic, speech, or tactile input. In addition, a computer may interact with a user by sending documents to and receiving documents from a device that is used by the user; for example, by sending web pages to a web browser on a user's client device in response to requests received from the web browser.

One or more aspects of the disclosure may be implemented in a computing system that includes a backend component, e.g., as a data server, or that includes a middleware component, e.g., an application server, or that includes a frontend component, e.g., a client computer having a graphical user interface or a Web browser through which a user may interact with an implementation of the subject matter described in this specification, or any combination of one or more such backend, middleware, or frontend components. The components of the system may be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system may include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) may be received from the client device at the server.

FIG. 18 is schematic view of an example computing device 1800 that may be used to implement the systems and methods described in this document. The computing device 1800 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 1800 includes a processor 1810, memory 1820, a storage device 1830, a high-speed interface/controller 1840 connecting to the memory 1820 and high-speed expansion ports 1850, and a low speed interface/controller 1860 connecting to low speed bus 1870 and storage device 1830. Each of the components 1810, 1820, 1830, 1840, 1850, and 1860, are interconnected using various busses, and may be mounted on a common motherboard or in other manners as appropriate. The processor 1810 may process instructions for execution within the computing device 1800, including instructions stored in the memory 1820 or on the storage device 1830 to display graphical information for a graphical user interface (GUI) on an external input/output device, such as display 1880 coupled to high speed interface 1840. In other implementations, multiple processors and/or multiple buses may be used, as appropriate, along with multiple memories and types of memory. Also, multiple computing devices 1800 may be connected, with each device providing portions of the necessary operations (e.g., as a server bank, a group of blade servers, or a multi-processor system).

The memory 1820 stores information non-transitorily within the computing device 1800. The memory 1820 may be a computer-readable medium, a volatile memory unit(s), or non-volatile memory unit(s). The non-transitory memory 1820 may be physical devices used to store programs (e.g., sequences of instructions) or data (e.g., program state information) on a temporary or permanent basis for use by the computing device 1800. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 1830 is capable of providing mass storage for the computing device 1800. In some implementations, the storage device 1830 is a computer-readable medium. In various different implementations, the storage device 1830 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 1820, the storage device 1830, or memory on processor 1810.

The high speed controller 1840 manages bandwidth-intensive operations for the computing device 1800, while the low speed controller 1860 manages lower bandwidth-intensive operations. Such allocation of duties is exemplary only. In some implementations, the high-speed controller 1840 is coupled to the memory 1820, the display 1880 (e.g., through a graphics processor or accelerator), and to the high-speed expansion ports 1850, which may accept various expansion cards (not shown). In some implementations, the low-speed controller 1860 is coupled to the storage device 1830 and low-speed expansion port 1870. The low-speed expansion port 1870, which may include various communication ports (e.g., USB, Bluetooth, Ethernet, wireless Ethernet), may be coupled to one or more input/output devices, such as a keyboard, a pointing device, a scanner, or a networking device, such as a switch or router, e.g., through a network adapter.

The computing device 1800 may be implemented in a number of different forms, as shown in the figure. For example, it may be implemented as a standard server 1800a or multiple times in a group of such servers 1800a, as a laptop computer 1800b, or as part of a rack server system 1800c.

Various implementations of the systems and techniques described here may be realized in digital electronic and/or optical circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification may be implemented in digital electronic circuitry, or in computer software, firmware, or hardware, including the structures disclosed in this specification and their structural equivalents, or in combinations of one or more of them. Moreover, subject matter described in this specification may be implemented as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as an application, program, software, software application, script, or code) may be written in any form of programming language, including compiled or interpreted languages, and it may be deployed in any form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor may receive instructions and data from a read only memory or a random access memory or both. The essential elements of a computer are a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, one or more aspects of the disclosure may be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user may provide input to the computer. Other kinds of devices may be used to provide interaction with a user as well; for example, feedback provided to the user may be any form of sensory feedback, e.g., visual feedback, auditory feedback, or tactile feedback; and input from the user may be received in any form, including acoustic, speech, or tactile input. In addition, a computer may interact with a user by sending documents to and receiving documents from a device that is used by the user; for example, by sending web pages to a web browser on a user's client device in response to requests received from the web browser.

One or more aspects of the disclosure may be implemented in a computing system that includes a backend component, e.g., as a data server, or that includes a middleware component, e.g., an application server, or that includes a frontend component, e.g., a client computer having a graphical user interface or a Web browser through which a user may interact with an implementation of the subject matter described in this specification, or any combination of one or more such backend, middleware, or frontend components. The components of the system may be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system may include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) may be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims may be performed in a different order and still achieve desirable results.

While this specification contains many specifics, these should not be construed as limitations on the scope of the disclosure or of what may be claimed, but rather as descriptions of features specific to particular implementations of the disclosure. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims may be performed in a different order and still achieve desirable results.

What is claimed is:

1. A method comprising:
    transmitting a search query to an external search system configured to generate search results in response to a received search query;
    receiving search results from the external search system in response to transmitting the search query, the search results including at least one application access mechanism (AAM) each specifying an application state of a native application, at least one application download address (ADA) each indicating a location at which the native application may be downloaded, and at least one web access mechanism (WAM) each specifying a web application state of a web-based application, the at least one AAM being selected by the external search system from among a set of function records identified by the external search system based on the search query;
    generating at least one user selectable link each including at least part of the at least one AAM, the at least one ADA, and the at least one WAM received from the external search system;
    displaying the at least one user selectable link;
    receiving a user selection on a first user selectable link of the at least one user selectable link; and
    in response to receiving the user selection, downloading a native application corresponding to the first user selectable link using an ADA corresponding to the first user selectable link, installing the native application corresponding to the first user selectable link, launching the native application corresponding to the first user selectable link, and setting the native application corresponding to the first user selectable link into an application state specified by an AAM corresponding to the first user selectable link.

2. The method of claim 1,
    wherein the at least one AAM references the native application and indicates one or more operations for the native application to perform,
    wherein the native application performing the one or more operations sets the native application into the application state,
    wherein the at least one WAM references the web-based application and indicates one or more operations for the web-based application to perform, and
    wherein the web-based application performing the one or more operations sets the web-based application into the web application state.

3. The method of claim 1,
    wherein the web-based application comprises a web version of the native application, and
    wherein the web application state of the web-based application corresponds to the application state of the native application.

4. The method of claim 1, further comprising:
    in response to receiving the user selection, determining whether to download, install, and launch the native application and set the native application into the application state, or launch the web-based application and set the web-based application into the web application state,
    wherein the downloading, installing, and launching of the native application and setting the native application into the application state, or the launching of the web-based application and setting the web-based application into the web application state comprises:
        downloading, installing, and launching the native application and setting the native application into the application state based on the determination, or
        launching the web-based application and setting the web-based application into the web application state based on the determination.

5. The method of claim 4, further comprising:
    receiving a user input,
    wherein the determining of whether to download, install, and launch the native application and set the native application into the application state, or launch the web-based application and set the web-based application into the web application state comprises determining based on the user input.

6. The method of claim 4, wherein the determining of whether to download, install, and launch the native application and set the native application into the application state, or launch the web-based application and set the web-based application into the web application state comprises determining based on one or more of a size of the native application, bandwidth and quality of a data connection used to download the native application, an amount of memory resources and an amount of processing resources available for one or more of downloading, installing, and launching the native application and setting the native application into the application state, or a number of native applications referenced by AAMs included in the search results that are not installed.

7. The method of claim 1, further comprising:
receiving a user input,
wherein the downloading, installing, and launching of the native application and setting the native application into the application state comprises, in response to receiving the user input, downloading, installing, and launching the native application and setting the native application into the application state.

8. The method of claim 7,
wherein the user selection comprises a first user selection on the first user selectable link, and
wherein the downloading, installing, and launching of the native application and setting the native application into the application state comprises:
in response to receiving the first user selection, accessing the location indicated by the ADA corresponding to the first user selectable link;
displaying a graphical user interface (GUI) associated with the location, the GUI including a second user selectable link that is different from the first user selectable link, the user input comprising a second user selection of the second user selectable link that is different from the first user selection; and
in response to receiving the second user selection, downloading the native application from the location, installing the native application, launching the native application, and setting the native application into the application state corresponding to the second user selectable link.

9. The method of claim 7, wherein the downloading, installing, and launching of the native application and setting the native application into the application state comprises:
in response to receiving the user selection, downloading the native application from the location and installing the native application; and
in response to receiving the user input, launching the native application and setting the native application into the application state.

10. The method of claim 9,
wherein the user selection comprises a first user selection on the first user selectable link, and
wherein the launching of the native application and setting the native application into the application state in response to receiving the user input comprises:
generating a second user selectable link that is different from the first use selectable link, the second user selectable link including the AAM corresponding to the second user selectable link;
displaying the second user selectable link, the user input comprising a second user selection of the second user selectable link that is different from the first user selection; and
in response to receiving the second user selection, launching the native application and setting the native application into the application state corresponding to the second user selectable link.

11. The method of claim 10,
wherein the at least one AAM comprises a first AAM,
wherein the search results further include a second AAM that is different from the first AAM,
wherein the first and second AAMs reference different editions of the native application,
wherein the method further comprises determining that the first AAM references the edition of the native application downloaded from the location indicated by the ADA, and
wherein the generating of the second user selectable link comprises generating the link such that the link includes the first AAM and excludes the second AAM based on the determination.

12. The method of claim 10,
wherein the at least one AAM comprises a first AAM,
wherein the search results further include a second AAM that is different from the first AAM,
wherein the first and second AAMs reference different editions of the native application,
wherein the generating of the second user selectable link comprises generating the link such that the link further includes the second AAM,
wherein the method further comprises determining that the first AAM references the edition of the native application downloaded from the location indicated by the ADA, and
wherein the launching of the native application and setting the native application into the application state in response to receiving the second user selection comprises launching the native application and setting the native application into the application state based on the determination.

13. The method of claim 1, further comprising:
transmitting an indication that the native application is not installed to the external search system,
wherein the receiving of the search results from the external search system comprises receiving the search results such that the search results include the at least one ADA in response to transmitting the indication.

14. The method of claim 1, further comprising:
receiving a user input,
wherein the launching of the web-based application and setting the web-based application into the web application state comprises, in response to receiving the user input, launching the web-based application and setting the web-based application into the web application state.

15. The method of claim 1, further comprising:
transmitting an indication that the native application is not installed to the external search system,
wherein the receiving of the search results from the external search system comprises receiving the search results such that the search results include the WAM in response to transmitting the indication.

16. The method of claim 1, further comprising, on the occasion of launching the web-based application and setting the web-based application into the web application state, downloading the native application using the at least one ADA and installing the native application.

17. The method of claim 1,
wherein the search results further include link data associated with the at least one AAM,
wherein the link data includes one or more of text or image data that describe the application state specified by the at least one AAM, and wherein the generating of the user selectable link comprises generating the user selectable link using the link data.

18. A method comprising:
transmitting a search query to an external search system configured to generate search results in response to a received search query;
receiving search results from the external search system in response to transmitting the search query, the search results including at least one application access mechanism (AAM) each specifying an application state of a native application, at least one application download address (ADA) each indicating a location at which the native application may be downloaded, and preview data that includes at least a portion of data associated with the application state, the at least one AAM being selected by the external search system from among a set of function records identified by the external search system based on the search query;
generating at least one user selectable link each including at least part of the at least one AAM, the at least one ADA, and the preview data received from the external search system;
displaying the at least one user selectable link;
receiving a user selection on a first user selectable link of the at least one user selectable link; and
in response to receiving the user selection, downloading a native application corresponding to the first user selectable link using an ADA corresponding to the first user selectable link, installing the native application corresponding to the first user selectable link, launching the native application corresponding to the first user selectable link, and setting the native application corresponding to the first user selectable link into an application state specified by an AAM corresponding to the first user selectable link.

19. The method of claim 18, further comprising:
in response to receiving the user selection, determining whether to perform one or more of downloading, installing, and launching the native application, setting the native application into the application state, or displaying the preview data,
wherein the performing of the one or more of downloading, installing, and launching the native application, setting the native application into the application state, or displaying the preview data comprises downloading, installing, and launching the native application, setting the native application into the application state, and displaying the preview data based on the determination.

20. The method of claim 19, further comprising:
receiving a user input,
wherein the determining of whether to perform the one or more of downloading, installing, and launching the native application, setting the native application into the application state, or displaying the preview data comprises determining based on the user input.

21. The method of claim 19, wherein the determining of whether to perform the one or more of downloading, installing, and launching the native application, setting the native application into the application state, or displaying the preview data comprises determining based on one or more of a size of the native application, bandwidth and quality of a data connection used to download the native application, an amount of memory resources and an amount of processing resources available for one or more of downloading, installing, and launching the native application and setting the native application into the application state, or a number of native applications referenced by AAMs included in the search results that are not installed.

22. The method of claim 18, further comprising:
receiving a user input,
wherein the displaying of the preview data comprises, in response to receiving the user input, displaying the preview data.

23. The method of claim 18, further comprising:
transmitting an indication that the native application is not installed to the external search system,
wherein the receiving of the search results from the external search system comprises, in response to transmitting the indication, receiving the search results such that the search results include the preview data.

24. The method of claim 18, further comprising removing the displayed preview data from being displayed on the occasion of completing one or more of downloading, installing, and launching the native application or setting the native application into the application state.

25. The method of claim 24, further comprising:
receiving a user input,
wherein the removing of the displayed preview data from being displayed comprises, in response to receiving the user input, removing the displayed preview data from being displayed.

26. A system comprising one or more computing devices configured to:
transmit a search query to an external search system configured to, in response to a received search query, generate search results;
in response to transmitting the search query, receive search results from the external search system, the search results including at least one application access mechanism (AAM) each specifying an application state of a native application, at least one application download address (ADA) each indicating a location at which the native application may be downloaded, and at least one web access mechanism (WAM) each specifying a web application state of a web-based application, the at least one AAM being selected by the external search system from among a set of function records identified by the external search system based on the search query;
generate at least one user selectable link each including at least part of the at least one AAM, the at least one ADA, and the at least one WAM received from the external search system;
display the at least one user selectable link in order by result scores associated with the at least one AAM, the result scores being ranked by the external search system based on the search query;
receive a user selection on a first user selectable link of the at least one user selectable link; and
in response to receiving the user selection, download a native application corresponding to the first user selectable link using an ADA corresponding to the first user selectable link, install the native application corresponding to the first user selectable link, launch the native application corresponding to the first user selectable link, and set the native application corresponding to the first user selectable link into an application state specified by the AAM corresponding to the first user selectable link.

27. A system comprising one or more computing devices configured to:

in response to a received search query, transmit a search query to an external search system configured to generate search results;

in response to transmitting the search query, receive search results from the external search system, the search results including at least one application access mechanism (AAM) each specifying an application state of a native application, at least one application download address (ADA) each indicating a location at which the native application may be downloaded, and preview data that includes at least a portion of data associated with the application state, the at least one AAM being selected by the external search system from among a set of function records identified by the external search system based on the search query;

generate at least one user selectable link that includes the at least one AAM, the at least one ADA, and the preview data received from the external search system;

display the at least one user selectable link in order by result scores associated with the at least one AAM, the result scores being ranked by the external search system based on the search query;

receive a user selection on a first user selectable link of the at least one user selectable link; and in response to receiving the user selection, download a native application corresponding to the first user selectable link using an ADA corresponding to the first user selectable link, install the native application corresponding to the first user selectable link, launch the native application corresponding to the first user selectable link, and set the native application corresponding to the first user selectable link into an application state specified by an AAM corresponding to the first user selectable link.

* * * * *